United States Patent [19]
Rubin et al.

[11] Patent Number: 5,862,379
[45] Date of Patent: *Jan. 19, 1999

[54] VISUAL PROGRAMMING TOOL FOR DEVELOPING SOFTWARE APPLICATIONS

[75] Inventors: Robert V. Rubin, Sharon; Steven L. Sneddon, Chestnut Hill, both of Mass.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 399,880

[22] Filed: Mar. 7, 1995

[51] Int. Cl.$^6$ ........................................ G06F 9/45
[52] U.S. Cl. ............................................. 395/702
[58] Field of Search ..................... 395/700, 650, 395/600, 135, 133, 155, 161, 159, 160, 702; 345/119, 120, 116, 146

[56] References Cited

U.S. PATENT DOCUMENTS

| | | | |
|---|---|---|---|
| 4,739,477 | 4/1988 | Barker et al. | 395/600 |
| 5,041,992 | 8/1991 | Cunningham et al. | 395/135 |
| 5,255,363 | 10/1993 | Seyler | 395/164 |
| 5,315,703 | 5/1994 | Matheny et al. | 395/164 |
| 5,325,533 | 6/1994 | McInerney et al. | 395/700 |
| 5,408,659 | 4/1995 | Cavendish et al. | 395/650 |
| 5,444,836 | 8/1995 | Hollingsworth et al. | 395/135 |

(List continued on next page.)

OTHER PUBLICATIONS

Ingalls, et al., "Fabrik: A Visual Programming Environment," OOPSLA Proceedings, 176–90, Sep. 1988.

Rubin, et al., "Design and Implementing of Programming Environments in the Visual Programmer's Workbench," Proc. of the 14th Ann. Int. Comp. S/W and Apps. Conf., 547–54, Nov. 1990.

Chow, et al., "Topological Composition Systems: Specifications for Lexical Elements of Visual Languages," Proc. of the 1991 IEEE Workshop on Visual Languages, 118–24, Oct. 1991.

Wagner, R., "Inside Paradox for Windows," New Riders Publishing, Carmel, Indiana, 1993, pp. 39–41, 48–49, 110–111, 143–150, 186–188, 256–258, 391–392, and table 5.1, 1993.

*Primary Examiner*—James P. Trammell
*Assistant Examiner*—Peter J. Corcoron, II
*Attorney, Agent, or Firm*—Kudirka & Jobse, LLP

[57] ABSTRACT

A visual programming method implemented on a computer having a display screen and an input device which a user employs to draw visual representations on the display screen, including the steps of defining and supporting by computer implemented steps a set of object classes including a linking object class; in response to input from the user, selecting a first object class; in response to the user using the input device to draw a first visual representation on the display screen, generating a source object, which is an instance of the first object class and having a first set of events associated therewith; in response to input from the user, selecting a second object class; and in response to the user using the input device to draw a second visual representation on the display screen, generating a destination object, which is an instance of the second object class; in response to input from the user, selecting the linking object class; and in response to the user using the input device to draw a third visual representation that connects the first and second visual representations, generating a linking object, which is an instance of the linking object class and has associated therewith a set of user selectable predefined behaviors, each of which is in the form of a set of commands that defines actions that occur to the destination object in response to an occurrence of one of the events of the first set of events.

24 Claims, 22 Drawing Sheets

U.S. PATENT DOCUMENTS

| | | | |
|---|---|---|---|
| 5,481,712 | 1/1996 | Silver et al. | 395/700 |
| 5,487,141 | 1/1996 | Cain et al. | 395/135 |
| 5,499,359 | 3/1996 | Vijaykumar | 395/600 |
| 5,519,866 | 5/1996 | Lawrence et al. | 395/700 |
| 5,522,024 | 5/1996 | Hiraga et al. | 395/155 |
| 5,524,246 | 6/1996 | Hurley et al. | 395/700 |

Basics

114

| | State | Region | Product_Line | Total_Sales |
|---|---|---|---|---|
| 1 | CA | West | Surgical Tools | 104000 |
| 2 | NM | West | Laser Equipment | 87000 |
| 3 | OR | West | Monitoring Equipment | 105000 |
| 4 | WA | West | Misc Supplies | 56000 |

110

| |
|---|
| East |
| West |
| Central |

```
'----------------------------------------------------------
'----------------------------------------------------------
' Fill destination list box with file names from a
' directory.
'----------------------------------------------------------
'---------------------------------------------------------- dim Path$
dim Patterns$
dim FileType%

'***********************************************************
'For a particular subdirectory, set Path$. The path must
'be terminated with a \; for example, Path$ = "C:\DOS\"
'If you set Path$ to a value, the user will not be able to
'do directory navigation in a source text book.
'***********************************************************

Path$ = " "

'***********************************************************
'Pattern$ can be changed; for example, Pattern$ = "* . BMP".
'***********************************************************

Pattern$ = " * . * "
If Src.Class ( ) = "TextBox" and Src.Text < > " " then
        Pattern$ = Src.Text
End if '***********************************************************
'FileType% values can be READONLY, HIDDEN, SYSTEM,
'DIRECTORY ARCHIVED, or NORMAL.
'***********************************************************

FileType% = NORMAL
Dest.Clear
Call Dest.Dir (Path$ + Pattern$, FileType%)
```

*Figure 15*

'--Delare an object reference.

Dim WinRef asWppWindow

'--Bind it to the current design window.

Set WinRef = bind ("/AppWindow")

'--Decrease the value of ClientWidth – 1000

WinRef.ClientWidth = WinRef.ClientWidth – 1000

Figure 18

'--Declare a generic object reference.

Dim ObjRef as Object

'--Bind it to access the currently selected object (s)
'--In the current design window.

Set ObjRef = bind ("")

'--Set the Text property of the object or objects to "OK".

ObjRef.Txt = "OK"

Figure 19

'-- Declare a generic object reference.

dim SelectSet as Object

'-- Bind the generic object reference to the
'--currently selected objects.

set SelectSet = bind ("")

'--Get the value of the Left property for the most-selected
'--object and assign it to all the selected objects.

SelectSet.Left = SelectSet.Left

Figure 21

'--Declare an object reference to an instance of App Window.

dim ToolWin as AppWindow              (step 510)

'--Bind it to the current window in the tool application.

Set ToolWin = Bind ("AppWindow")      (step 512)

'--Set the TopMost property for the window to TRUE so it

'--Willremain on top.

ToolWin.TopMost – TRUE                (step 514)

Figure 23

'-- Declare a generic object reference.

dim ObjRef as Object                                    (step 520)

'-- Declare an object reference to an instance of AppWindow
'-- and bind it to the currently selected object or
'--objects in the design application.

dim AppWinRef as AppWin                                 (step 522)

set AppWinRef = bind (**)                               (step 524)

'--Declare a variable to hold the instance name of a
'--selected object.

dim NextObj as string                                   (step 526)

'--Get the name of the first selected object.

NextObj$ = AppWinRef.FindSelectObject (", FINDFIRST)    (step 528)

'--While there are selected objects, do the folling for
'--each one: bind the generic object reference to a
'--selected object and print the class name for the object.
'--Then get the next selected object and repeat the while
'-- loop, while NextObj$ < > ""

set ObjRef = bind ("\" + NextObj$)           (step 530)

Print "The class of the object " + NextObj$ + " is " +
        ObjRef.Class ( )                          (step 532)

NextObj$ = AppWinRef.FindSelectedObject (NextObj$,
        FINDNEXT)                                 (step 534)
wend

*Figure 24*

'--End the application and close the application window.

Call CloseAppWindow (**)

*Figure 25*

VISUAL PROGRAMMING TOOL FOR DEVELOPING SOFTWARE APPLICATIONS

BACKGROUND OF THE INVENTION

The invention relates to a visual programming tool for developing software applications.

Historically, the development of software applications required trained and experienced software programmers. Under DOS with its character-based interface, programmers had to design data structures and write program code. This meant that extensive knowledge of the complexities of one or more programming languages was usually required. In recent years, however, with the introduction of windows-based operating systems and the move toward visual based user interfaces, significant progress has been made in developing visual programming tools which have made the task of designing and building applications much easier and more accessible to a wider range of people.

Visual programming focuses on the visual user interface. With visual programming tools, the user is provided with a palette of visual objects that represent commonly required functionality. The user develops an application simply by drawing objects on the screen and by moving those around using drag-and-drop techniques. The visual programming tool takes care of writing or adding the underlying code that is required to implement the functionality of the various objects that have been added to the screen. Thus, the process of writing large segments of code is taken over by the visual programming tool.

Nevertheless, even with prior visual programming tools, users have still had to write and add code to the application under design to complete it. Thus, even though these tools have made the process of designing and building applications much easier, they still have left standing significant barriers to users who are not experienced in programming or writing code.

SUMMARY OF THE INVENTION

In general, in one aspect the invention is a visual programming tool and method that includes a linking object, which is represented by a visual screen representation thereof, and a generic object. Associated with the linking object is an external file(s) containing predefined behaviors, i.e., command scripts which define actions that will be performed by the linking object on a destination object to which it is connected. The external file(s) contains behaviors for many different combinations of object types that are possible with the visual programming tool. When the user connects a linking object between a source object and a destination object, the programming tool presents the user with a list of the predefined behaviors from the external file that are appropriate for that particular combination of source and destination object.

The generic object is an abstract object from which most other objects are derived. Thus, it contains a set of properties and methods that are shared by most of the other objects in the tool. The generic object makes it possible for a running application (i.e., a designer tool) to bind with objects in an application under design and to access, manipulate, and/or modify the properties of the objects in the application under design.

In general, in another aspect, the invention is a visual programming method that is implemented on a computer having a display screen and an input device which a user employs to draw visual representations on the display screen. The method includes: the steps of defining and supporting by computer implemented steps a set of object classes, which includes within it a linking object class; in response to input from the user, selecting a first object classes; in response to the user using the input device to draw a first visual representation on the display screen, generating a source object, which is an instance of the first object class and has a first set of events associated therewith; in response to input from the user, selecting a second object classes; in response to the user using the input device to draw a second visual representation on the display screen, generating a destination object, which is an instance of the second object class; in response to input from the user, selecting the linking object class; and in response to the user using the input device to draw a third visual representation that connects the first and second visual representations, generating a linking object, which is an instance of the linking object class. The linking object has associated therewith a set of user selectable predefined behaviors, each of which is in the form of a set of commands that defines actions that occur to the destination object in response to an occurrence of one of the events of the first set of events.

Preferred embodiments include providing a separate repository of predefined behaviors for various pair combinations of members of said set of object classes. The step of generating the linking object includes retrieving the set of user selectable predefined behaviors from repository; and selecting one of the user selectable predefined behaviors as a default behavior for that linking object. The method also includes defining and supporting by computer implemented steps a generic class, which has a set of properties that are shared by each object class of the set of object classes.

The invention is a powerful and intuitive graphical interface that enables users to easily develop applications. The visual linking facility of ViP enables users to join various pieces of code together simply by adding to and manipulating graphical objects within a designer window. The invention shields the application developer from having to write any code or from having to learn the complexities of programming to build applications. The ViP development tools of the invention are very easy to use. The predefined behaviors that are provided with the linking objects anticipate the functionality that users will want to use in building applications for accessing, manipulating and displaying data and information.

The designer tools that can be constructed with the invention make it easy for a developer to easily impose a common design standard and appearance on the applications that are under design.

BRIEF DESCRIPTION OF THE DRAWING

FIG. 6B shows a visual display that is generated during the running of the ViP application shown in FIG. 6A;

FIG. 7 shows an application with a command button and its right click menu;

FIG. 15 is a sample script for the Directory behavior;

FIG. 18 is a sample script showing how to bind an object reference to an object;

FIG. 19 is a sample script showing how to bind a generic object reference to an object;

FIG. 21 is a designer tool script;

FIG. 23 is an Init script for the designer tool illustrated in FIG. 22;

FIG. 24 is a script that is attached to the Print Class Name command button of the designer tool illustrate in FIG. 22;

FIG. 25 is a script that is attached to the Exit command button of the designer tool illustrated in FIG. 22.

The following tables can be found in the specification:

Table 1 lists the properties that are common to most ViP objects;

Table 2 lists the events that are common to most ViP objects;

Table 3 lists the methods that are common to most ViP objects;

Table 4 lists the special methods of the Clipboard Object;

Table 5 shows the format of the string parameter to the Bind form of the SET statement;

Table 6 lists methods that return the names of objects in a design window;

Table 7 lists methods that get and set the selection state of an object; and

Table 8 lists methods that get and set the script of an object.

Attached to end of the specification are the following appendices:

Appendix 1 describes the AppWin class;

Appendix 2 describes the CommandButton class;

Appendix 3 describes the OptionButton class;

Appendix 4 describes the CheckBox class;

Appendix 5 describes the TextBox class;

Appendix 6 describes the ListBox class;

Appendix 7 describes the ComboBox class;

Appendix 8 describes the ScrollBar class;

Appendix 9 describes the TimerObject class;

Appendix 10 describes the Line class;

Appendix 11 describes the Rectangle class;

Appendix 12 describes the Ellipse class;

Appendix 13 describes the StaticText class;

Appendix 14 describes the GroupBox class;

Appendix 15 describes the Data class;

Appendix 16 describes the OLE class;

Appendix 17 describes the Chart class;

Appendix 18 describes the Link class;

Appendix 19 describes the ClipboardObject class;

Appendix 20 describes the Generic class;

Appendix 21 shows the contents of the VIPLINK.BHV file;

Appendix 22 describes the Class method;

Appendix 23 describes the DIM statement and its use;

Appendix 24 describes the SET statement and its use;

Appendix 25 describes the FindObject method;

Appendix 26 describes the FindSelectedObject method;

Appendix 27 describes the MostSelectedobject method;

Appendix 28 describes the FindLink Method;

Appendix 29 describes the GetSelectedState method;

Appendix 30 describes the SetSelectedState method;

Appendix 31 describes the GetScript method;

Appendix 32 describes the SetScript method;

Appendix 33 describes the DesignerNotify property;

Appendix 34 describes the Designer event;

Appendix 35 lists the predefined link behaviors;

Appendix 36 describes the functionality of the predefined link behaviors listed in Appendix 35;

Appendix 37 describes the generic properties of the generic object; and

Appendix 38 describes the generic methods of the generic object.

DESCRIPTION OF THE PREFERRED EMBODIMENTS

ARCHITECTURAL OVERVIEW

Figure 1:
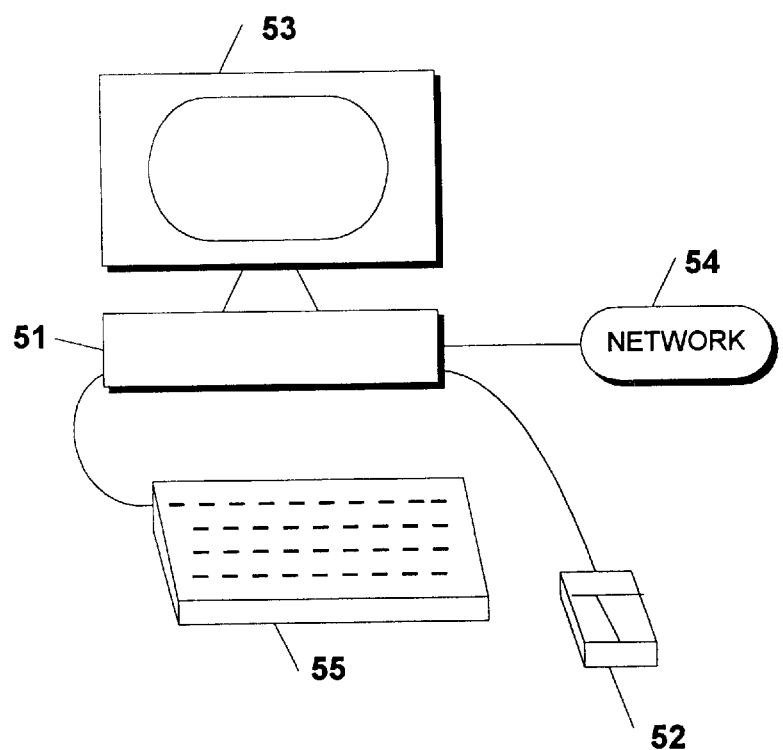
FIG. 1 is a block diagram of a typical system on which ViP is implemented.

The invention is a visual programming tool (referred to hereinafter as ViP™) that enables users to rapidly develop applications (referred to hereinafter as ViP applications). Referring to FIG. 1, ViP runs on a 80386 or 80486-based computer 51 that uses Microsoft® Windows™ 3.1 or higher. The computer includes a 12 MB random access memory and 100 MB hard drive. Attached to the computer is a VGA or higher resolution monitor 53, a mouse 55 with right and left click buttons, and a keyboard 57. Computer 51 is connected to a network 59 (e.g. Novell® Netware 3.86 version 3.11) to which are connected various database servers and files (not shown). With ViP running on the computer, the user can use the pointing device (e.g. the mouse) to simply draw and connect objects on the computer screen and thereby build application programs which access, manipulate, process, and display data and other information.

The ViP application which a user constructs using the visual programming tools of ViP is a structured collection of objects. A set of events is associated with each of these objects. ViP links, which the user draws, and scripts, which the user writes, define responses to these events. When an object event occurs, the ViP application responds by executing the specified event procedure.

Objects

A ViP application consists of one or more application windows, each of which may contain a variety of objects, including Windows controls, graphic objects (such as ellipses and rectangles), data objects, charts, OLE objects, and others.

Object classes

Classes are custom LotusScript™ data types. Note that LotusScript is a BASIC programming language that was designed by and is commercially available from Lotus Development Corporation of Cambridge, Mass. (see, for example, LotusScript: Language Reference, Release 2). Each object in a ViP application is an instance of a product-defined class. There are 20 ViP object classes, which are described in greater detail below. Each class definition includes a set of properties, methods, and events.

Properties

Properties define the appearance and behavior of objects. Many object classes have properties defining visual attributes such as background color, size, and location. When the user creates an object, either by drawing it on an application window or in an event script, the object has default property values. While laying out the objects in an application, the user can use ViP Designer menus and dialog boxes to access the functionality of ViP which enables the user to reset property values. The user can also reset properties programmatically at run time.

Methods

Methods are subprograms (i.e., object-oriented functions) that the user can use in scripts and links to manipulate objects at run time. For example, the user can use a Move method to move an object or a PictureLoad method to load a picture in an application window, group box, command button, rectangle, or ellipse. A ExecuteQuery method executes the retrieval query defined for a data object.

Events

Based on its class, each object in an application can respond to a predefined set of events. Events initiate the execution of application procedures. Many events are user actions, such as clicking a command button or a check box (Click events). Other events are internal, such as the elapsing of a specified interval for a timer object (a Timer event) or the completion of a database operation initiated by a data object (an Execute event). Some events are notification that something is about to happen. Events may also be triggered programmatically.

Event procedures

Event procedures take two forms: event scripts that the user writes and visual ViP links that the user draws from one ViP object to another.

Event scripts

An event script is executed when the specified object event occurs. The user writes event scripts, using LotusScript and a ViP API (Application Programmer's Interface), which includes ViP object properties, ViP object methods, and ViP functions.

ViP links

ViP Links are used to define a relationship between two objects so that when some action is performed on one of the objects (the source object), the other object (the destination object) is affected. A link script, which is part of the link object, defines what happens to the destination object when the link executes. The ViP application includes a set of predefined scripts, called behaviors, that can be executed in a link. One of these behaviors is designated a default behavior, but the user can choose another behavior from the set. The set of behaviors is determined by which kinds of objects the user links together. The user can extend the behaviors of existing links as well as add entirely new behaviors to the links.

ViP links automate the process of generating many event procedures. By drawing a ViP link from a source object to a destination object, ViP automatically generates a script for that connection.

Modules

ViP compiles one binary module for each application window in an application. The event scripts and ViP links associated with an application window and the objects it contains, along with an optional Declarations script, make up each application window module. The application window Declarations script includes the variable declarations, type and class definitions, functions, and subroutines that the user wants to make available to all the event procedures in the module.

There is also one public module per application, in which the user can place the type and class definitions, variable declarations, functions, and subroutines that the user wants to make available to all the modules in the application.

Data access

Using a data object, a chart object, and a report designer, a ViP application can connect to, manipulate, chart data from, and generate reports on a variety of data sources.

Data Objects and Data Connections

Figure 2:
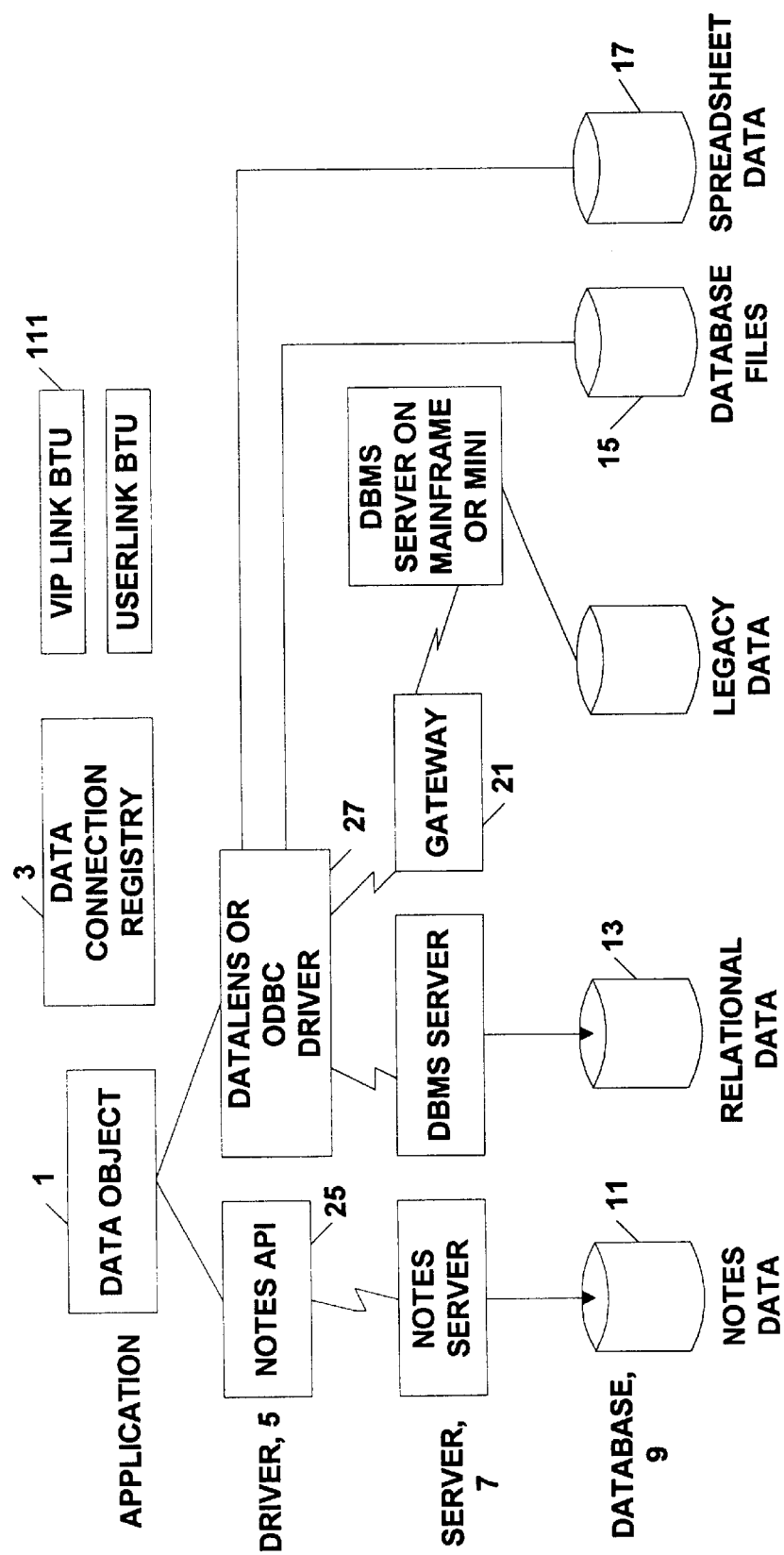
FIG. 2 is a block diagram showing ViP data access.

Referring to FIG. 2, a data object 1 plays a central role in ViP applications. Data objects are used to retrieve, insert, modify, and delete data from data sources, and to provide input for charts and reports. Using a data object, the user can connect to a data source and add columns to the data object from a table in the data source. A data object Connection property identifies its connection to a data source. When the user defines a connection through a data object, ViP adds the name of the connection and its definition to a data connection registry 3 for the application. The definition identifies such information as a driver 5, a server 7, and a data source 9. Data source 9 can be a Notes database 11, a relational database 13, a database file 15, or a spreadsheet file 17. Using gateways 21, the user can also access legacy data 23 on mainframes and minis. ViP uses the Notes API 25 to access Notes databases and uses DataLens® and ODBC™ drivers 27 to access other data sources.

Having defined a connection, the user can use it throughout the application. In other words, the user can use its name to set the Connection property of data objects in any application window.

The user can set up a data object to permit users to perform insert, modify, and delete operations in the data source to which the data object is connected.

Charts and reports

The chart object is used to plot data from a data object. The data can be retrieved from a data source, input by users, or received by the data object via ViP links, scripts, or DDE links. A data object can provide input to multiple chart objects. A chart object, however, must receive data from a single data object.

The Report Designer can be used to perform a variety of calculations, group data, and lay out a tabular or free-form report based on data from a data object. The user can design one report per data object.

ViP application files

A ViP application may manipulate multiple files (database, spreadsheet, and even text files), but the application itself is a single file. This file contains a public module, one or more application window modules, and a data connection registry.

Designer Tools

Using the above-described objects and event procedures, the user can build designer tools. Designer tools are ViP applications that help the user to design other ViP applications. The designer tool is a running ViP application that accesses and modifies the objects of another ViP application that is under design. For example, the user can create a designer tool that gives an object in an application that is under design a three-dimensional appearance with one click of a command button. The user can enhance the tool by adding features that lets the user specify the depth and background color of the object.

Designer tools can be constructed to help the user ensure consistency in the look of the ViP applications which the user designs. For instance, the user may have certain design conventions the user applies to every application. Perhaps the user always puts a command button that displays information about the application in the lower-left corner of the user's startup window. Using the objects describe herein, the user can create a tool that sizes the command button, assigns it the text "Info", and positions it at a standard position in the window.

THE VIP DEVELOPMENT ENVIRONMENT

Figure 3:
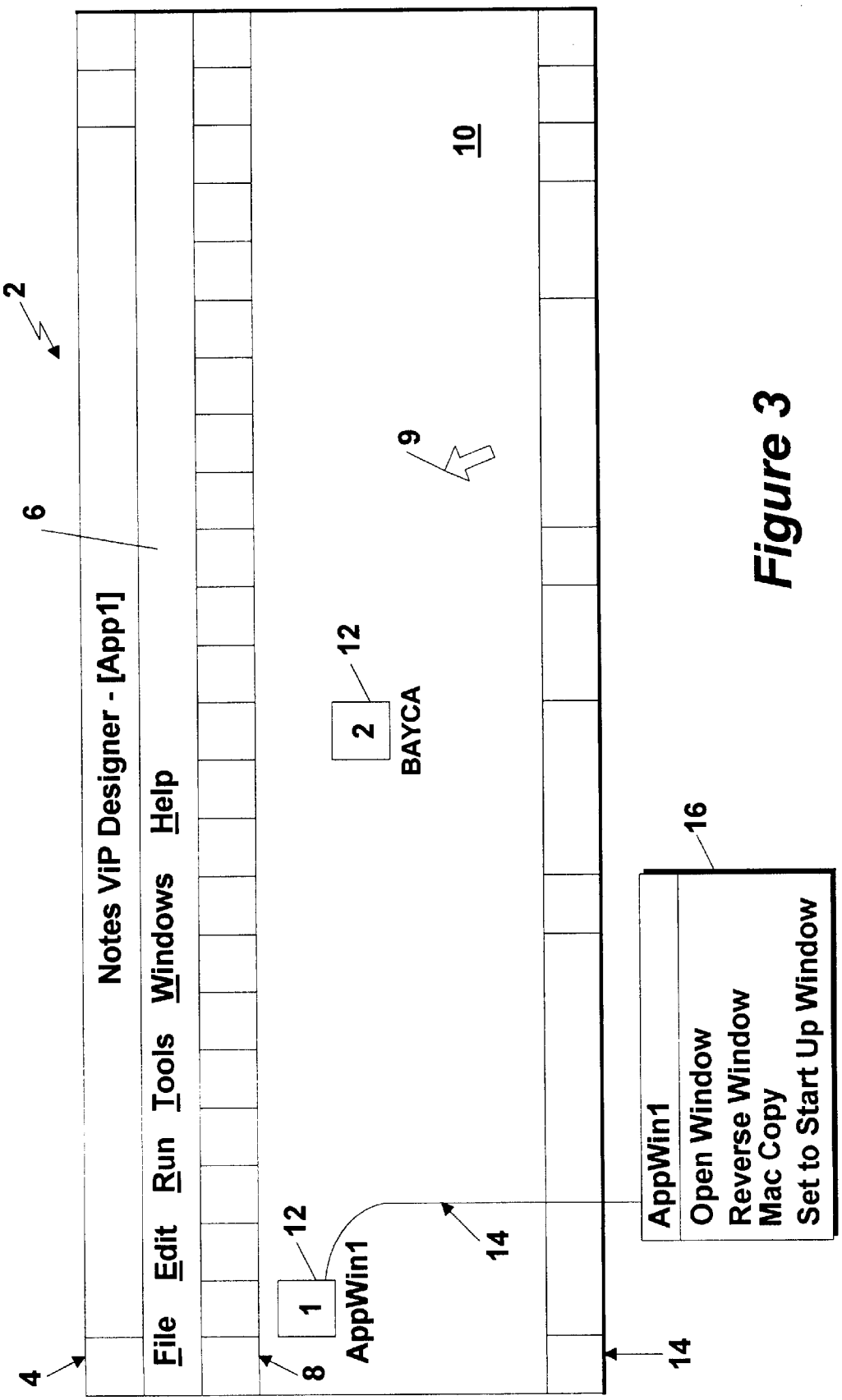
FIG. 3 shows a typical designer window that is displayed by ViP.
Figure 4:
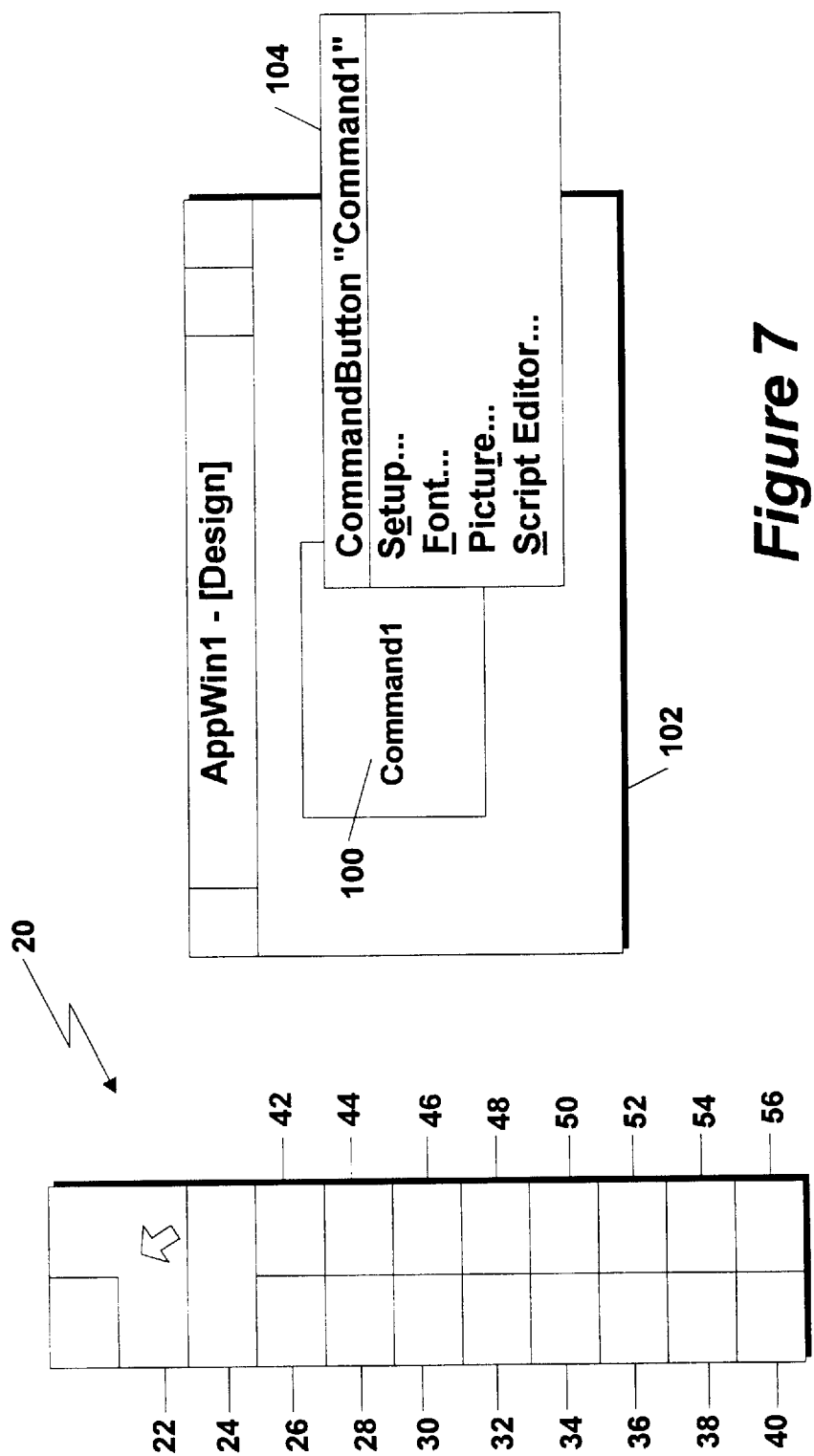
FIG. 4 shows a Designer Toolbox as displayed by ViP.

The ViP development environment is a collection of tools for building applications. These tools include a ViP Desktop, a Designer window 2 (see FIG. 3) and a Designer Toolbox 20 (see FIG. 4), a Script Editor 40 (see FIG. 5), a Report Designer (not shown), and a Debugger (not shown).
Designer When the user creates a new application or opens an application for design, ViP starts the Designer and displays the Designer window 2. Designer window 2 is used to design new applications. Referring to FIG. 3, the Designer window includes a title bar 4, a menu bar 6, a smarticons set 8, a client area 10 for displaying one or more application window icons 12, and a status bar 14. With the aid of a cursor 9 that is controlled of the mouse, the user can make various selections within the Designer window by clicking on the relevant icon.

The menu bar 4 permits the user to execute commands that save and close files, run and end applications, perform standard editing operations, and perform other tasks. SmartIcons set 8 lets the user quickly execute several of the menu commands. The client area displays an icon 12 for each window in the current application. Information about the current application window (i.e., the window that is open and in focus) is displayed in status bar 14 below client area 10.

If the user right-clicks on one of the icons, the ViP application displays a menu 16 through which the user can manipulate the application window. For example, menu 16 enables the user to: (1) open the window to modify the design of the application; (2) to rename the window; (3) to make a copy of the window and the design application associated therewith; and (4) to set the window as the startup window (i.e., the window which is run first when the application is run as part of multiple applications).
Designer Toolbox Referring to FIG. 3, when the user double clicks on an application icon 12, ViP opens up an application window 60 (see FIG. 6) and displays the Designer Toolbox 20 (see FIG. 4) which provides the user with tools that will enable the user to draw objects on the application window. Designer Toolbox 20 presents a group of design tool that are available to the user to design an application. The tools include, a pointer 22, a linking tool 24, a data object tool 26, a static text tool 28, a rectangle tool 30, a command button tool 32, a check box tool 34, a combo box tool 36, a group box tool 38, a timer object tool 40, a chart object tool 42, a line tool 44, an ellipse tool 46, a text box tool 48, an option button tool 50, a list box tool 52, scroll bar tool 54, and an OLE object tool 56. With the exception of the pointer, which the user uses to select, move, and resize objects, each tool represents an object class.

The mouse is used to select tools from the Toolbox and draw objects on the application window. The user can also right-click a tool to display its name in a Designer status bar at the top of the screen.
Script Editor Referring to FIG. 5, the Script Editor displays a Script Editor window 270 that can be used to modify link behaviors (described below) and write scripts. In the Script Editor, the user can move to and view scripts in all the modules (application window modules and the public module) in the application.

As noted, scripts are sets of LotusScript statements that invoke the properties and methods defined for ViP objects. Scripts are attached to an event so that the script executes in response to the event. The Script Editor enables the user to write scripts and attach them to a particular selectable event for the object. For example, the user could write a script to fill a list box with files from a particular directory when an option button is clicked. The user attaches the script to the Click event for the option button.

Each script is a function definition. The user enters the body of the function, and ViP provides a default function header (the keyword function and a function name) and adds the keywords end function at the end of the definition.

The function name takes the Objectname_eventname %, where Objectname is the name of the object with which the script is associated and eventname is the name of the event to which the script is attached. The percent (%) sign after the event name indicates that the value returned by the function is an integer. The value is ignored. The function header is displayed in the Script Editor just above the area where the user enters scripts. The end function keywords are not displayed in the Script Editor.
Report Designer The user opens the Report Designer from the Designer window Tools menu or directly from a data object (with a right-click menu). The Report Designer can be used to design and print detail and summary reports based on the data associated with a data object. The Report Designer presents a graphical environment in which the user can lay out tabular and free-form reports.
Debugger From the Designer, the user can run applications with the Debugger. The Debugger can be used to help find errors in the logic of his applications. The Debugger window shows the script that is currently executing. The user can examine and modify variable values, view a list of the events that have occurred or are currently occurring, navigate through scripts in the application, and set breakpoints.
Building an application This section introduces the major tasks involved in building an application. Keep in mind that the user does not need to complete the tasks in the order they are presented here. The ViP development environment enables the user to build, run, debug, and refine pieces of an application before dealing with the application as a whole.

Laying out application windows

An application window is a collection of objects that presents information and solicits user interactions with the application via the mouse and keyboard. Hence laying out an application window is also laying out a user interface.

When the ViP application is started, a ViP desktop displaying one or more applications icons is displayed on the screen. From the desktop, the user can run selected applications, open applications for design, or design new applications, which can then be added to the Desktop.

Figure 6A:
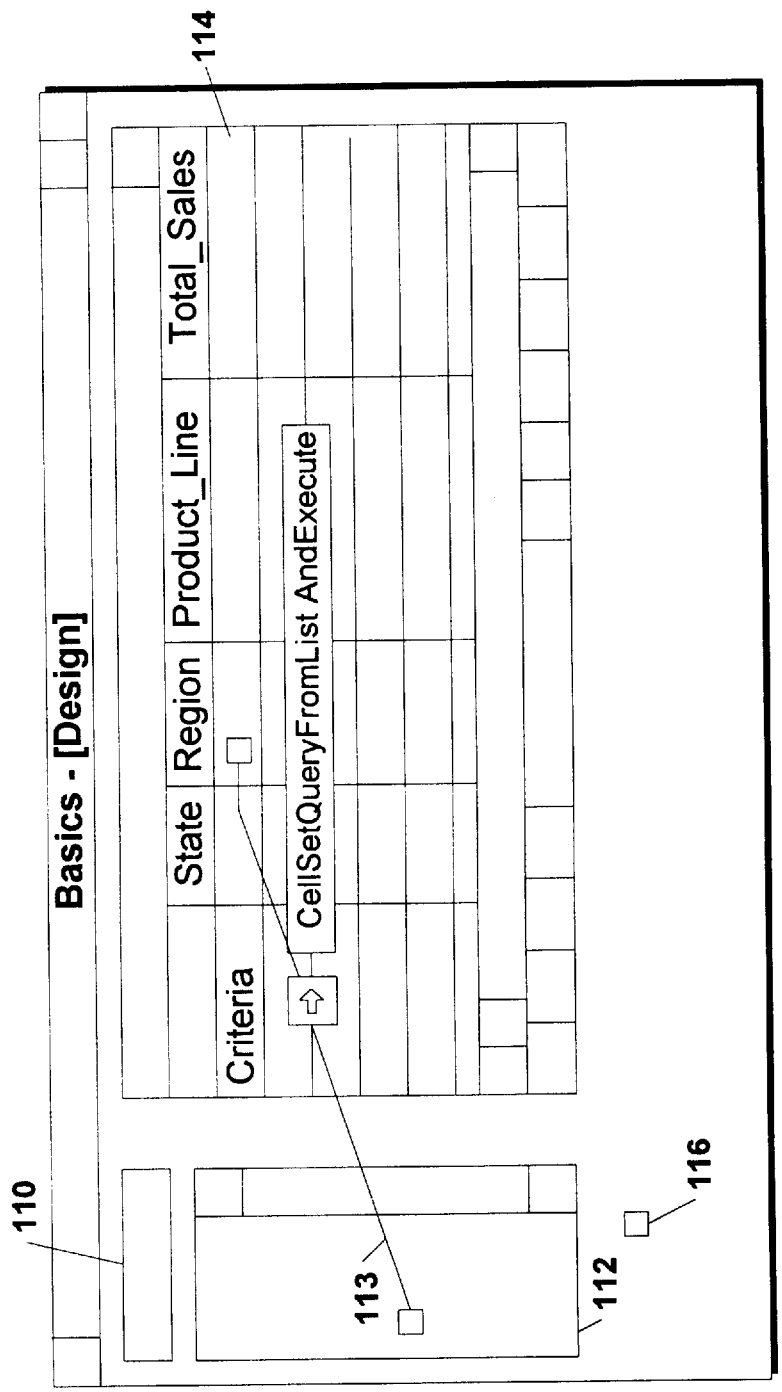
FIG. 6A shows an application window with a visual representation of a command button object, a list box object, and a data object.

When the user opens a new application, the Designer window (see FIG. 3) is displayed which contains at least one application window icon. Through the Designer window, the user gains access to the functionality of the designer within ViP. The designer is used to create one or more application windows (FIG. 6). Double clicking on an application window icon invokes the Designer Toolbox (see FIG. 4) and a blank application window. The Designer Toolbox is used to draw objects in the application window.

Using the tools in the Designer Toolbox, the user draws objects in an application window and then draws links between objects or writes scripts to define the behavior of the objects. Each icon in the toolbox represents a tool for adding a different object to the application window. To obtain a description of the tool, the user right-clicks on the relevant icon and ViP displays a text description of that tool at the top of the Designer window.

Initially, the objects that the user creates, including application windows, have default property settings. ViP, through right-click menus that are associated with the objects, provides the user with the ability to modify the default property settings. At run time, the user can use link behaviors and event scripts to manipulate objects.

As shown in FIG. 7, using the tools of the Toolbox, a user has drawn a command button 100 in an application window 102. To access object properties for the command button, the user right-clicks the object and ViP displays a right-click menu 104 presenting the user with various menu selections. For example, right-click menu 104 for a command button includes setup, font, picture and script editor selections. Selecting one of the menu items causes ViP to display a dialog box through which the user can view and modify values for the relevant properties.

Placing each object within the designer window, causes ViP to automatically generate the underlying code which implements the functionality of the object. That is, ViP adds the relevant code to the application under design.

To generate code which links the source object and a destination object, the user uses the linking tool from the Toolbox. In the application window shown in FIG. 6, the user has created three objects, namely, a command button 110, a list box 112, and a data object 114. To link the list box to the data object, the user selects the linking tool from the Toolbox by clicking on the appropriate tool icon. Once this selection has been made, ViP indicates the type of tool that has been selected by modifying the display of the pointer 116 to indicate the selected tool. After having selected the linking tool, the user moves the pointer over to list box 112 and left-clicks on the list box to select it as the source object. While the mouse button is depressed, the user drags mouse pointer 116 over to the data object and releases the mouse button to select the data object as the destination object and to form a link. ViP visually represents the link between the two objects by a line connecting the two objects. If the link is formed between the list box as the source and the data object as the destination, the visible representation of the link when the link is selected will include a tag with the label "CellSetQueryFromListAndExecute", which identifies the default behavior of the link, i.e., the function which will be performed by the linking object. The Designer also generates an arrow that indicates the direction of the link (i.e., pointing to the destination object).

Note that ViP displays the tag identifying the default link behavior as the pointer moves over the object and prior to releasing the depressed button.

Figure 8:
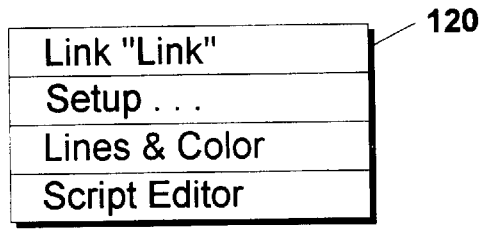
FIG. 8 shows the right-click menu for a link object.
Figure 9:
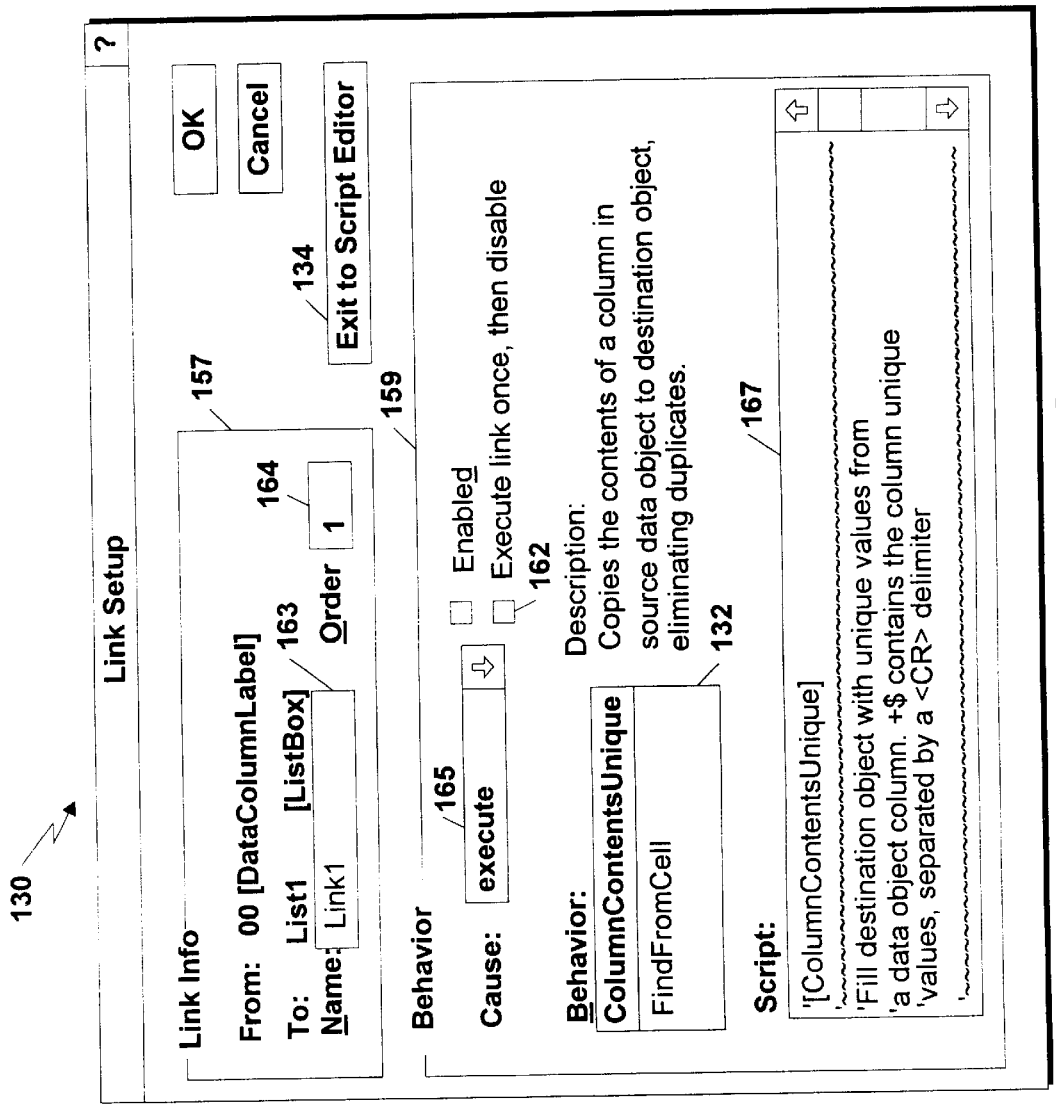
FIG. 9 shows a link setup menu for a link from a data column to a list box.

To change the behavior of the link, the user right-clicks on the link to invoke a right-click menu 120, such as is shown in FIG. 8. The menu has three options, namely, Setup, Lines & Color, and Script Editor. If the Setup option is selected, a Setup dialog box 130 is displayed (see FIG. 9). This dialog box gives the user the ability to select other behaviors that are displayed in a Behavior box 132 or to generate a custom behavior through the script editor option 134. (Note that the link setup box in FIG. 9 is for a link that is established from a data object to a list box.)

The data object 114 shown in FIG. 6 is added to the application window in the same way as the command button and the other objects. That is, the appropriate tool is selected from the Toolbox and the object is drawn in the application window. As noted above, the data object allows the user to connect to data sources, such as Notes, and retrieve, insert, update, and delete data.

Figure 10B:
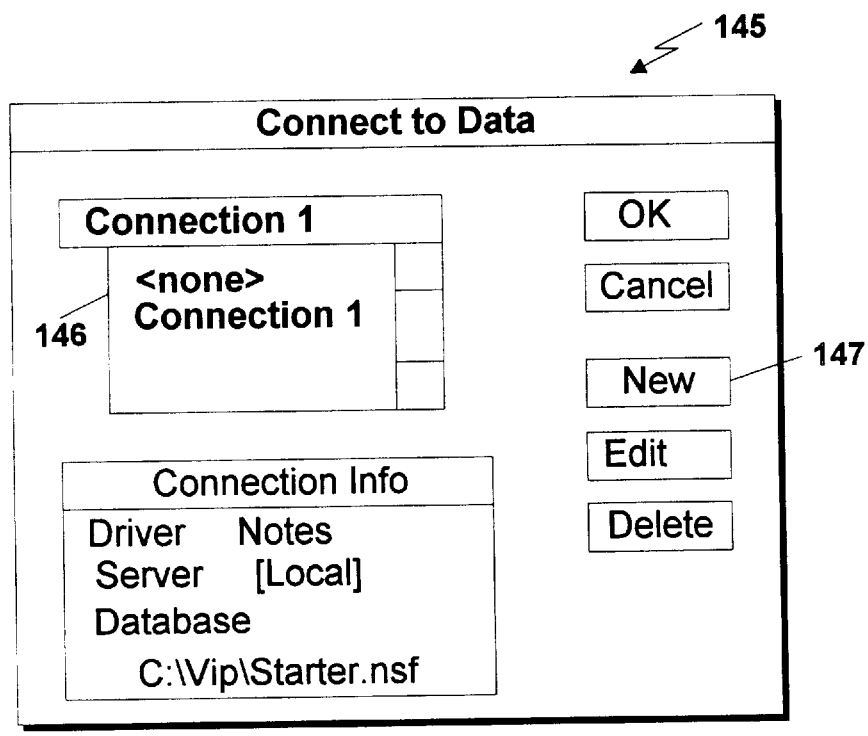
FIG. 10B shows a visual representation of a Connect to Data dialog box.
Figure 10A:
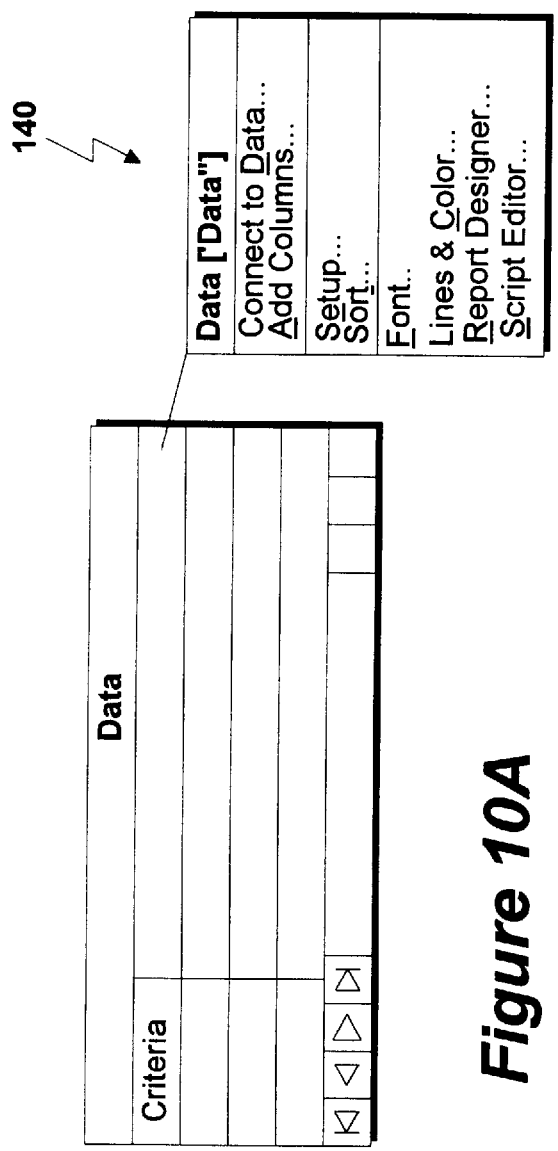
FIG. 10A shows a visual representation of a data object before a data connection has been defined for the object.
Figure 11:
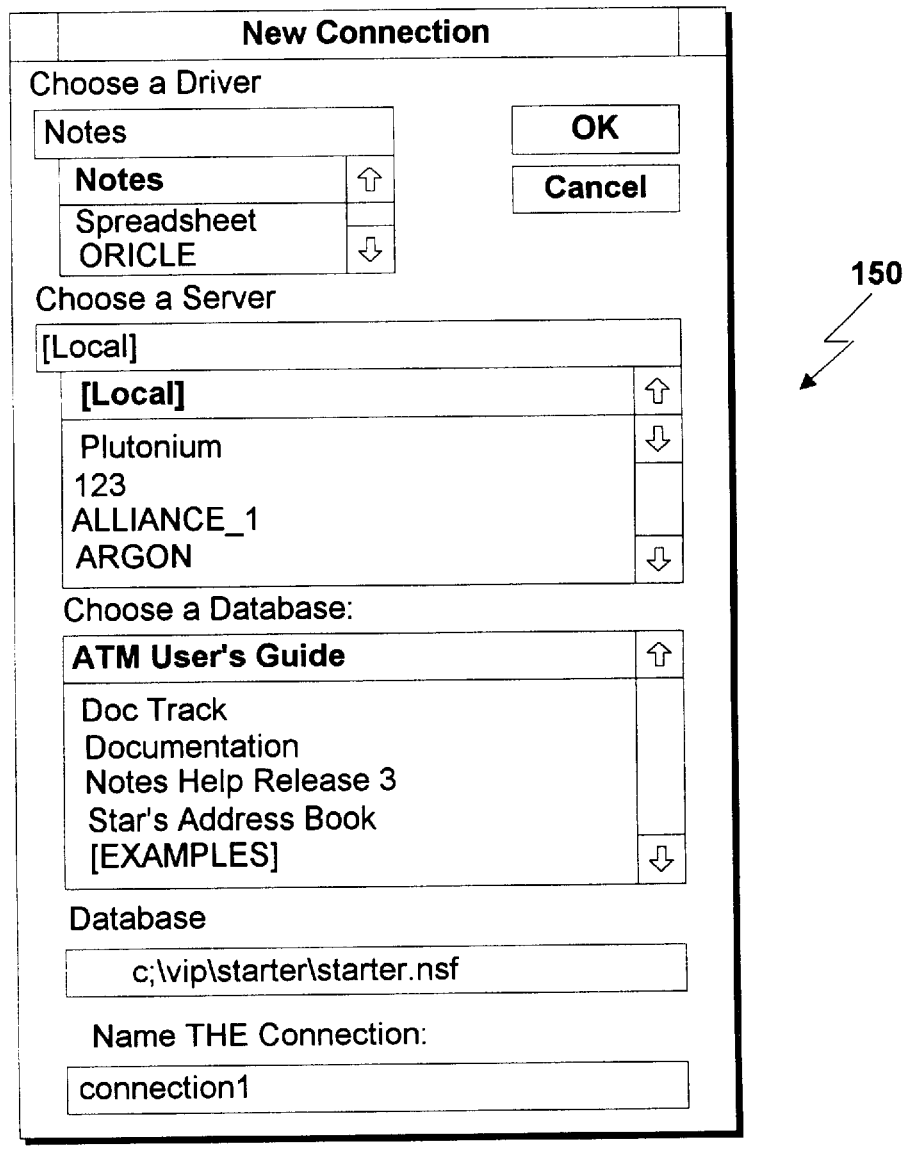
FIG. 11 shows a New Connection menu.

When the data object is first added to an application window, it appears as shown in FIG. 10, without columns. Once the user has drawn a data object in the designer window, ViP allows the user to connect to a data source. This is done by right-clicking on the data object to invoke a right-click menu 140, also shown in FIG. 10. One of the options which the user can select is "Connect to Data". When this is selected, ViP displays a Connect to Data dialog box 145 (see FIG. 10B) on the screen. This dialog box includes a list 146 identifying the connections that have been established for other applications. The user can add to this list by selecting a "New" option button 147 or alternatively, if a connection already exists for the desired data base, by selecting that connection. If the user selects the "New" option, a "New Connection" dialogue box 150 (see FIG. 11) is displayed, enabling the user to select the driver, the server, and the database that is desired. The data object includes methods that are capable of carrying out the functions that are necessary to implement the selections. In this way, the ViP application can connect to Notes databases as well as to relational databases, database files, and spreadsheets.

Figure 12:
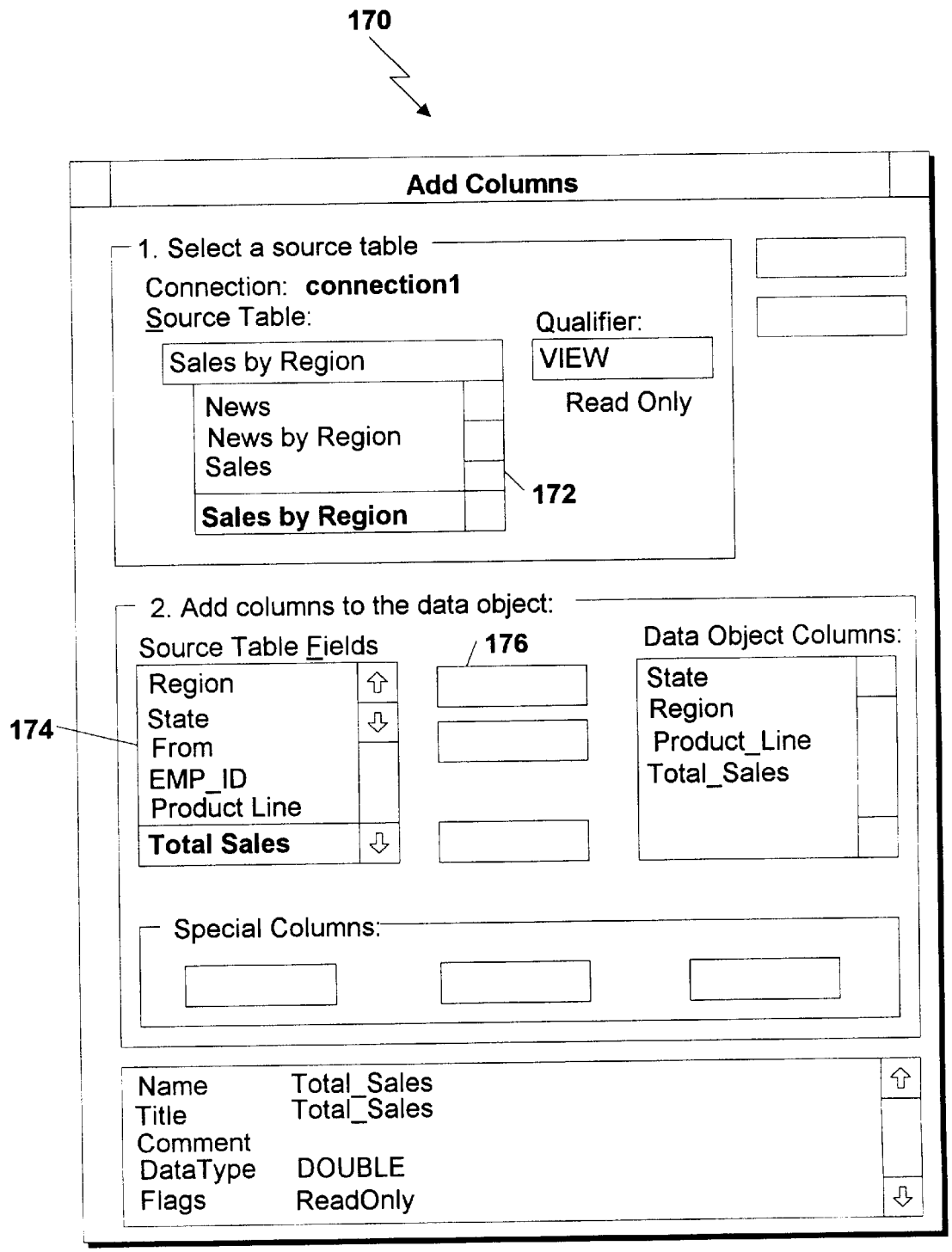
FIG. 12 shows an Add Columns menu.

Having established a connection between the data object and the data source, the user can specify which fields in the data source to work with. The fields map to columns in the data object. For example, the user can add columns to the data object by right-clicking on the data object to bring up the right-click menu, which offers the user an Add Columns option. If that option is selected, an Add Columns dialog box 170 (see FIG. 12) appears on the display, which list the source tables that are available through the established connection. The user selects a source table by double clicking on the appropriate entry in a source table list 172. In response to selecting a source table, ViP populates a source table fields list box 174 with a list of the available fields for the selected source table. An Add button 176 allows the user to add selected fields to the data object.

In the illustrated example, the user has selected the following fields:

State
Region
Product-Line
Total-Sales

Figures 13, 14:
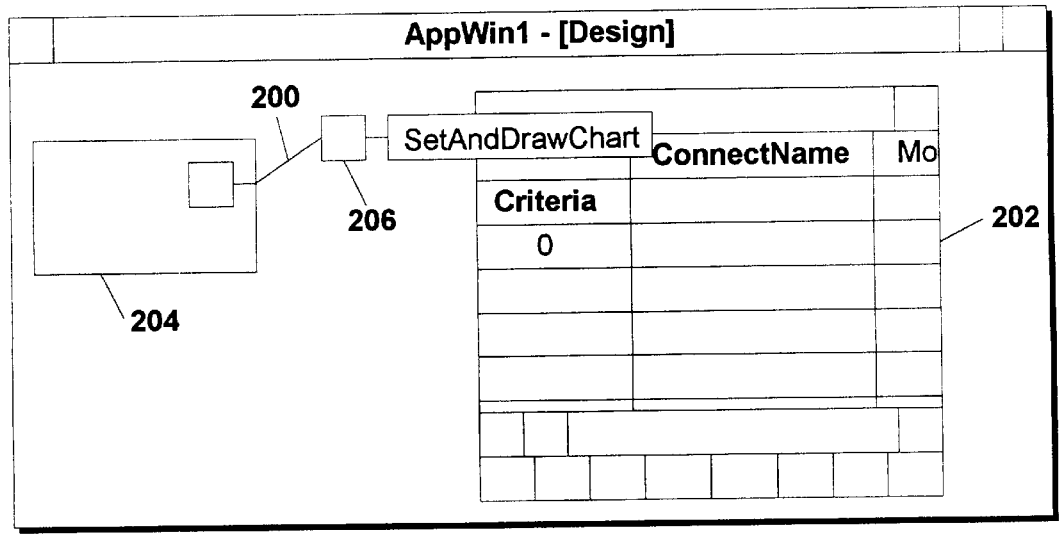
FIG. 13 shows the Data Object options menu.
FIG. 14 shows an application under design.

The data object is provide with a default set of options. The user can alter the options by invoking the right-click menu and selecting the Setup function which will in turn give the user access to the data objects option menu shown in FIG. 13. The options that may be selected through this function are indicated in FIG. 13 and are self explanatory. One of the options of particular importance is the Autoquery option. If the user selects this option, thereby enabling it, as soon as the application is started the data source will automatically be queried and the results displayed in the visual representation of the data object on the display.

The user can add a link to specify the selection criteria for the data object. For example, this is accomplished by using the linking tool to draw a link 113 between the list box 112 and the Region column of data object 114, as shown in FIG. 6.

When the application is compiled and run, the data object queries the database and displays the relevant data in the data object representation on the display screen. When the user clicks on the command button, list 112 fills up with a list of the regions that are represented in the data object (see FIG. 6B).

To perform a query, the user simply clicks on one of the items listed in the list box and the data object updates the displayed data showing only the data which satisfies the selected criteria. For example, again referring to FIG. 6B, if the user selects "West" as the region listed in the list box, the data object will query the source table and display only the data records that have "West" in their Region column.

After the user has connected a data object to a data source and has added columns, the user can use the data object to supply input for charts and a report. The chart object provides access to the functionality of another external chart preparation application program, e.g. Lotus Chart™.

The user can also use OLE objects to link to or embed data from other Windows applications. For example, the user can use an OLE object to embed and play a sound script or to link to a Lotus 1-2-3™ worksheet (Lotus 1-2-3 is a spreadsheet program that is commercially available from Lotus Corporation). If the user links to a worksheet, other users can run 1-2-3 and manipulate the worksheet from within the ViP application as well as receive updates to the worksheet from users working in other applications.

A variety of objects in the ViP application include DDE properties and methods which can be used to establish ViP objects as DDE clients or servers and to establish DDE conversations. That is, those objects can exchange data with other Windows applications. The data that can be sent or received can include individual text strings, lists of text strings, numeric values, bitmaps, and metafiles.

ViP also provides a number of features that the user can use to build documentation into the ViP application. For example, the user can use static text and text boxes to display messages. The user can provide other users with a command button to click to display such a message.

When the user presses F1, the ViP application generates an application window Help event. The ViP application can respond to this event by displaying a message. ViP also provides a function that the user can use to open a standard Windows Help file.

Using the Script Editor

The Script Editor enables the user to view, write, and modify scripts. It has standard editor features, such as cut, copy, paste, and find and replace. The user can also compile scripts from the Script Editor and return to the previous version of a script if the user decides to cancel any changes made to it.

Figure 5:
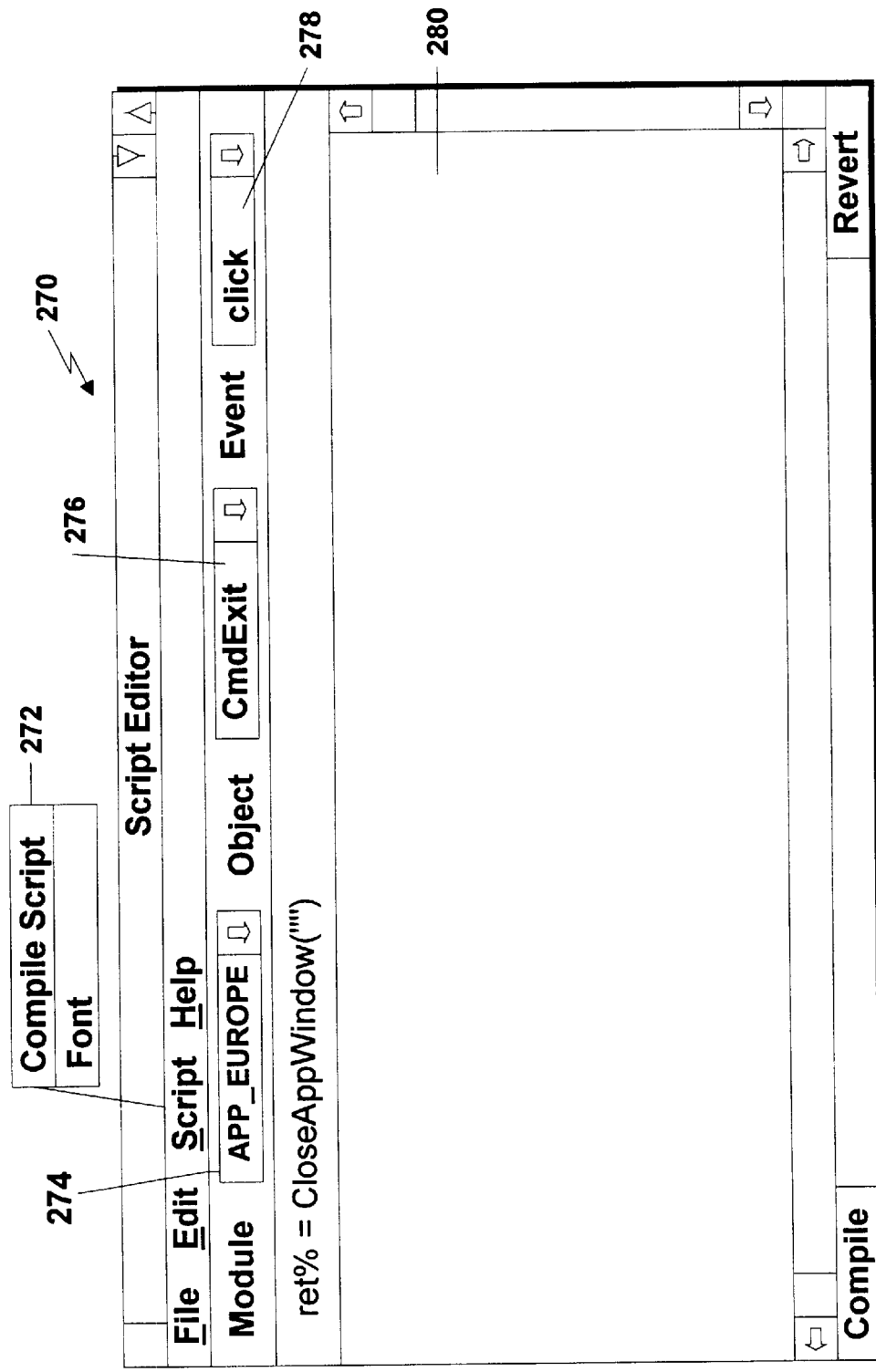
FIG. 5 shows a Script Editor window.

Referring to FIG. 5, when editing an application, the user can move from one script in the application to another using the three drop-down list boxes 274, 276, and 278 at the top of the Script Editor window 270. Drop-down list box 274 specifies the modules in the current application; drop-down list box 276 specifies the objects in the selected module; and drop-down list box 276 specifies the events associated with the selected object.

In FIG. 5, a script is displayed in a script area 280 of the Script editor window for the APP_EUROPE module, the CmdExit object, and the Click event. In this case, the script uses the ViP CloseAppWindow function to close the application window when the CmdExit command button is clicked.

After the user has selected a module, object, and event to which to attach a script, the instructions that are to be executed when the event occurs are typed into script area 280. The instructions are LotusScript language statements that invoke ViP API properties, methods, and functions.

After the script has been entered, the user can compile it to check for syntax errors. When checking for errors, ViP compiles only the current script and the Declarations script (if there is one) for the application window in which the current script residues. The Public module is compiled only once and then is loaded into memory. Unlike the Declarations script, it is not recompiled each time the user compiles a script.

When the user saves or runs an application from the Designer, ViP automatically compiles any application windows that need compiling, so the user need not compile scripts at design time.

The user can explicitly compile the scripts using the Script Editor Script menu or a Compile button 282 on the status bar of the Script Editor window. Also, by default, the Script Editor automatically compiles the current script when the user navigates to another object or event or exits the Script Editor. When ViP encounters a syntax error, it advises the user of the error and asks allows the user the option of either continuing or fixing the error.

VIP OBJECTS: AN OVERVIEW

Objects are the building blocks of a ViP application. Each object the user creates is an instance of a LotusScript custom data type called a class. A LotusScript class may be user-defined (the application developer defines the class in a script) or product-defined (the class definition is predefined and provided with the product). ViP designer objects are instances of product-defined classes. An application window, for example, is an instance of the AppWindow class; individual check boxes are instances of the CheckBox class; and data objects are instances of the Data class.

When the user creates an application window and draws an object on it, ViP declares a variable on the appropriate class for each object and binds the variable to the object. The user can do the same at run time in event scripts.

ViP provides 20 predefined LotusScript classes. As part of the definition for each class, ViP defines properties, methods, events, and link behaviors that apply to the class. The classes are summarized below and further details are presented in Appendices 1–20, attached.

ViP classes

ViP provides the following classes each of which is more fully documented in Appendices 1–20, attached hereto. Each of the following classes, except for the application window, the clipboard object, and the generic object, is represented by a corresponding tool in the toolbox.

Application window

An application window is an instance of an AppWin class. An application window is the highest-level container object in a ViP application. An application window contains a collection of objects that present information and solicit user interactions with the mouse and keyboard. (See Appendix 1).

Windows controls

ViP provides classes that define the following Windows controls:

Command Button

A command button is an instance of the CommandButton class. A command button lets users initiate an action with a click. (See Appendix 2).

Option Button

An option button is an instance of the OptionButton class. An option button lets users initiate an action with a click. When grouped, option buttons present users with mutually exclusive options; users may select only one option in the group. (See Appendix 3).

Check Box

A check box is an instance of the CheckBox class. A check box lets users initiate an action with a click. When grouped, check boxes present users with non-exclusive options; users may select any number of options in the group. (See Appendix 4).

Text Box

A text box is an instance of the TextBox class. A text box displays information or accepts textual input from the user. (See Appendix 5).

List Box

A list box is an instance of the ListBox class. A list box displays a list of items from which the user can select. (See Appendix 6).

Combo Box

A combo box is an instance of the ComboBox class. A combo box combines the functionality and attributes of a list box and a text box. The list box portion of a combo box displays a list of items from which the user can select. The text box portion of a combo box displays the selected item and can be defined to accept textual input from the user. (See Appendix 7).

Scroll Bar

A scroll bar is an instance of the ScrollBar class. A scroll bar represents an evenly-distributed range of numerical values from which the user can select by scrolling through the range. (See Appendix 8).

Timers

A timer is an instance of the TimerObject class. A timer functions in the background and is not visible to the user. The user can use a timer to initiate processing when a specified time interval has passed. (See Appendix 9).

Graphic objects

ViP provides classes that define the following graphic objects:

Line

A line is an instance of the Line class. The user can place an arrowhead at the beginning or end of the line. (See Appendix 10).

Rectangle

A rectangle is an instance of the rectangle class. A rectangle can have a border, label, or pattern. The user can place a picture in a rectangle. (See Appendix 11).

Ellipse

An ellipse is an instance of the Ellipse class. A circle is a special case of an ellipse. An ellipse can have a border, label, or pattern. The user can place a picture in an ellipse. (See Appendix 12).

Static Text

A static text object is an instance of the StaticText class. Static text is text that is uneditable at run time. The user can layer static text on top of other objects. (See Appendix 13).

Group Box

A group box is an instance of the Group class. A group box functions both as a graphic object and as a container object. A group box logically and visually groups a collection of objects, such as option buttons. (See Appendix 14).

Data object

A data object is an instance of the Data class. They are tabular representations of external data and play a central role in ViP applications. The user uses data objects to retrieve, insert, modify, and delete data from Notes databases and other data sources; to provide input for charts and reports; and to send native commands to Notes, relational servers, and ODBC drivers. (See Appendix 15).

OLE object

An OLE object is an instance of the OLE class. An OLE object embeds data from another Windows application or links to data in another Windows application. (See Appendix 16).

Chart object

A chart object is an instance of the Chart class. A chart is an object that graphically represents data from a data object to which the chart object is connected. (See Appendix 17).

Link

A link is an instance of the Link class. A link is a special object that relates two other objects (a source object and a destination object) when a source object event (called a cause) occurs. A link consists of a link behavior that is a predefined, but modifiable, LotusScript script. At design time, the user draws a link between the source object and the destination object. At run time, when the cause (i.e., a source object event) happens, ViP executes the link behavior (i.e., a script). At design time, a ViP link has graphical attributes. (See Appendices 18, 35 and 36).

Clipboard object

A Clipboard object is an instance of the ClipboardObject class. A Clipboard object is an temporary storage area that the user can use when copying or moving ViP objects, text, pictures, or DDE links in a script. ViP automatically makes one instance of this object available to each ViP application. (See Appendix 19).

Generic object

A generic object is a member of the Object class. The Object class is a virtual class. A generic object has no actual existence in its own right. Instead, in a script, the user can declare a variable to refer to an instance of the Object class. This variable is a generic object reference. The user can bind this generic object reference to objects of any other class. (See Appendix 20).

With some exceptions, the other object classes are derived from the generic class. Stated differently, the generic object possesses a set of properties and methods that are common to almost all of the other objects. This enables the user to design a designer tool application (see later description of designer tools) which can modify the properties and scripts of objects within an application that is under design without the user having to know the identity of the objects in the application that is under design or even the object classes of those objects. (See Appendices 37 and 38 for a description of the generic properties and methods.)

Each class definition, which is documented in Appendices 1–20, includes a definition of the structure of instances of the class and the definition of a set of properties, methods, and events that apply to the class.

Properties

Properties are attributes that identify a class and define the appearance and behavior of objects that are instances of a class. For example, the text box object has properties that determine its background color, font, height, and width, among others. When the user creates an object by drawing its representation in an application window (or designer frame), the object which is created has default values for its properties. For example, the default value for an application window BackColor property (background color) is WHITE; and the default value for a text box Multiline property is FALSE (i.e., users can only enter one line of text).

A property typically has the following characteristics. A property applies to both a design-time object and a run-time object. ViP saves the design-time value of a property with the object when the user leaves design mode and the design-time value of the property becomes the initial run-time value of the property. Also, the user can both retrieve and specify a value for the property at design time and run time.

Some properties apply to only one object class. Only text boxes, for example, have a Multiline property, which determines whether the user can enter multiple lines in the text box. Only data objects have a Connection property, which defines the connection to an external data source, such as a Notes or SQL Server database.

The Clipboard object is a unique ViP object and only has one property, the Text property. The class definition for most other ViP objects includes the common properties described in Table 1 below:

TABLE 1

| Property | Description | Objects property applies to |
| --- | --- | --- |
| Name | Name of the object | All |
| Description | Description of the object | All |
| Parent | Name of the object that contains the object | All |
| Bottom, Top, Left, Right, Height, Width, and Layer | Coordinates that determine the size and position of the object in its container object (either an application window or a group box) | All |
| TabIndex | Position of the object in the tab order of the application window | All |
| Visible | Whether the object is visible or invisible at run time | All |
| Enabled | Whether the object is enabled or disabled at run time | All |
| BackColor | Background color of the object | All graphic objects except line and static text; all Windows controls except command button and scroll bar |
| Transparent | Whether the object is transparent or opaque | All graphic objects, check box, and option button |
| Cursor | Shape of the mouse pointer when the user moves it over the object at run time | All except link and the timer object |
| Text | Textual data associated with the object | Application windows; all graphic objects except line; all Windows controls except scroll bar; data objects |
| FontName, FontSize, FontStyle, and ForeColor | Characteristics of the font of the textual data in the object | Many of the objects that have textual data |

TABLE 1-continued

| Property | Description | Objects property applies to |
| --- | --- | --- |
| Justify | Placement of the text | Many of the objects that have textual data |
| LineColor, LineStyle, and LineWidth | Object border and attributes of lines | All graphic objects except group box; text box and list box; links (LineColor only) |
| DDEClientData Type, DDEClientItem, DDEClientMode, DDEClientServer, DDEClientStatus, DDEClientTimeOut, DDEClientTopic, DDEServerActive, and DDEServerEnable | Role of the object in a DDE conversation | Application windows; all graphic objects except the group box; all Windows controls; data objects |

Other properties apply to just one or a few ViP objects. For example, only objects with a list box (list boxes and combo boxes) have the Contents property, which specifies the items in the list box. Also some objects have properties that apply only at design time. For example, the application window only has a grid at design time and, consequently, the Grid properties only apply at design time.

Events

A set of events is associated with each object. An event is an action that happens to an object. An event is a predefined system or user action that can be applied to an object. For instance, a command button is an object that has a Click event, which is the action of clicking an object. The user can attach a script to an event so that the script executes in response to that event.

The user or system can cause an event to occur. ViP applications follow an event-driven programming model that has two underlying principles. One principle is that each object in an application can respond to a set of events predefined for that object. Another principle is that events initiate the execution of code in an application.

The class definition for each ViP object defines the events that can occur for the object. Not all events apply to all objects. The class definition for most ViP objects includes the events described in the following Table 2.

TABLE 2

| When this happens | This event is triggered |
| --- | --- |
| The object is functioning as a DDE server and the DDE conversation starts or stops. | DDEActivity |
| The object is functioning as a DDE server and data from a DDE client application arrives. | DDEServerPoke |
| The object is functioning as a DDE client and data being sent from a DDE server changes. | DDEActivity |
| The object is functioning as a DDE client and data from a DDE server arrives. | DDEClientArriving |
| The DoEvent or DoEventArgs method (with User as the event) for the object box executes. | User |

Some events apply to only a few objects. The DoubleClick, LeftClick, and RightClick events apply only to graphic objects. The GotFocus and LostFocus events apply only to objects that can be the focus of an application (that is, the data object and Windows controls). Some events apply to only one object. The Timer event applies only to timer objects.

Some events are notification that something is about to happen. For example, a RowValidate event occurs when the user attempts to insert, modify, or delete a row of data through a data object. The data object passes a RowValidate event script a parameter that specifies which of these operations the user is performing. The event procedure can check the values the user has entered, for example, then accept or cancel the update operation.

Events may also be triggered programmatically. Changing the State property of a check box in an event procedure, for example, triggers a Click event for the check box. Using a SetFocus method to move focus to a text box triggers the LostFocus event for the object that initially had the focus, then triggers the GotFocus event for the text box.

Even though events are part of the class definition of an object, merely creating an object does not mean that the application performs any processing when an event occurs to the object. In an event-driven application, such as the ViP, the user determines the application flow of control by creating procedures to perform the processing the user wants when an event occurs. ViP has two types of event procedures: link behaviors and object event scripts.

Methods

Methods are object-oriented functions and subroutines that the user can use in event procedures to manipulate objects. Each object has a set of methods that operate on it. For example, all the ViP objects have a Move method that changes the position of the object in the application window or the position of the application window on the screen.

ViP methods perform several types of processing. Some methods retrieve the value of an object attribute. For example, a GetProperty method retrieves the ASCII representation of the value of an object property. Other methods specify the value of an object attribute. For example, a SetProperty method specifies the value of an object property. And still other methods act as a keyword. For example, a Clear method deletes all of the items in a list box or the list box portion of a combo box.

In most cases, the user can use a method in both standard applications and designer tools (see description below).

The Clipboard object is a unique ViP object and has only a few methods. The class definition for most other ViP objects includes the methods shown in Table 3 below.

TABLE 3

| Methods | Description | Objects methods apply to |
| --- | --- | --- |
| Class | Retrieve the class name of the object. | All |
| Position and Move | Reset the coordinates of the object. | All |
| ClipboardCopy, ClipboardPaste | Copy data to and from the Clipboard. | All |
| DoEvent, DoEventArgs | Execute a script associated with an event for the object. | All |
| FindProperty, FindEvent, FindLink | Retrieve the names of the properties, events, and links associated with the object. | All |

TABLE 3-continued

| Methods | Description | Objects methods apply to |
| --- | --- | --- |
| GetScript, SetScript | Retrieve and specify a script for an object event at design time. | All |
| GetProperty, SetProperty | Retrieve and specify the values of the properties of the object. | All |
| Repaint | Redraw the object. | All |
| CursorCopy, CursorLoad | Change the cursor associated with the object. | All except the timer object |
| FontSelect | Present the Windows Font dialog box to users to that they can change the font of the textual data in the object. | All objects that have the font properties |
| DDEClientExecute, DDEClientPoke, DDEClientRequest, DDEUseData | Manage the DDE conversation of the object. | Application windows; all graphic objects except the group box; all Windows controls; data objects |

Other methods apply just to one or a few ViP objects. For example, only objects with a list box (list boxes and combo boxes) have the ItemAdd, ItemDelete, ItemFind, ItemFindExact, ItemGet, ItemInsert, and ItemSelect methods that the user can use to manage list box items. Also some objects have methods that the user can only use in a designer tool when the application is being designed. For example, as mentioned above, the user can only specify the script for an object event at design time; consequently, the user can only use the SetScript method in a designer tool.

Permanent and Temporary Objects

ViP has two types of objects, namely permanent objects and temporary objects. An object that the user creates at design time is a permanent object. ViP saves a permanent object as part of the ViP application. An object that the user creates at run time is a temporary object. ViP does not save a temporary object as part of the ViP application. A temporary object exists only in the scope of the application in which the user creates it. For example, if the user declares a temporary object in a Public module (see discussion of Public modules elsewhere), the temporary object exists during the entire execution of the application program. If the user creates a temporary object in an event script, the temporary object exists only while ViP executes that script.

Creating and deleting permanent objects

ViP allows a user to create a permanent object at design time by using the ViP designer or by using a user-generated designer tool. The way in which ViP enables a user to create a permanent object varies depending on whether the user wants to create an application window or another type of object. To create a permanent application window, the Designer window is used. To create other permanent objects, the toolbox is used to draw the object on an application window.

Permanent objects can also be deleted. Again, the way in which ViP enables a user to delete a permanent object varies depending on whether the user wants to delete an application window or another type of object. To delete a design-time application window, the user selects and deletes the application window from the Designer window. To delete other permanent objects, the user selects and deletes the object from the design-time application window.

Creating and deleting temporary objects

In a run-time script, the user can only create temporary objects and instances of previously-defined application windows. To create a temporary object, the NEW keyword with either a LotusScript DIM statement or a SET statement (see Appendices 23 and 24) is used. The script syntax varies by object. To create an instance of an application window, an OpenAppWindow function is used.

Temporary objects can also be created in a run-time script. To delete a temporary object, the LotusScript DELETE statement is used. To delete an instance of an application window, a CloseAppWindow function is used.

Before the user can create or delete a temporary object, an object reference for the object must first be defined (see below).

Setting up objects

The user can set up an object for run time by defining the initial run-time characteristics of the object. A permanent object for run time can be set up by performing one or both of the following actions: (1) specify the desired property values at design time; and (2) specify initial run-time values in a script.

Since a temporary object only exists at run time, a temporary object must be set up in a script.

Setting up objects at design time

When the user creates a permanent object, the object has default property values. In general, ViP saves these property values with the application and the design-time values of the properties become the initial run-time values of the properties. Consequently, to set up a permanent object, all the user typically has to do is create the permanent object and then specify new values at design time for any property for which default values are not desired.

At design time, the user can specify non-default property values either by using the right-click menu for the object or by using a designer tool.

Setting up objects in event procedures

Since a temporary object only exists at run time, ViP requires that the user set up a temporary object in a script. ViP also enables the user to set up the initial characteristics of a permanent object in a script. For example, the user must set up a permanent object in a script if the user wants to specify initial run-time values for properties that: (1) ViP does not save at design-time, (2) the user cannot specify by using design-time menus and dialog boxes, or (3) depend on run-time, user-specific information.

The script that the user uses to set up an object varies depending on whether the object is a permanent object or a temporary object. If the object is a permanent object, the user typically sets up the object in the Public module or the Init event script of the application window that contains the object. If the object is a temporary object, the user must set up the object in the script in which the object is created, unless the temporary object is declared in the Public module. In this case, the user can set up the object in any script in the application.

Manipulating objects at run time

When an event occurs to an object, ViP executes the scripts associated with the event and manipulates objects as requested by the scripts. The scripts can be either scripts that ViP generates when the user creates a link (i.e., a link behavior) or a script that the user writes using the ScriptEditor. A script consists of LotusScript statements that retrieve or specify the values of ViP properties, ViP methods, and ViP functions.

The following sections discuss referencing objects in scripts, setting property values and using methods at run time, using objects to initiate application processing, and managing data on the Clipboard at run time.

Referencing objects in scripts

Before the user can write statements in a script to access an object, the object must have a variable called an object reference declared for it and be associated with the object reference. An object reference is a special kind of programming variable that is used to manipulate an object, either in an application open for design or in the running application itself. The process of establishing the association between an object reference and an object is called binding.

When the code is compiled, ViP automatically generates code that declares an object reference for a permanent object and binds the object reference to the object. ViP uses the value of the object's Name property as the object reference name. As a result, in a script, the user can use the value of the object's Name property to identify each permanent object in the application window.

Sometimes, however, the user needs to explicitly declare an object reference and bind an object to it in a script. The user needs to explicitly perform these actions to use a temporary object; to use a single object reference to manipulate a series of permanent or temporary objects on an application window; or to use a design-time object using a designer tool. In the case of a single object reference, the user must explicitly declare an object reference; explicitly bind it to one object; use it to manipulate the object; then explicitly bind it to another object; and so on. In the case of a designer tool, while it is running, it declares and binds variables to objects in the application that is currently being designed.

In all of these situations, the LotusScript DIM and SET statements are used (see Appendices 23 and 24, respectively, for more detailed descriptions of those statements and their proper usage).

In general, the DIM statement is used to declare an object reference. The user can declare an object reference of a specific class, for example, Rectangle, or of the generic object class, Object. If the user declares an object reference to a special class, the user can only bind it to instances of that class. For example, if the user declares a Rectangle object reference, the user can only bind it to rectangles. If the user declares an Object object reference, the user can bind it to instances of any class. For example, if the user declares an Object object reference, the user can bind it to text boxes, rectangles, or command buttons.

In the following example, the DIM statement declares MyCheckBox as a ViP object variable of the class CHECKBOX:

DIM MyCheckBox AS CHECKBOX

The user can also declare an object reference and create a new object by using a single SET statement. The SET statement is used with the BIND keyword to bind the object reference to an object. The user can include a path that identifies the application window that contains the object as part of the name of the object.

In the following example, the SET statement binds the ViP object variable MyCheckBox with the ViP object named Checkbox1:

SET MyCheckBox=BIND("Checkbox1")

Setting properties and using methods at run time

ViP enables the user to explicitly specify and retrieve the values of properties in object event scripts. Specifying a value for a property is called setting a property. The generic syntax to set a property in a script is shown below:

ObjectReference.PropertyName=Property Value

For example, if the value of the State property of a check box is TRUE, the check box is selected. In a script, the user can select a check box called Check1 by including the following statement:

Check1.State=TRUE

Retrieving the value of a property is called getting a property. The generic syntax to get a property in a script is shown below:

PropertyValue=ObjectReference.PropertyName

For example, the user can retrieve the value of the State property of a check box into a variable called Selection by including the following statement in a script:

Selection %=Check1.State

Many link behaviors also set property values. For example, the user can create a link from a column label in a data object to a check box with a SetStateFromCell link behavior. This link behavior selects a check box when the text of the check box matches the text of the current cell in the result set of a data object.

Methods are object-oriented functions and subroutines that the user can use to manipulate objects at run time. The user can use methods in an object event script. For example, the user can use the PictureCopy method to copy a picture from one object to another object. The ExecuteQuery method executes the query defined for a data object.

Some link behaviors are, in essence, augmented methods. For example, the PictureLoad method loads a picture from a file into an object. The PictureLoadFromList link behavior loads a picture into an object from a file named by the selected item in a single-selection list box or the list box of a combo box.

Setting some properties and executing some methods in object event scripts and link behaviors at run time raises certain events. For example, when the SetStateFromCell link behavior (described earlier) changes the State property of a check box, it raises a Click event for the check box to occur. Using the SetFocus method to place focus on a text box causes the LostFocus event for the object that previously had focus, and it causes the GotFocus event for the text box.

Initiating application processing

Even though events are part of the class definition of an object, merely creating an object does not mean that the application performs any processing when an event occurs to the object. With ViP, the user determines the flow of controls in the user's application by creating procedures to respond to certain events. ViP provides two types of event procedures: link behaviors and object event scripts.

This section discusses using link behaviors and object event scripts to initiate application processing.

Using links

As noted above, a link behavior is a LotusScript script that ViP generates when the user creates a ViP link from a source object to a destination object. The script is executed when the Cause of the link occurs (i.e., when an event is raised for the source object). The user can also modify this script.

To initiate application processing by using a link behavior, the user creates a link with the link behavior that the user wants. When an event occurs to the source object, ViP executes the link behavior script for the link.

Using object event scripts

An object event script is a script the user writes using the Script Editor. When the user writes the script, the user specifies the particular object event that he wants the script associated with. When the object event occurs, the script executes.

Managing data on the Clipboard at run time

The Clipboard is a temporary storage area that is used in Windows when the user is copying or moving data. ViP includes a special Clipboard object that lets the user access the Clipboard and move ViP objects, text, pictures, and DDE links in a script. The user can access the Windows Clipboard at design time and run time; the user can only access the Clipboard as an object from a running ViP application. The Clipboard object does not resemble any other ViP objects. Each ViP application has only one instance of the Clipboard object, and ViP automatically provides that instance to each application at run time. The user does not have to create an instance of the Clipboard object, create an object reference to the Clipboard object, or bind an object reference to the Clipboard object.

Characteristics of the Clipboard object

Unlike other ViP objects, no events apply to the Clipboard object and the user cannot use the Clipboard object as the source or destination object of a link. Also, most of the generic ViP properties and methods do not apply to the Clipboard object. The only property that applies to the Clipboard object is Text. The only generic methods that the user can use with the Clipboard object are Class, FindProperty, GetProperty, and SetProperty.

The Clipboard object also has the special methods outlined in the following Table 4.

TABLE 4

| Method | Description |
| --- | --- |
| Empty | Remove all data from the Clipboard |
| FormatAvailable | Retrieve the name of the data formats for the data on the Clipboard |

Copying data and pasting data

To copy and paste data to and from the Clipboard, ViP provides the user with two generic methods that apply to all objects except the Clipboard object, namely the ClipboardCopy method and the ClipboardPaste method.

The ClipboardCopy method copies data from an object to the Clipboard. At run time, the user can use this method to copy the text, picture, or DDE link from an application window, chart, check box, combo box, command button, data object, ellipse, group box, line, list box, OLE object, option button, rectangle, scroll bar, static text, text box, or timer. The types of data that the user can specify varies by object. At design time, the user can also use the ClipboardCopy method to copy the internal structure of a ViP object from an application window to the Clipboard.

The ClipboardPaste method pastes data from the Clipboard into a ViP object. At run time, the user can use this method to paste the text, picture, or DDE link from the Clipboard into an application window, check box, combo box, command button, data object, ellipse, group box, line, list box, OLE object, option button, rectangle, scroll bar, static text, text box, and timer. The types of data that the user can paste varies by object. At design time, the user can use the ClipboardPaste method to paste the internal structure of a ViP object from the Clipboard into an application window.

LINKING VIP OBJECTS

A link is a ViP object that the user can use to add functionality to an application. A link connects two other ViP objects and allows an event associated with the source object (i.e., the object the user draws the link from) to execute a script that changes or in some other way affects the destination object (i.e., the object the user draws the link to). The activities generated by the script are called the link behavior.

For example, FIG. 14 shows a visual representation of a link 200 between a data object 202 and a chart object 204, as ViP displays it on the user's screen. In this case, data object 202 is the source object, chart object 204 is the destination object, and SetAndDrawChart is the link behavior. An arrow 206 displayed in the visual representation of link 200 indicates the direction in which the link is drawn.

The SetAndDrawChart behavior is predefined and supplied with ViP. It is the default behavior for a link between a data object and a chart object. The default cause for this behavior is the Execute event associated with the data object.

The script for the SetAndDrawChart link behavior looks like this:

```
'====================================
'Set the data source for a chart and draw the chart.
'====================================
    dim RetCode%, I%
    Dest.ChartSource = Src.Name
    for I = 1 to 24
        RetCode% = Dest.SetColumnUsage(I, DONTCHART)
    Next I
    RetCode% = Dest.DrawChart()
```

Each time the Execute event occurs for the data object, this script sets the data object as the data source and plots the data in the chart.

ViP provides other predefined behaviors and cause events for this link. The user can choose another behavior to change what the link does, or another event to change the activity that causes the link to execute.

Creating a ViP link

The user can create a link and include it in an application only at design time. To create a link, the user draws a source object and a destination object in an application window that is open in the ViP Designer. The user then selects the link object from the Designer Toolbox, clicks the source object to anchor the link, and drags the link to the destination object. ViP displays the link and a label that identifies the default behavior for the link; if no behavior is defined for the link, ViP displays the link and a label that contains ??? (i.e., question marks).

ViP also sets the default cause for the link, enables the link, and assigns default values to other link properties (including Name, LineColor, and LineWidth). The user can change these properties at design time to meet the user's design requirements.

To automate the process of creating links at design time (e.g. using the same link(s) repeatedly throughout an application), the user can create a ViP designer tool application that defines the links the user needs. (See discussion below on creating designer tools.)

Choosing source and destination objects

Any ViP object, except the application window and the Clipboard object, can be used in a link. The objects the user chooses depend on what he wants the link to do and on what the properties, methods, and events of an object allow him to do. His choice of objects may also depend on whether the predefined behavior he needs exists for the link and, if the behavior does not exist, on whether he wants to create it.

Drawing a link in the right direction

Because each ViP object class has a unique combination of properties, methods, and events, the data and activities generated for a link depend on how objects are paired in the link. The predefined link behaviors provided in ViP reflect these differences.

For example, in a link between a text box and a data object, the CellSetQuery behavior is available only when the user draws the link from the text box to a query cell in the data object. The behavior is not available when the user tries to draw a link from the query cell to the text box because a query call cannot function as the source of a ViP link. The CellSetQuery behavior is also not available when the user draws a link from the text box to the title bar or to a column label in the data object because the properties, methods, and events available in these links cannot be used to set a query.

In the link 200 between data object 202 and the chart object 204 shown in FIG. 14, the SetAndDrawChart behavior and the Execute event are available only when the user draws the link from the title bar of the data object to the chart but they are not available when the user tries to draw a link from a column label or query cell. They are also not available when the user draws the link from the chart to the title bar because the Execute event is not available to the chart object, and the data that can be provided to a data object from a chart is different from the data that can be provided to a chart from a data object.

Using objects that are alike

In some cases, the properties, methods, and events available to different objects are very similar. For example, the rectangle and ellipse are two graphic objects that have the same combination of attributes, with one exception. The rectangle has a CornerRounding property. All other properties, methods, and events are the same. This means that the same types of data and activities can be generated from both objects (with the exception of data and activities related to corner rounding). The predefined link behaviors for these objects reflect this similarity.

If the user creates a link from a rectangle to an ellipse and from an ellipse to a rectangle, the same predefined link behaviors are available (e.g. the PictureCopy, PictureLoad, and TextCopy behaviors). Similarly, if the user links a rectangle to a check box and an ellipse to a check box, the same predefined link behaviors are available (e.g. the TextCopy and ToggleState behaviors). This means that the user can accomplish the same task in a link by using a rectangle or an ellipse as the source object. The user can choose the one that best suits the design requirements.

In addition to graphic objects such as the rectangle and ellipse, controls such as the command button and check box can often be used interchangeably in links. For example, the Directory, ItemAdd, and Select behaviors, are among others, are available for a link from a command button or a check box to a list box (see Appendices 1–20 which provides a complete list of behaviors for all of the ViP objects).

Working with link behaviors

ViP provides predefined behaviors for most, but not all, links that the user can create. In many cases, including the examples, discussed earlier, several behaviors are defined for a link so that the user can perform different tasks with the same pair of linked objects. These predefined link behaviors are stored in an external repository, e.g. an ascii file or a Notes Database 11 that is read into a VIPLINK.BHV file 111 (referring to FIG. 2). An example of the VIPLINK.BHV file is presented in Appendix 21, attached hereto. The VIPLINK.BHV file is a read only file to prevent alteration by the user.

When a user draws a link, ViP gives the user access to the list of predefined behaviors associated with that link. For example, the user can link a text box that contains text to the title bar, to a column table, and to a query cell in a data object that is connected to a data source. As the user creates each link, the name of its default behavior is displayed in the link label.

The user can then access the Link Setup dialog box (see FIG. 9) from the right-click menu for the link. The Link Setup dialog box includes two regions, namely a Link Info region 157 and a Behavior region 159. The Link Info region displays information about the link. The Behavior region allows the user to access and modify the behavior of the link.

The Link Info region includes a name box 163 and an order box 164. The name box 163 displays the name of the link that is being modified. The order box 164 displays the order property of the link.

The Behavior region includes a cause box 165, a behavior list box 132, and a script text box 167. The Cause box 165 identifies the event in the source object which triggers the link event, i.e., the event which executes the script attached to the link object. If the user clicks on the cause box, ViP displays a list of events that are associated with the source object. By highlighting one of the events in the list, the user can select another event which will cause the execution of the link behavior. The Behavior list box lists the behaviors for the link, with the default behavior highlighted. The user can selected another behavior from the list by clicking on it. The script text box displays the script for the selected behavior. By clicking on the script editor button 134, the user can access and modify the script that is displayed.

The details of how ViP identifies the predefined behaviors for a link as it is being created by the user are as follows. When ViP starts up, it reads the contents of two .bhv files (i.e., VIPLINK.BHV and USERLINK.BHV—to be described later) into a table in memory, which is a simple relation data structure, i.e., an associative table. As the user is drawing a link between two objects, the underlying code identifies the source and destination object. As soon as it has the identity of the destination object, ViP constructs a query against the internal table in memory for all possible behaviors associated with that combination of source and destination. It organizes the results of that search into some order (e.g. alphabetical order) and it then displays the name of the first behavior as the default behavior.

When the user releases the mouse button, ViP extracts the script for the default behavior and attaches it to the link event in the link object.

When the Link Setup dialogue box is opened up, ViP compiles and displays within the behavior list box 132 (see FIG. 9) a list of all possible behaviors for the relevant combination of source and destination. If the user selects a behavior that is different from the default behavior, ViP extracts the relevant script for that behavior and attaches it to the link in place of the default script (using the generic SetScript method—see Appendix 32).

Changing the behavior of a link

At design time, the user can change the behavior of a link by selecting another behavior in the Link Setup dialog box. The user can also change link behavior by using the Script Editor to change the behavior's script or to add a new script.

The script of a predefined behavior identifies all variables the behavior needs to perform its tasks. The user may, however, want to change the data that the behavior uses or to change what the behavior does.

For example, the script for the Directory behavior (shown in FIG. 15) identifies the directory whose file names are copied to a list box when the behavior is executed. By default, the behavior uses the current directory. The user can, of course, specify another directory, group of files, and/or file type by changing the values for Path$, Pattern$, and/or FileType % in the Directory script. Code comments within the script indicate how to make the changes and provide examples.

When the user changes values in a behavior for a link, the changes affect the behavior of that link only, and the link becomes a custom link. The changes do not affect other links with the same behavior or the copy of the behavior stored in VIPLINK.BHV in the ViP directory. Rather the customized link behaviors are stored in another separate file called USERLINK.BHV 113 (see FIG. 2). The USERLINK.BHV file is a read-write file so the user can add other behaviors, modify existing behaviors in the file and delete behaviors.

ViP uses both the VIPLINK.BHV file and the USERLINK.BHV file to create the list of behaviors that is available for a link and displayed in the Link Setup dialog box.

Setting the event that causes a link behavior to execute

When the user creates a link that has predefined ViP behaviors, one of the events associated with the source object is set as the default cause for the link. The user can change the cause at design time in the Link Setup dialog box.

For example, in a link from a command button to a list box, the Click event for the command button is the default cause for the link. This means that the Directory behavior (i.e., which is the default behavior) or another behavior the user selects from the link will execute each time the user clicks the command button at run time. If the user does not want the Click event to trigger link behavior, another event may be selected. In this case, the user can select a Gotfocus event, a Lostfocus event, or one of the DDE events associated with the command button (see Appendix 18).

Any event associated with the source object in a link can be used as the cause for the link behavior.

ViP processes a source event as follows. Each link registers for the source event which will trigger execution of its behavior or script. When a source event occurs, internal event processor code within ViP identifies the links that are registered for that event and propagates the event to all registered links. For each of those links, ViP raises a link event which causes the execution of the behavior or script that is attached to the corresponding link event in the link.

Controlling other run-time activities

In addition to setting the behavior and cause event for a link, the user can enable and disable a link, and the user can specify whether the link is triggered each time—or only the first time—the cause event occurs. The user can also control the order in which links are triggered.

Enabling and disabling a link

When the user creates a link, the link is, by default, enabled and set to execute every time its cause event occurs at run time. ViP enables the user to change this functionality at design time, to disable the link so that it does not execute, or to leave it enabled and set it to execute once at run time and then be disabled. The user can make these changes through the Link Setup dialog box (e.g. see FIG. 9). The Link Setup function includes a user selectable option 162 labeled "Execute link once, then disable." If the user selects this option, the Link Setup function sets a Autodisable property (see Appendix 18) in the link object to true.

The Autodisable property is set to true, the link is immediately disabled after it fires. This is a very useful feature that avoids the problems that arise if loops are created within the application under design. The autodisable property prevents the loop from closing on itself and altering data among which a selection was just made. That is, the user need not worry about constructing the application to avoid closed loops within the code but can simply use the autodisable property to break any programming loops that produce undesired results.

The user can also enable and disable a link at run time through a script attached to an event in the application. For example, the user can design a link that is initially disabled and then enable it at run time by setting the Enabled property of the link object to TRUE in a script:

Link1.Enabled=TRUE

Specifying the order in which links are executed

Figure 16:
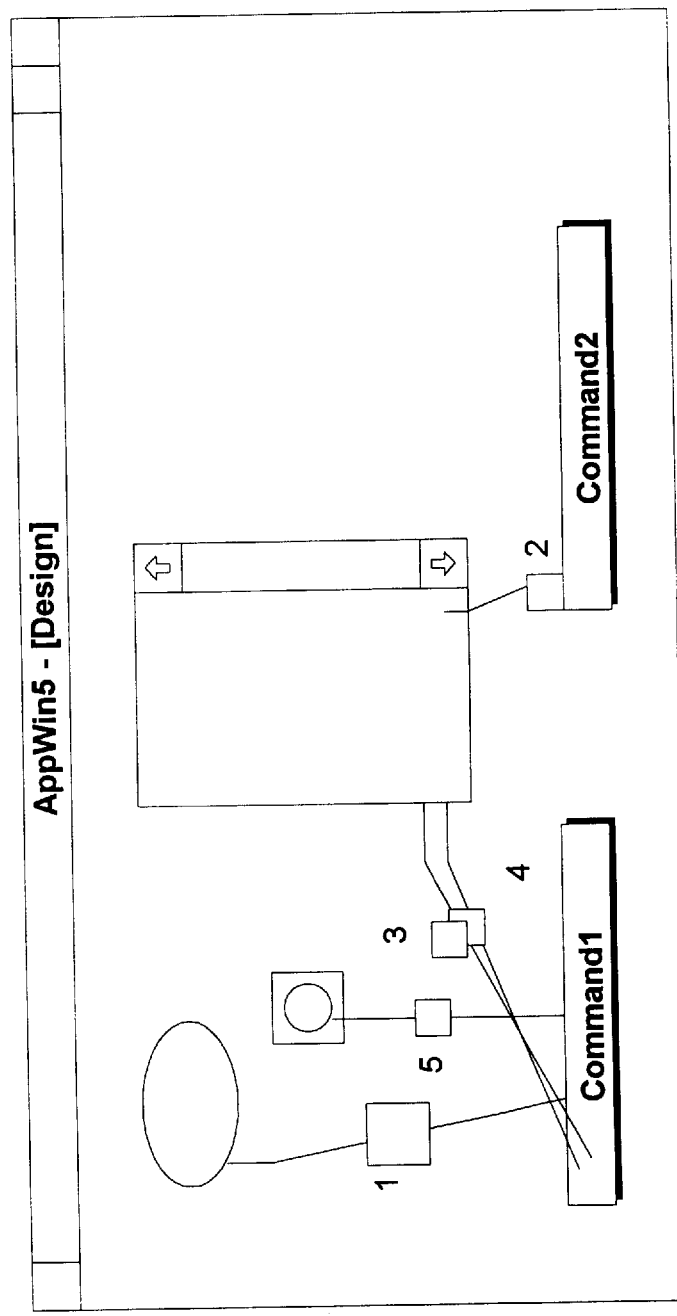
FIG. 16 shows multiple links from two source objects.

By default, ViP executes links by object and by cause event in the order in which the links were created in an application window. For example, FIG. 16 shows an application window that contains five links, numbered from 1 to 5 to indicate the order in which they were created by the user. The first, third, and fifth links connect Command1 to the ellipse, the list box, and the time, respectively; and all three are triggered by a Click event for Command1. The fourth link connects Command1 to the list box and is triggered by a DDEActivity event for Command1. The second link connects Command2 to the list box and is triggered by the Click event for Command2. By default, the links execute as follows. When the user clicks Command1, the first, third, and fifth links execute, one after the other. When a DDEActivity event occurs, the fourth link executes. When the user clicks Command2, the second link executes.

The user can change the execution order for links at design time by specifying another order number for a link in the Link Setup dialog box. Referring to FIG. 9, the Link Setup menu 130 includes an Order box 164. When the user enters another number in this box, ViP automatically renumbers all links whose order numbers are affected by the change.

Managing links at design time

When links are created at design time, the user can identify and keep track of them in several ways. The user can change a link's name, line color, and/or line width property to uniquely identify a link in an application window. The user can also selectively show or hide links in an application window, view information about the links the user creates, and test link functionality.

Naming links

The default name of a link, which represents the programmatic name of the link, consists of the prefix Link and a number that makes the link name unique in the application. The link name is displayed in the title bar of the right-click menu for a link and in the Link Setup dialog box, and can be used in scripts to retrieve the information about a link or to enable or disable a link.

The user can change the name of a link at design time by changing the Name property in the Link Setup dialog box. The user cannot change the name of a link at run time.

Change link color and line width

ViP provides eight colors and five line widths that the user can use to group or differentiate links in an application window at design time. The default color for a link from any object to a query cell in a data object is green; the default color for all other links is red. The default line width for a link in one pixel.

The user changes line color and width in a Lines & Color dialog box, which is accessible from the right-click menu of a link (see FIG. 8).

Showing and hiding links

The user can also manage links at design time by using a Designer Tool to selectively show or hide links in an application window that is open for design by changing the visibility property for the link. The user can choose to show all links, show links to or from selected objects, or hide all links.

Customizing link behaviors

The user creates a new link behavior by defining the behavior in the USERLINK.BHV file. The user does this by using any ASCII text editor to enter a name, a summary, source and destination information, comments, and a script for the behavior. When the user saves the updated file, the new behavior is available to links between the source and destination objects specified in the behavior definition.

The user can modify a link behavior in two ways. To modify the behavior for an individual link, the user can change the behavior script in the Script Editor. To modify a behavior for all links in which the behavior is used, the user uses an ASCII text editor to change the definition of the behavior in the USERLINK.BHV file. If the user wants to modify a behavior supplied by ViP in the VIPLINK.BHV file, the user must copy the behavior definition from the VIPLINK.BHV file to the USERLINK.BHV file. The user can then change the name of the behavior, the summary, source, and destination information, the comments, and/or the script for the behavior in USERLINK.BHV. The original behavior in VIPLINK.BHV and the modified behavior in USERLINK.BHV are then both available for links in ViP.

APPLICATION STRUCTURE

ViP API

A ViP application is a collection of one or more windows, called application windows, that contain objects. There is an AppWindow object that represents the application window itself. ViP objects, along with their properties, methods and events, constitute a ViP Application Programming Interface (API). The API also includes functions that are not associated with particular objects.

Modules in an application

Figure 17:
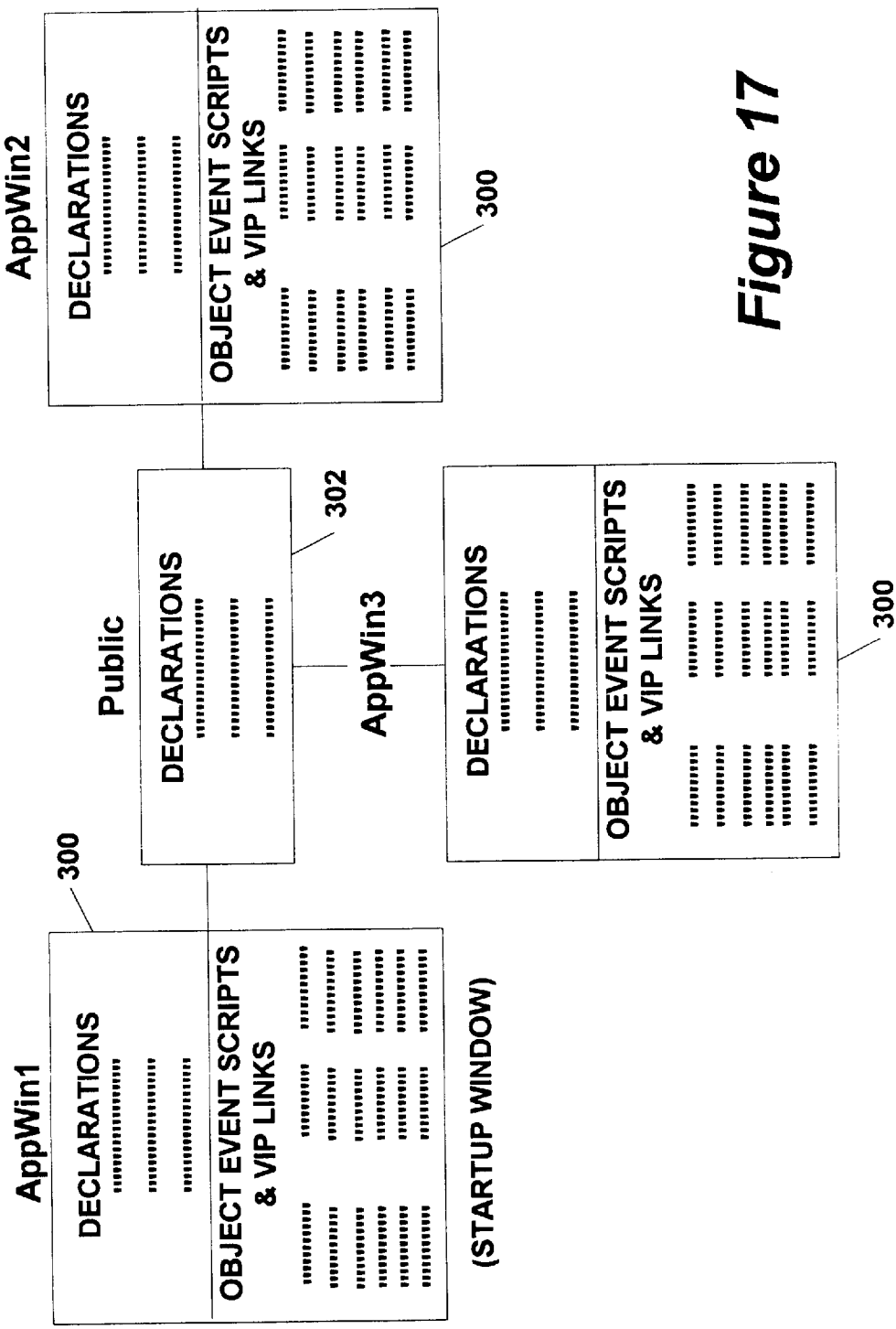
FIG. 17 is a block diagram of the structure of a ViP application.

Referring to FIG. 17, ViP provides two kinds of modules: application window modules 300 and Public modules 302. All the scripts written for all the objects in an application window are compiled together to form an application window module 300, which contains all of the executable LotusScript code (including ViP API functions) for the application window. One application window module exists for each window in an application.

Public module 302 is generated by compiling a Public script. This script is separate from any application window and not associated with any ViP objects. It contains only variable declarations and procedure and type definitions. The user can use the public declarations and definitions the user puts in the Public script in any other script in the user's application. For instance, if the user defines a public procedure PublicProc in the Public script, the user can call PublicProc from any script in any of the user's application windows.

To declare public variables or to define public types, subroutines, or functions in the Public script, use the LotusScript keyword public. The user can use the public keyword only in the Public module. ViP prevents the use of public in other modules.

Special scripts in an application window module

Among the scripts the user can write for the AppWindow object (i.e., the application window itself) are the Declarations, Init, and Term scripts.

The Declarations script contains only variable declarations and procedure and type definitions. The declarations and definitions in the Declarations script are available to all the objects in the application window. Unlike other scripts in an application window, the Declarations script is not associated with an event.

The Init script executes once when the Init event occurs (see Appendix 1), i.e., when the application window is loaded into memory. The Init script is useful for carrying out instructions that initialize the application window. For instance, if the user wants a list box to automatically contain items when the window is opened, the user puts instructions to fill the list box in the Init script (e.g. by using an ItemAdd method).

The Term script executes once, when the Term event occurs (see Appendix 1), i.e., when the application window is removed from memory. The Term script is useful for carrying out instructions that do clean up work before the window is unloaded. For example, the user may want to save files or data that was modified.

The ViP Connection Record

The connection registry, which is an internal connections list, contains a list of connection records. There are two parts to a connection record: the physical part and the logical part. The physical part describes the physical location of the data, e.g. server name and database. The logical part describes how the data is stored, e.g. the table/column names for relational databases or view/form and field structure for Lotus Notes.

When creating a data object, the user specifies the connection name. To do this, the user may pick from a list of existing connections or define a new one.

There are several important aspects about the application connection-registry and its relation to the data object. Each data object contains a Connection property (see Appendix 15). This is a name that refers to a database connection record in the per-application registry. The database connection registry belongs to the application as a whole, not to any screen. The database registry contains zero or more database connections.

A database connection is defined once within each application. Thus, the connection name is unique within the application. However, another application can use the same connection name for the same or a different database.

Internally, a ViP data access layer matches the connection based on the values of the Model, Driver/Server, and Database.

On disk, the ViP application file contains the application information and the database registry containing zero or more connections. These connections are implemented as Bento (container file format) objects.

When a ViP application is started, the application information and all the connections are read into memory. When a ViP application under design is saved to the disk, the list of connection records is stored to disk. When a ViP application is loaded, the connection information is restored.

In memory, each connection has a connection name, definition information, and runtime information. The definition information includes the information mentioned above. The runtime information includes what levels are actually connected and what ID and/or password was used for the runtime connection to the level.

The ViP application developer assigns each connection record a name. This name acts as a unique key. Once a connection record is defined, the ViP developer can directly manipulate it with two functions: a ConnectionGetDef function and a ConnectionSetDef function. The ConnectionGetDef function retrieves, as values, the current definition of a data source connection based on the name of the connection. The ConnectionSetDef Function specifies the current definition of a data source connection.

Scope of declarations and definitions

Scope is the area of an application in which a declaration or definition is known. ViP applications have three scopes: public, module, and procedure.

Public variable declarations and procedure and type definitions in the Public module have public scope. That is, they are known to all the modules in the application. For instance, if the user declares a public variable in the Public module, the user can then access and modify that variable from a script in any application window module in that application.

Variable declarations and procedure and type definitions in the Declarations script of an application window module have module scope. That is, they are known to all the objects in that application window. For instance, if the user declares a variable in a Declarations script, the user can then access and modify the value of that variable from any other script in the same application window as the Declarations script. Private variables, procedures, and types in the Public module also have module scope. They are known only within the Public module.

Variables and parameters declared in a procedure have procedure or local scope. They are known only within the procedure in which they are declared. When the procedure ends, the variables and parameters no longer exist.

Compiling applications

An application window must be compiled before it will load and execute. A compiler within ViP translates the scripts into LotusScript object code. Both the uncompiled and compiled versions of the application file have a .VIP extension. An application window is compiled with the most recent version of the Public module.

The user can either compile the Public script and application windows explicitly, using ViP Designer menu commands that are accessible through the menu bar of the designer window, or ViP will compile them automatically when the user saves the application and when the user runs it. The user can also compile individual scripts explicitly from the Script Editor to check syntax.

The Public module is compiled before any other modules in an application are compiled because it may contain declarations and definitions that can be used by all the other modules in the application. When the Public module is compiled, ViP automatically loads it into memory so it is available to other modules when they are compiled. If the user compiles an application window or an individual script, and the Public module needs to be compiled, ViP automatically compiles the Public module before compiling the application window or script.

The user can explicitly compile application windows using ViP Designer menu commands, and individual scripts using the Script Editor. For example, the compiler functionality is accessible through a drop down menu 272 that is associated with a Script option in the menu bar of the Script Editor (see FIG. 5).

If the user runs an application from the Designer, ViP compiles the Public module first, if necessary, and any application windows that have never been compiled or that were compiled with a previous version of the Public module. Application windows are compiled as they are opened.

If the Public module or startup window (described below) does not compile successfully, ViP opens the Script Editor, displays the script containing the first error, and highlights the line in error. If any other application window does not compile, a runtime error is generated.

If the user runs an application from the ViP Desktop, ViP does not compile any modules, even if they were never compiled. If ViP encounters an error at run time because an application window needs to be compiled or recompiled, it will be unable to open the window. Unless the user has included a statement to handle the error by halting the application (using the API function AppHalt), ViP will continue to run the application if possible. That is, ViP still allows other windows to be opened.

Load order in an application

ViP loads the Public module into memory as soon as the application starts running. When an application window is opened, ViP loads its associated module into memory and executes the Init script, if there is one. If a runtime error occurs in the Init script and the user has not included statements to handle the error, ViP continues running the application. Otherwise, the error-handling statements are executed.

The first window to be opened and executed when a ViP application is run is the startup window. If an application has multiple windows, a window can open other windows using the OpenAppWindow function.

Execution order in an application

Because ViP applications are driven by events, the order in which scripts are executed is determined by the design of the user's application and how other users interact with the application. As events occur, the scripts attached to them are executed.

The user can impose as much or as little control over the ordering of events as the user's application requires. There may be occasions when the user needs to restrict the order in which events occur. For example, if the user's application makes a series of calculations, one calculation may depend on another. There are a number of ways the user can prevent the dependent calculation from being performed until the other calculation is performed. For example, if the script associated with Event B depends on the result of the script associated with Event A, the user could disable the object Event B is associated with (Object B) by setting its Enabled property to FALSE. Then the script for Event A could as a final step enable Object B. Another way to handle this situation would be to set a flag at the end of the script for Event A. Then, at the start of the script for Event B, the user could include a conditional statement that checks the flag to make sure that Event A occurred. If Event A has not occurred, then the script for Event B displays a warning message and terminates.

Events can occur in three ways. Events can occur as a result of a user action. For example, a user clicks a command button and the Click event occurs for that command button. Events can occur as a result of a system action. For example, a specified amount of time elapses and the Timer event occurs. And, events can occur as a result of the execution of a statement in a script. For example, when a script statement that assigns text to a text box executes, that causes the Change event to occur for that text box.

The operating system (e.g. Microsoft Windows) handles events that are caused by user or system input. The operating system places the input in a message queue. ViP checks the queue and generates ViP events based on the queued messages. Since the input is ordered serially, ViP receives messages and executes event scripts serially. The script for the first event to occur is executed and completed before the script for the second event begins, and so on.

Events caused by the execution of statements in a script are nested; that is, one event can be initiated before a previous event completes. The script for the most recently initiated event must complete before the script for the event that initiated it can continue, and so on. While the nested events are executing, other events, if any, remain in the Windows queue until the nested events finish executing. Then control returns to Windows, and the queued events are executed in order, first to last.

When execution of both a link behavior and a script is caused by the same action, the script executes first.

CREATING DESIGNER TOOLS

Designer tools are ViP applications that help the user design other ViP applications. ViP enables the user to create designer tools much in the same way as the user creates any ViP application.

Using designer tools requires two applications: the tool, which is an executing ViP application, and another application open for design (referred to as the design application or application under design). The tool includes user-entered scripts that enable it to manipulate objects in the design application. For example, the tool might include a script that sets properties for the currently selected object or objects in the design application. If the script is attached to the Click event for a command button in the tool, it will execute when the user or another application designer clicks the command button.

A designer tool is able to manipulate objects in an application being designed by declaring a special variable called an object reference and associating it with an object in the design application. The tool can then refer to that object in the design application indirectly, through the object reference. The process of establishing an association between an object reference and an object is called binding.

The user can declare an object reference of a specific object class, for instance Rectangle, or of a generic class, called Object, described below.

Generic object references

Generic object references are special in that the user can bind them to objects regardless of the class of the object. This feature is very convenient for creating designer tools because the user usually does not know in advance what objects in a design application the user's tool will be working on. A detailed description of the generic object is presented in Appendix 20.

A generic object reference can be bound to any class of ViP object because the Object class possesses only the generic object properties. Generic properties are properties that ViP objects have in common. For instance, all ViP objects have the generic properties Left, Right, Top, and Bottom, which determine the position of the object in the application window or the position of the application window on the screen. Also, most of the ViP objects have the generic property BackColor, which determines the background color of an object.

The user can get and set only generic properties through a generic object reference. If the user binds a generic object reference to an object and tries to get or set the value of a generic property not associated with that object, the attempt is ignored at run time. For instance, if the generic object reference ObjRef is bound to a command button, the statement ObjRef.ForeColor is ignored at run time because the Command Button object does not have a ForeColor property. If the user tries to get or set the value of an object-specific property using a generic object reference, an error is generated at compile time. For instance, the statement ObjRef.CommandButtonStyle does not compile because CommandButtonStyle is not a generic property.

How to bind object references to objects

The Bind form of the LotusScript SET statement (see Appendix 24) can be used to bind an object reference to an object or a set of selected objects in a design application window. The Bind form of the SET statement takes a string parameter that identifies an object by its name and the application window in which it resides, and returns a reference to the object.

The string parameter the user passes to the Bind form of the SET statement can have any of the formats listed in Table 5, depending on the object to which the user wants to bind. The table pertains to binding object references to objects in a design application.

TABLE 5

| Format | Object reference type | Specifies |
| --- | --- | --- |
| "\" + Object Name $ | A matching object type or the generic type | A named object in the current design application window |
| "\AppWindow" | An AppWindow Object or the generic type | The AppWindow object in the current design application window |
| AppWindow Name $ + "\" Object Name $ | A matching object type or the generic type | A named object in a named application window in the current design application design application |
| AppWindow Name $ + "\ AppWindow" | An AppWindow object or the generic type | A named appWindow object in the current design application |
| " "(null string) | Any object type, including the generic type | The current object selection in the current design application window; the current design application window, if now objects are selected. |

Note that the set of objects that are affected by operations performed on the object reference changes as the object selection changes.

The Binding Process

To bind an object reference to an object in a design application, the user declares an object reference to a specific object class or to a generic class, Object. If binding to a named application window in the current design application, the user uses the Name property of that application window to get its name. If binding to a named object, rather than the currently selected object or objects, the user gets the name of the object to which the user wants to bind the object reference. Then, the user binds the object to the object reference.

After the object reference is bound, the user can manipulate the object individually through the object reference.

The sample script shown in FIG. 18 is an example of how to bind an object reference to an object. When executed, the sample script declares an object reference to the AppWindow class, binds it to the current design window, and decreases the value of the ClientWidth property for the window.

Binding Generic Object References to Objects

If the user wants to manipulate objects of different classes in a design application, the user can bind a generic object reference to those objects. Then, the user can get and set generic properties for the objects, as shown in FIG. 19.

Figure 20:
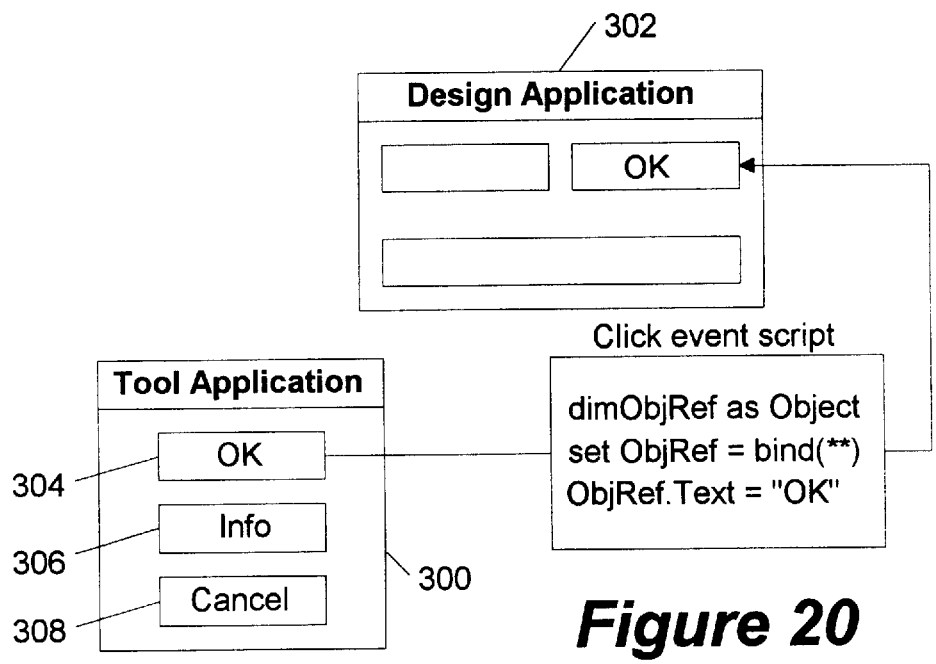
FIG. 20 illustrates using a generic object reference to access a currently selected object.

FIG. 20 shows the relationship between the generic object reference in the above example and the object to which it is bound. A running application 300, which is the tool application, operates on an application under design 302. The tool application includes three command buttons 304, 306, and 308, each of which has an associated text string. For example, command button 304 contains the text string "OK". Each command button includes a script, an example of which is shown for command button 304 (note that it is the same script shown in FIG. 19). In this example, the script executes when a click event occurs on the relevant command button. This particular script binds ObjRef to a generic object, which is the object that is currently selected in the design application. The tool sets the text of the currently selected object or objects in the design application to one of three strings, depending on which of the three command buttons in the tool window is selected.

In the illustrated example, the command button at the top right of the design window is currently selected. Therefore, when the script shown is executed, the string "OK" is assigned to the Text property for that command button. The same script is executed when the text box at the bottom of the design window is selected. The text box is assigned the string "OK." If the currently selected object has a Text property, this script will assign it "OK." If the currently selected object does not have a Text property, the Click event script is ignored.

Getting and setting values of multiply selected objects

Since there may be more than one selected object in the design application, operations that the user performs on the currently selected object or objects through the object reference will act on all the selected objects. For instance, when the user sets a property, the new value for that property is assigned to all the selected objects.

In a multiple selection, there is a most-selected object, which is distinguished by red selection handles that ViP displays around that object when it is selected. All other selected objects have gray selection handles. A GET operation on the multiply selected objects retrieves the appropriate value from the most-selected object. For instance, assume an object reference called CurrentObject is bound to the current object selection. If three rectangles are selected, one with a red background color, one with blue, and one with green, the following statement returns the color of the most-selected object: color %=currentObject.BackColor. If the green rectangle is the most-selected object, then GREEN is returned.

When a SET operation is performed, the assignment modifies the appropriate value for all the selected objects. In the same scenario, the statement CurrentObject.BackColor= RED sets all three rectangles to the background color RED.

The designer tool script shown in FIG. 21 left justifies selected objects based on the value of the Left property for the most-selected object.

Referring to objects in the design window for a tool

ViP provides methods that allow the user's tools to access single objects in the current design window. The user can, for instance, get the name of each object or each selected object in an application window, one at a time. The user can also determine the selection state of an object, ViP also provides an event that notifies the user's tool when any selection changes.

Getting the names of objects in the design window

To get the names of objects in a design window, the methods listed in Table 6 are supported by ViP.

TABLE 6

| Method name | Purpose |
| --- | --- |
| AppWindow.FindObject | Returns the name of the first, last, next, or previous object from a list of objects in a design window, regardless of the selection state of the |

TABLE 6-continued

| Method name | Purpose |
| --- | --- |
| | object. (ViP maintains the list in order of the value of the Layer property for each object.) (See Appendix 25) |
| GroupObject.FindObject | Returns the name of the first, last, next or previous object from a list of objects in a group. (See Appendix 25) |
| AppWindows.FindSelectedObject | Returns the name of the first, last, next, or previous selected object from a list of objects in a design window. (See Appendix 26) |
| AppWindows.MostSelectedObject | Returns the name of the most-selected object in a design window. (See Appendix 27) |
| AnyObject.FindLink | Returns the name of the first, last, next, or previous link from a list of links to the object or from a list of links from the object. (See Appendix 28) |

Getting and setting selection states

To get and set the selection state of an object in a design application through the scripts the user writes, the methods listed in Table 7 are supported by ViP.

TABLE 7

| Method name | Purpose |
| --- | --- |
| AppWindow.GetSelectedState | Returns an integer value that indicates whether the specified object in a design window is selected, not selected, or most-selected. (See Appendix 29) |
| AppWindows.SetSelectedState | Sets the selection state of an object in a design window. If the object specified is currently the most-selected, changing its selection state will result in another selected object, if any, being promoted to most-selected object. (See Appendix 30) |

Getting and setting scripts

To get and set the script of an object in a design application through the scripts the user writes, the methods listed in Table 8 are supported by ViP.

TABLE 8

| Method name | Purpose |
| --- | --- |
| ObjectRef.GetScript(EventName$) | Returns the contents of a script initiated by an object event. (See Appendix 31) |
| ObjectRef.SetScript(EventName$, Script$) | Sets the contents of a script initiated by an object event. (See Appendix 32) |

Determining when a selection changes

If the user wants the user's tool to be notified when any selection in a design window changes, set the DesignerNotify property (see Appendix 33) for the tool window to TRUE and write a script for the Designer event, attached to the tool window. Each time a selection changes in the design window or the user selects another design window or application, the Designer event is triggered and the script is executed.

Sample designer tool

Figure 22:
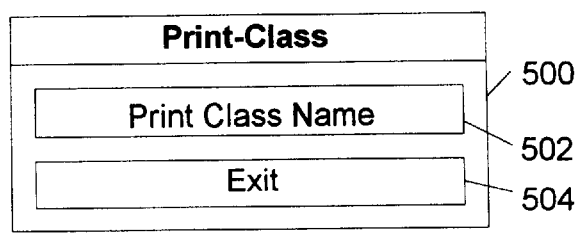
FIG. 22 is a sample designer tool layout.
Figure 26:
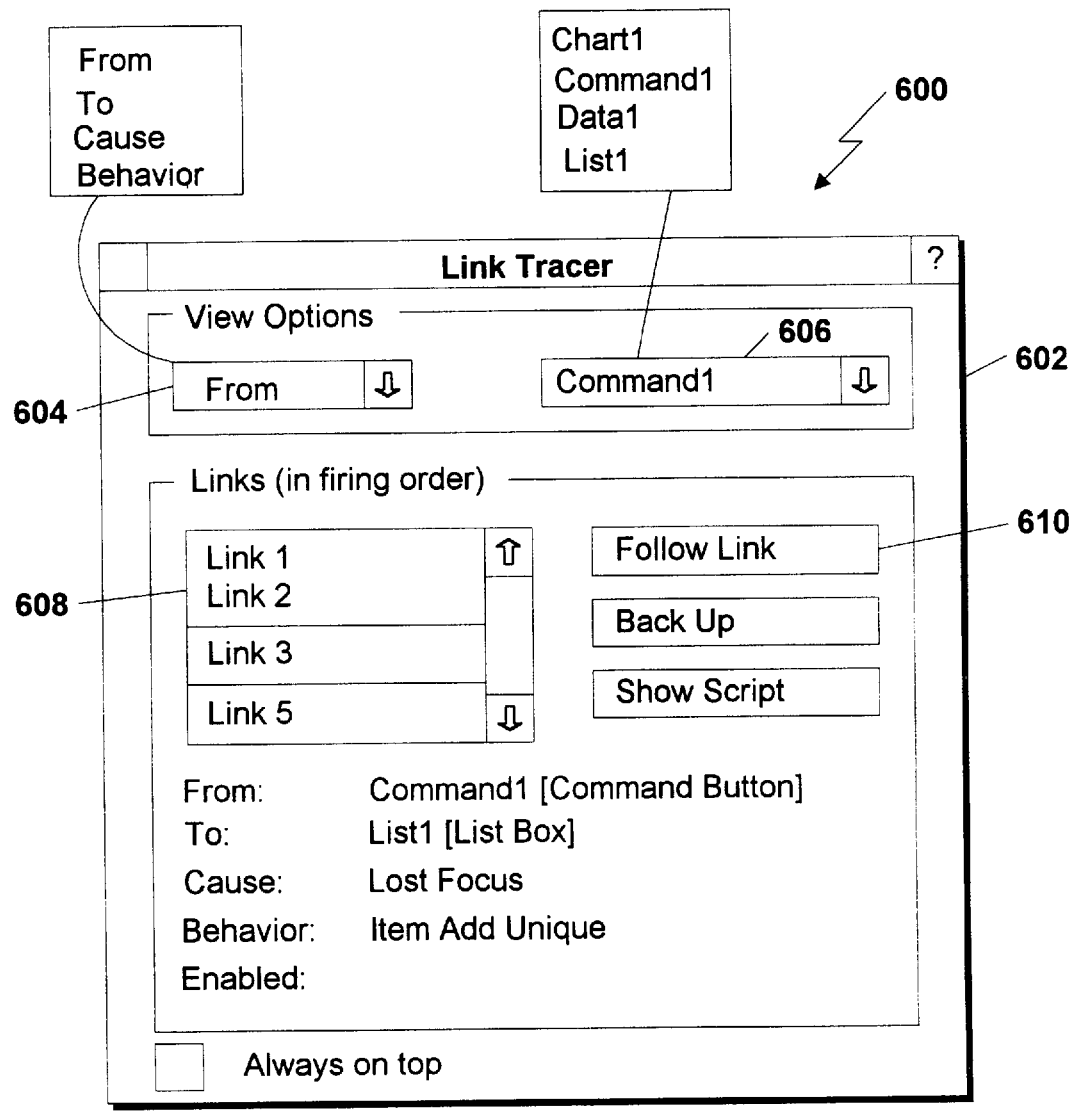
FIG. 26 is a dialogue box for the link tracer.

A sample designer tool 500 shown in FIG. 22 and discussed below demonstrates the use of a generic object reference to manipulate the currently selected objects in a design application and the use of the FindSelectObject method to access each selected object singly.

The designer tool has two command buttons 502 and 504. Command button 502 is a Print Class Name button and has a script attached to it that walks through the selected objects in the application under design and prints the class name for each object. Command button 504 is an Exit button which has a script that ends tool execution.

This designer tool acts on multiply selected objects in a design application. The script attached to the Print Class Name button prints the class name of each selected object. For instance, if a selected object is a command button named Command1, the tool prints "The class of the object Command1 is CommandButton."

FIGS. 23–25 present an Init script for the tool and the two scripts attached to the command buttons in the tool.

Referring to FIG. 23, using the DIM instruction, the Init script declares an object reference to an instance of AppWindow (step 510) and then using the SET instruction, binds it to the current window in the tool application (step 512). Finally, the Init script sets the TopMost property for the window to TRUE so it remains on top (514).

Referring to FIG. 24, the Print Class Name command button script declares a generic object reference (step 520). Then, it declares an object reference to an instance of AppWindow and binds it to the currently selected object or objects in the design application (steps 522 and 524). Next, it declares a variable NextObj to hold the instance name of a selected object (step 526) and uses the FindSelectObject method to get the name of the first selected object (step 528). While there are selected objects, the script binds the generic object reference to a selected object (step 530); prints the class name for the object (step 532); and finds the next object (step 534).

This script is for the Exit command button simply closes the application window.

To run the sample designer tool, the user simply opened an application window for design that has more than one object. The objects can be of different classes because the sample tool uses a generic object reference and therefore can manipulate objects regardless of their class. The user then runs the sample tool. With the sample tool running, the user selects one or more objects in the application open for design. With the objects selected, the user then selects the Print Class Name command button in the sample tool to execute the above script and print the class names for the selected objects. To end the sample tool application, the user selects the Exit command button in the tool.

The Link Tracer

Another designer tool that illustrates the usefulness of the binding mechanism described herein is a Link Tracer. The layout to the user interface for the Link Tracer 600 is shown in FIG. 23. With the Link Tracer, a user can trace the flow of control of the links in a ViP application window open for design. The user can view but not modify the properties and behaviors of links with this utility. With Link Tracer, the user can view the following information:

all links to or from a particular object;

all properties of a particular link;

all links whose scripts are executed when a particular event occurs; and all links that have a particular behavior.

The Link Tracer 600 includes a view options area 602 which has two combo boxes 604 and 606 that allow the user to choose the particular view of the links that are in the application under design. When the user clicks on combo box 604, Link Tracer displays a list of four different options for viewing the links that are within the application under design: (1) all links "From" a selected object; (2) all links "To" a selected object; (3) all links that are attached to a selected "Cause" (or event); and (4) the link having a selected "Behavior". If the user selects either the "From" or the "To" option in combo box 602, combo box 604 displays a list of the source and destination objects that are in the application under design. If the user selects the "Cause" option, combo box 604 displays a list of events in the application which will trigger the execution of a link. And, if the user selects the "Behavior" option, combo box 604 lists the behaviors of the links within the application under design.

Link Tracer also includes a links information display area 606 which includes a list box 608 for displaying a list of links that satisfy the viewing criteria that are selected in view options area 602. It also includes a "Follow Link" button 610, a "Back Up" button 612, and a "Show Script" button 614.

The following chart describes the functionality of the Link Tracer. The left column indicates the combination that the user has selected. For example, the first entry implies that the user (1) has selected the "From" option in combo box 604; (2) has highlighted a link that is displayed in list box 608; and (3) has clicked the "Follow Link" command button. The right column indicates what action is carried out by the link tracer.

| SELECT... AND CLICK | TO |
| --- | --- |
| From...Follow Link | Follow the selected link to its destination and display the links from that object. |
| From...Back Up | Display the links from the previously selected object, if any. |
| From...Show Script | Display the script for the selected link (read-only). |
| To...Follow Link | Follow the selected link to its source and display the links to that object. |
| To...Back Up | Display the links to the previously selected object. If the user did not previously select an object, no links are displayed. |
| To...Show Script | Displays the script for the selected link in a read-only dialog box. |
| Cause...Follow Link | Command button is disabled. |
| Cause...Back Up | Command button is disabled. |
| Cause...Show Script | Displays the script for the selected link in a read-only dialog box. |
| Behavior...Follow Link | Command button is disabled. |
| Behavior...Back Up | Command button is disabled. |
| Behavior...Show Script | Displays the script for the selected link in a read-only dialog box. |

The Link Tracer includes an Init script in which the tool binds to an application window, in the manner previously described, and registers for the designer event. The designer event script uses the FindObject method to compute a list of all of the objects in the application window. During this process, the script builds a doubly linked list of all links to and from the objects that are identified. In response to a viewing option selection by the user, the script uses the doubly linked list of objects to identify all of the links which satisfy the viewing option criteria and it populates the relevant list boxes with the names of the links and the objects which are identified. The links that are displayed from or to a particular object are displayed in firing order as indicated by the order property of the links The Link Tracer refreshes both the doubly linked list and the list of objects on each designer event.

The "Follow Link" command allows the user to walk through the doubly linked list starting with a given object and link and identify the objects and other links that are downstream from that link. Similarly, the "Back Up" checks to see that there is indeed an object to back up to and then walks the list in reverse order. In both case, the nodes of the list (i.e., the from and to objects that are connected by the selected link) as well as the trigger for the link event and the name of the associated script are displayed at the bottom of the Link Tracer dialog box 600. This information is obtained by querying the objects properties, using the appropriate commands described in the appendices attached hereto.

The "Show Script" command button brings up a new application window that contains a textbox. It uses the GetScript method to populate the textbox with the text of the script associated with the link event.

Other embodiments are within the following claims.

APPENDIX 1

Application Window

An application window is a ViP object that is an instance of the AppWindow class.

Properties

An application window has the following properties:

| | | |
|---|---|---|
| BackColor | DDEServerEnable | Pattern |
| Bottom | Description | PatternColor |
| ClientHeight | DesignerNotify | PictureAutoSize |
| ClientWidth | Enabled | PictureJustify |
| Cursor | GridActive | Right |
| DDEClientActivateOnOpen | GridColor | ScaleMode |
| DDEClientActive | GridHeight | SystemMenu |
| DDEClientDataType | GridVisible | Text |
| DDEClientItem | GridWidth | TitleBar |
| DDEClientMode | Height | Top |
| DDEClientServer | Hwnd | TopMost |
| DDEClientStatus | Left | Visible |
| DDEClientTimeOut | MaxButton | Width |
| DDEClientTopic | MinButton | WindowState |
| DDEServerActive | Name | WindowStyle |

Methods

The application window suppports the following methods to manipulate application windows:

| | | |
|---|---|---|
| ActiveControl | FindObject | MenuSetAccelerator |
| Class | FindProperty | MenuSetChecked |
| ClipboardCopy | FindSelectedObject | MenuSetEnabled |
| ClipboardPaste | GetProperty | MenuSetText |
| CursorCopy | GetScript | MostSelectedObject |
| CursorLoad | GetSelectedState | Move |
| DDEClientExecute | MenuDelete | PictureCopy |
| DDEClientPoke | MenuFindId | PictureLoad |
| DDEClientRequest | MenuGetAccelerator | Position |
| DDEUseData | MenuGetChecked | Repaint |
| DoEvent | MenuGetEnabled | SetFocus |
| DoEventArgs | MenuGetLevel | SetProperty |
| FindEvent | MenuGetText | SetScript |
| FindLink | MenuInsert | SetSelectedState |

App - 1

Functions

The following ViP functions close or open application windows:

AppHalt            CloseAppWindow            OpenAppWindow

Events

In addition to (Declarations), the user can create scripts to respond to the following application window events:

| | | |
|---|---|---|
| Activate | Designer | MenuOpen |
| DDEActivity | Error | Positioning |
| DDEClientArriving | Help | RequestClose |
| DDEServerExecute | Init | Term |
| DDEServerPoke | MenuAction | User |
| Deactivate | | |

APPENDIX 2

Command Button

A command button is a ViP Windows control object that is an instance of the CommandButton class. The user can use command buttons to let other users initiate an action with a click. When the user clicks on a command button, ViP changes the appearance and the value of the State property of the command button. A command button provides two options to the user:

- A pushed in command button indicates that the command button option is selected and the option is in effect.
- A raised command button indicates that the command button is deselected and the option does not apply.

By default, a command button acts as a separate, unrelated control when it is grouped with other command buttons and must have the focus to react to when the user presses ENTER or ESCAPE. However, the user can change the default settings for a command button so that it behaves in the following ways:

- A command button can react to grouping. It can function in a group box either as a check box or an option button. In these cases, the user can use command buttons to display a group of related options to the user.
- A command button can be the Default button or Cancel button for an application window if the user specifies non-default values for either the Default or Cancel property.

Command buttons can contain pictures.
The user can also use command button events to initiate event procedures.

Properties

Use the Command Button right-click menu to set the properties of
a command button while laying out the application window. Use
event procedures to set command button properties at run time. A
command button has the following properties:

| | | |
|---|---|---|
| Bottom | DDEServerEnable | Name |
| Cancel | Default | Parent |
| CommandButtonStyle | Description | PictureAutoSize |
| Cursor | Enabled | PictureJustify |
| DDEClientDataType | FontName | Right |
| DDEClientItem | FontSize | State |
| DDEClientMode | FontStyle | TabIndex |
| DDEClientServer | Height | TabStop |
| DDEClientStatus | Hwnd | Text |
| DDEClientTimeOut | Justify | Top |
| DDEClientTopic | Layer | Visible |
| DDEServerActive | Left | Width |

Predefined link behaviors

The user can use predefined link behaviors to respond to command
button events. A command button has the following link behaviors
depending on whether it is the source or the destination of a
link:

As the source:

| | |
|---|---|
| CellClearQueryAndExecute | PictureCopy |
| CellSetData | PictureLoad |
| CellSetQuery | PreviousRow |
| CellSetQueryAndExecute | PrintChart |
| Clear | PrintPreview |
| Directory | PrintReport |
| DoEventClick | RowDelete |
| DrawChart | RowNew |
| EditChart | Select |
| ExecuteQuery | SetTimerInterval |
| ExecuteUpdate | StateCellSetData |
| ExecuteVerb | StateCellSetQuery |
| ExportText | StateCellSetQueryAndExecute |
| FillFromFile | StateSetProperty |
| FirstRow | StateSetTimer |
| ItemAdd | StateSetValue |
| ItemAddUnique | StateTextCopy |
| ItemFind | TextCopy |
| IterateOverDataObject | ToggleState |

App - 4

LastRow
NextRow

ToggleTimer
ToggleVisibility

As the destination:

CopyValue
DoEventClick
PictureCopy
PictureLoad
PictureLoadFromList
SetStateFromCell
StateSetProperty
StateTextCopy TextCopy
TextCopyFromCell
TextCopyFromGroup
TextCopyFromList
TextCopyFromMultiList
ToggleState
ToggleVisibility

Methods

In scripts, the user can use the following methods to manipulate command buttons:

Class
ClipboardCopy
ClipboardPaste
CursorCopy
CursorLoad
DDEClientExecute
DDEClientPoke
DDEClientRequest
DDEUseData DoEvent
DoEventArgs
FindEvent
FindLink
FindProperty
FontSelect
GetProperty
GetScript
Move PictureCopy
PictureLoad
Position
Repaint
SetFocus
SetProperty
SetScript

Events:

The user can create scripts and (in some cases) links to respond to the following command button events:

Click
DDEActivity
DDEClientArriving

DDEServerPoke
GotFocus
LostFocus

User

App - 5

APPENDIX 3

Option Button

An option button is a ViP Windows control object that is an
instance of the OptionButton class.  The user can use option
buttons to let other users initiate an action with a click.
When the user clicks on an option button, ViP changes the
appearance and the value of the State property of the option
button.  An option button provides two options to the user:

- A filled in option button indicates that the option button
  option is selected and the option is in effect.
- An empty option button indicates that the option button is
  deselected and the option does not apply.

The user can use option buttons to display a group of related
options to the user.  Users can select only one option button
from a group.  Selecting one option deselects the previously
selected button.  The user can also use option button events to
initiate event procedures.

Properties:

Use the Option Button right-click menu to set the properties of
an option button while laying out the application window.  Use
event procedures to set option button properties at run time.  An
option button has the following properties:

| | | |
|---|---|---|
| BackColor | Description | Parent |
| Bottom | Enabled | Right |
| Cursor | FontName | State |
| DDEClientDataType | FontSize | TabIndex |
| DDEClientItem | FontStyle | TabStop |
| DDEClientMode | ForeColor | Text |
| DDEClientServer | Height | Top |
| DDEClientStatus | Hwnd | Transparent |
| DDEClientTimeOut | Justify | Visible |
| DDEClientTopic | Layer | Width |

App - 6

```
DDEServerActive      Left
DDEServerEnable      Name
```

Predefined link behaviors:

The user can use predefined link behaviors to respond to option button events. An option button has the following link behaviors depending on whether it is the source or the destination of a link:

As the source:

```
CellClearQueryAndExecute              ItemFind
CellSetData                           IterateOverDataObject
CellSetFormattedQuery                 LastRow
CellSetFormattedQueryAndExecute       NextRow
CellSetQuery                          PictureLoad
CellSetQueryAndExecute                PreviousRow
Clear                                 PrintChart
Directory                             PrintPreview
DoEventClick                          RowDelete
DrawChart                             RowNew
EditChart                             Select
ExecuteVerb                           SetTimerInterval
ExportText                            SetValue
FillFromFile                          SetVendorRetrievalAndExecute
FirstRow                         StateSetVendorRetrievalAndExecute
ItemAdd                               TextCopy
ItemAddUnique                         ToggleVisibility
```

As the destination:

```
CopyValue                 TextCopyFromCell
ScrollSetForeColor        TextCopyFromGroup
SetStateFromCell          TextCopyFromList
StateSetProperty          TextCopyFromMultiList
StateTextCopy             ToggleState
TextCopy                  ToggleVisibility
```

Methods:

In scripts, the user can use the following methods to manipulate option buttons:

```
Class             DDEUseData        GetScript
ClipboardCopy     DoEvent           Move
ClipboardPaste    DoEventArgs       Position
```

App - 7

| | | |
|---|---|---|
| CursorCopy | FindEvent | Repaint |
| CursorLoad | FindLink | SetFocus |
| DDEClientExecute | FindProperty | SetProperty |
| DDEClientPoke | FontSelect | SetScript |
| DDEClientRequest | GetProperty | |

Events:

The user can create scripts and (in some cases) links to respond to the following option button events:

| | | |
|---|---|---|
| Click | DDEServerPoke | User |
| DDEActivity | GotFocus | |
| DDEClientArriving | LostFocus | |

APPENDIX 4

Check Box

A check box is a ViP Windows control object that is an instance of the CheckBox class. The user can use check boxes to let users initiate an action with a click. When the user clicks on a check box, ViP changes the appearance and the value of the State property of the check box. A check box can provide up to three options to the user:

- An X in the check box indicates that the check box option is selected and the option is in effect.
- An empty check box indicates that the check box is deselected and the option does not apply.
- If the check box is a three-state check box (see the ThreeState property), a dimmed check box indicates a mixed state. In this case, the option is on for some elements in a selection and off for others.

The user can use check boxes to display a group of related options to the user. Users can select any number of check boxes in a group. Selecting one check box does not deselect a previously selected check box. The user can also use check box events to initiate event procedures.

Properties:

Use the Check Box right-click menu to set the properties of a check box while laying out the application window. Use event procedures to set check box properties at run time. A check box has the following properties:

| | | |
|---|---|---|
| BackColor | Description | Parent |
| Bottom | Enabled | Right |
| Cursor | FontName | State |
| DDEClientDataType | FontSize | TabIndex |

App - 9

```
DDEClientItem        FontStyle            TabStop
DDEClientMode        ForeColor            Text
DDEClientServer      Height               ThreeState
DDEClientStatus      Hwnd                 Top
DDEClientTimeOut     Justify              Transparent
DDEClientTopic       Layer                Visible
DDEServerActive      Left                 Width
DDEServerEnable      Name
```

Predefined link behaviors:

The user can use predefined link behaviors to respond to check box events. A check box has the following link behaviors depending on whether it is the source or the destination of a link:

As the source:

```
CellSetData              StateCellSetData
Directory                StateCellSetQuery
DrawChart                StateCellSetQueryAndExecute
ItemAdd                  StateSetProperty
ItemAddUnique            StateSetTimer
ItemFind                 StateSetValue
PictureLoad              StateSetVendorRetrievalAndExecute
Select                   StateTextCopy
```

As the destination:

```
CopyValue                TextCopyFromCell
ScrollSetBackColor       TextCopyFromGroup
ScrollSetForeColor       TextCopyFromList
SetStateFromCell         TextCopyFromMultiList
StateSetProperty         ToggleState
StateTextCopy            ToggleVisibility
TextCopy
```

Methods:

In scripts, the user can use the following methods to manipulate check boxes:

```
Class                DDEUseData           GetScript
ClipboardCopy        DoEvent              Move
ClipboardPaste      DoEventArgs          Position
```

App - 10

| | | |
|---|---|---|
| CursorCopy | FindEvent | Repaint |
| CursorLoad | FindLink | SetFocus |
| DDEClientExecute | FindProperty | SetProperty |
| DDEClientPoke | FontSelect | SetScript |
| DDEClientRequest | GetProperty | |

Events:

Thje user can create scripts and (in some cases) links to respond to the following check box events:

| | | |
|---|---|---|
| Click | DDEServerPoke | User |
| DDEActivity | GotFocus | |
| DDEClientArriving | LostFocus | |

APPENDIX 5

Text Box

A text box is a ViP Windows control object that is an instance of the TextBox class. The user can use text boxes to display information and to accept input from the user. Text boxes can be either single-line or multiline; by default, ViP creates a single-line text box (see the MultiLine property). Both single-line and multiline text boxes have the following default attributes:

- Allow the user to edit text.
- Display characters exactly as the user types them into the text box.
- Allow the user to enter only the number of characters that fit in the width of the edit box.
- Dose not have a horizontal scroll bar.
- Display the text selection only when the text box has the focus.

However, the user can change the default attributes of both single-line and multiline text boxes so that:

- Text is read-only; users cannot edit text.
- Displays only a special password character or displays characters as all uppercase or all lowercase.
- Allows the user to enter any number of characters into the edit box.
- Has a horizontal scroll bar.
- Displays the text selection when the text box does not have the focus.

Some attributes apply only to multiline text boxes. By default, multiline text boxes recognize CTRL+ENTER as a carriage return; allow the user to enter only the number of lines that fit in the length of a text box; and do not have a vertical scroll bar.
However, the user can change these attributes so that a multiline
text box recognizes ENTER as a carriage return (see the
WantReturn property), allows the user to enter any number of
lines into the edit box (see the AutoVScroll property), or has
a vertical scroll bar (see the VerticalScroll property).
The user can also use text box events to initiate event
procedures.

Properties:

Use the Text Box right-click menu to set the properties of a text
box while laying out the application window. Use event
procedures to set text box properties at run time. A text box
has the following properties:

| | | |
|---|---|---|
| AutoHScroll | Enabled | MultiLine |
| AutoVScroll | Filter | Name |
| BackColor | FontName | Parent |
| Bottom | FontSize | PasswordChar |
| Cursor | FontStyle | ReadOnly |
| DDEClientDataType | ForeColor | Right |
| DDEClientItem | Height | ShowSelection |
| DDEClientMode | HorizontalScroll | TabIndex |
| DDEClientServer | Hwnd | TabStop |
| DDEClientStatus | Justify | Text |
| DDEClientTimeOut | Layer | Top |
| DDEClientTopic | Left | VerticalScroll |
| DDEServerActive | LineCount | Visible |
| DDEServerEnable | LineStyle | WantReturn |
| Description | Modified | Width |

Predefined link behaviors:

The user can use predefined link behaviors to respond to text box
events. If the link is to a data object cell, the Enter event
also triggers the link. A text box has the following link
behaviors depending on whether it is the source or the
destination of a link:

App - 13

As the source:

| | |
|---|---|
| CellSetData | ItemAddUnique |
| CellSetFormattedQuery | ItemFind |
| CellSetFormattedQueryAndExecute | PictureLoad |
| CellSetQuery | Select |
| CellSetQueryAndExecute | SetTimerInterval |
| Clear | SetValue |
| Directory | SetVendorRetrievalAndExecute |
| FillFromFile | TextCopy |
| ItemAdd | |

As the destination:

| | |
|---|---|
| CopyContentsToText | TextCopy |
| CopyResultRowCount | TextCopyFromCell |
| CopyValue | TextCopyFromGroup |
| ScrollSetBackColor | TextCopyFromList |
| ScrollSetForeColor | TextCopyFromMultiList |
| StateSetProperty | ToggleVisibility |
| StateTextCopy | |

Methods:

In scripts, the user can use the following methods to manipulate text boxes:

| | | |
|---|---|---|
| CanUndo | FindEvent | LineLength |
| Class | FindLink | LineScroll |
| ClipboardCopy | FindProperty | Move |
| ClipboardPaste | FontSelect | Position |
| CursorCopy | FormatLines | Repaint |
| CursorLoad | GetCharSel | ReplaceSel |
| DDEClientExecute | GetFirstVisibleLine | SetCharSel |
| DDEClientPoke | GetLine | SetFocus |
| DDEClientRequest | GetProperty | SetProperty |
| DDEUseData | GetScript | SetScript |
| DoEvent | LimitText | SetTabStops |
| DoEventArgs | LineFromChar | Undo |
| EmptyUndo | LineIndex | |

Events:

The user can create scripts and (in some cases) links to respond to the following text box events:

| | | |
|---|---|---|
| Change | DDEServerPoke | LostFocus |
| DDEActivity | Enter | User |
| DDEClientArriving | GotFocus | |

App - 14

APPENDIX 6

List Box

A list box is a ViP Windows control object that is an instance of
the ListBox class. The user can use list boxes to display a list
of items from which the user can choose one or more items.
By default, a list box is a single-column list box that allows
the user to select only one item in a list at a time. The user
can also create list boxes with styles (see the ListBoxStyle
property) that allow the user to select multiple items in a list:

- A multiple-selection list box style allows a user to select
  multiple non-contiguous items in a list.
- An extended-selection list box style allows users to select
  multiple contiguous items in the list.

Additionally, a list box can have multiple columns (see the
MultiColumn property). The user can also use list box events to
initiate event procedures.

Properties:

Use the List Box right-click menu to set the properties of a list
box while laying out an application window. Use event procedures
to set list box properties at run time. A list box has the
following properties:

| | | |
|---|---|---|
| BackColor | Description | LineStyle |
| Bottom | Enabled | ListBoxStyle |
| ColumnWidth | FontName | MultiColumn |
| Contents | FontSize | Name |
| Cursor | FontStyle | Parent |
| DDEClientDataType | ForeColor | Right |
| DDEClientItem | Height | Sorted |
| DDEClientMode | Hwnd | TabIndex |
| DDEClientServer | ItemCount | TabStop |
| DDEClientStatus | ItemSelCount | Text |
| DDEClientTimeOut | ItemSelected | Top |
| DDEClientTopic | ItemTopVisible | VerticalScroll |

App - 15

| | | |
|---|---|---|
| DDEServerActive | Layer | Visible |
| DDEServerEnable | Left | Width |

Predefined link behaviors:

The user can use predefined link behaviors to respond to list box events. A list box has the following link behaviors depending on whether it is the source or the destination of a link:

As the source:

| | |
|---|---|
| CellSetDataFromList | FillFromListFile |
| CellSetQueryFromList | PictureLoadFromList |
| CellSetQueryFromListAndExecute | TextCopyFromList |
| CellSetQueryFromMultiList | TextCopyFromMultiList |
| CopyContents | CopyContentsToText |
| SetVendorRetrievalFromListAndExecute | |

As the destination:

| | |
|---|---|
| Clear | ItemAddUnique |
| ColumnContentsUnique | ItemFind |
| CopyContents | ScrollSetBackColor |
| Directory | ScrollSetForeColor |
| FillFromFile | Select |
| FillFromListFile | StateSetProperty |
| FindFromCell | ToggleVisibility |
| ItemAdd | |

Methods:

In scripts, the user can use the following methods to manipulate list boxes:

| | | |
|---|---|---|
| Class | FindEvent | ItemInsert |
| Clear | FindLink | ItemSelect |
| ClipboardCopy | FindProperty | ItemSelectRange |
| ClipboardPaste | FontSelect | ItemSetSelState |
| CursorCopy | GetProperty | Move |
| CursorLoad | GetScript | Position |
| DDEClientExecute | ItemAdd | Repaint |
| DDEClientPoke | ItemDelete | SetFocus |
| DDEClientRequest | ItemFind | SetProperty |
| DDEUseData | ItemFindExact | SetScript |
| Dir | ItemGet | SetTabStops |
| DoEvent | ItemGetNextSel | |
| DoEventArgs | ItemGetSelState | |

Events:

The user can create scripts and (in some cases) links to respond to the following list box events:

```
DDEActivity         Enter        Select
DDEClientArriving   GotFocus     User
DDEServerPoke       LostFocus
```

APPENDIX 7

Combo Box

A combo box is a ViP Windows control object that is an instance of the ComboBox class. A combo box combines the functionality of a list box and a text box. A combo box has a list box portion that displays items that users can choose from and a text box portion that displays the selected item and (optionally) that users can enter text into. The user can create combo boxes in three different styles depending on the value of the ComboBoxStyle property. As outlined in the table below, the style the user selects determines whether:

- Users can edit text in the text box portion of the combo box.
- ViP always displays the list box portion of the combo box, or only displays the list box portion when the user clicks the arrow to the right of the text box portion of the combo box.

| COMBOBOXSTYLE | CAN USERS EDIT TEXT? | IS LIST BOX DISPLAYED? |
|---|---|---|
| SIMPLE_COMBO | Yes | Yes |
| DROPDOWN_LIST | No | No |
| DROPDOWN_COMBO | Yes | No |

The user can also use combo box events to initiate event procedures.

Properties:

Use the Combo Box right-click menu to set the properties of a combo box while laying out an application window. Use event procedures to set combo box properties at run time. A combo box has the following properties:

| | | |
|---|---|---|
| AutoHScroll | DDEServerActive | Left |
| BackColor | DDEServerEnable | Name |
| Bottom | Description | Parent |

App - 18

| | | |
|---|---|---|
| ComboBoxStyle | Enabled | Right |
| Contents | FontName | Sorted |
| Cursor | FontSize | TabIndex |
| DDEClientDataType | FontStyle | TabStop |
| DDEClientItem | ForeColor | Text |
| DDEClientMode | Height | Top |
| DDEClientServer | Hwnd | Visible |
| DDEClientStatus | ItemCount | Width |
| DDEClientTimeOut | ItemSelected | |
| DDEClientTopic | Layer | |

Predefined link behaviors:

The user can use predefined link behaviors to respond to combo box events. A combo box has the following link behaviors depending on whether it is the source or the destination of a link:

As the source:

| | |
|---|---|
| CellSetData | FillFromListFile |
| CellSetDataFromList | PictureLoadFromList |
| CellSetQueryFromList | SetVendorRetrievalFromListAndExecute |
| CopyContents | TextCopy |
| CopyContentsToText | TextCopyFromList |
| CellSetQueryFromListAndExecute | |

As the destination:

| | |
|---|---|
| Clear | ItemAddUnique |
| ColumnContentsUnique | ItemFind |
| CopyContents | ScrollSetBackColor |
| Directory | ScrollSetForeColor |
| FillFromFile | Select |
| FillFromListFile | StateSetProperty |
| FindFromCell | TextCopyFromGroup |
| ItemAdd | ToggleVisibility |

Methods:

In scripts, the user can use the following methods to manipulate combo boxes:

| | | |
|---|---|---|
| Class | DoEventArgs | ItemGet |
| Clear | FindEvent | ItemInsert |
| ClipboardCopy | FindLink | ItemSelect |
| ClipboardPaste | FindProperty | LimitText |

App - 19

| | | |
|---|---|---|
| CursorCopy | FontSelect | Move |
| CursorLoad | GetCharSel | Position |
| DDEClientExecute | GetProperty | Repaint |
| DDEClientPoke | GetScript | SetCharSel |
| DDEClientRequest | ItemAdd | SetFocus |
| DDEUseData | ItemDelete | SetProperty |
| Dir | ItemFind | SetScript |
| DoEvent | ItemFindExact | |

Events:

The user can create scripts and (in some cases) links to respond to the following combo box events:

| | | |
|---|---|---|
| Change | DDEServerPoke | LostFocus |
| DDEActivity | Enter | Select |
| DDEClientArriving | GotFocus | User |

APPENDIX 8

Scroll Bar

A scroll bar is a ViP Windows control object that is an instance of the ScrollBar class. A scroll bar graphically displays a range of values from which the user can either choose or input a value. By default, a scroll bar has a minimum value of 0 and a maximum value of 100, moves 1 unit when the user clicks the scroll arrow, and moves 10 units when the user clicks between the scroll box and the scroll arrow. The user can change these default attributes and the orientation of a scroll bar by using the Max, Min, SmallChange, LargeChange, and ScrollBarStyle properties. Scroll bars can also appear in list boxes, text boxes, and combo boxes to allow users to scroll through text or items in a list box. Use the List Box Options, Text Box Options, and Combo Box Options dialog boxes to specify scroll bars on these objects.

The user can also use scroll bar events to initiate event procedures.

Properties:

Use the Scroll Bar right-click menu to set the properties of a scroll bar while laying out an application window. Use event procedures to set scroll bar properties at run time. A scroll bar has the following properties:

| | | |
|---|---|---|
| Bottom | Description | Right |
| Cursor | Enabled | ScrollBarStyle |
| DDEClientDataType | Height | SmallChange |
| DDEClientItem | Hwnd | TabIndex |
| DDEClientMode | LargeChange | TabStop |
| DDEClientServer | Layer | Top |
| DDEClientStatus | Left | Value |
| DDEClientTimeOut | Max | Visible |
| DDEClientTopic | Min | Width |
| DDEServerActive | Name | |

App - 21

DDEServerEnable          Parent

Predefined link behaviors:

The user can use predefined link behaviors to respond to scroll
bar events. A scroll bar has the following link behaviors
depending on whether it is the source or the destination of a
link:

As the source:

| | |
|---|---|
| CopyValue | ScrollSetBackColor |
| CopyValueToQuery | ScrollSetForeColor |
| CopyValueToQueryAndExecute | TimerSetIntervalFromScroll |
| CopyValueToValue | |

As the destination:

| | |
|---|---|
| CopyValueToValue | StateSetValue |
| SetValue | TimerMoveScrollBar |
| StateSetProperty | ToggleVisibility |

Methods:

In scripts, the user can use the following methods to manipulate
scroll bars:

| | | |
|---|---|---|
| Class | DDEUseData | Move |
| ClipboardCopy | DoEvent | Position |
| ClipboardPaste | DoEventArgs | Repaint |
| CursorCopy | FindEvent | SetFocus |
| CursorLoad | FindLink | SetProperty |
| DDEClientExecute | FindProperty | SetScript |
| DDEClientPoke | GetProperty | |
| DDEClientRequest | GetScript | |

Events:

The user can create scripts and (in some cases) links to respond
to the following scroll bar events:

| | | |
|---|---|---|
| Change | DDEServerPoke | User |
| DDEActivity | GotFocus | |
| DDEClientArriving | LostFocus | |

App - 22

APPENDIX 9

Timer

A timer is an instance of the TimerObject class. The user can use timers to initiate processing when a specified time interval has passed. Timer objects function in the background; they are not visible to the user. The user can also use timer events to initiate event procedures.

Properties:

Use the Timer right-click menu to set the properties of a timer while laying out an application window. Use event procedures to set timer properties at run time. A timer object has the following properties:

| | | |
|---|---|---|
| AutoDisable | Interval | Right |
| Bottom | Layer | Top |
| Description | Left | Width |
| Enabled | Name | |
| Height | Parent | |

Predefined link behaviors:

The user can use predefined link behaviors to respond to timer events. A timer has the following link behaviors depending on whether it is the source or the destination of a link:

As the source:

| | |
|---|---|
| CellClearQueryAndExecute | PrintPreview |
| DoEventClick | TimerCellSetQueryAndExecute |
| DrawChart | TimerMoveScrollBar |
| ExecuteQuery | ToggleState |
| IterateOverDataObject | ToggleTimer |
| PrintChart | ToggleVisibility |

As the destination:

| | |
|---|---|
| SetTimerInterval | TimerSetIntervalFromScroll |
| StateSetTimer | ToggleTimer |

App - 23

Methods:

In scripts, the user can use the following methods to manipulate timers:

| | | |
|---|---|---|
| Class | FindEvent | Move |
| ClipboardCopy | FindLink | Position |
| ClipboardPaste | FindProperty | Repaint |
| DoEvent | GetProperty | SetProperty |
| DoEventArgs | GetScript | SetScript |

Events:

The user can create scripts and links to respond to the following timer events:

Timer          User

App - 24

APPENDIX 10

Line

A line is a ViP graphic object that is an instance of the LineObject class. The user can place lines in an application window to visually separate parts of the window and in any other way enhance the appearance of the window. The user can also use line events to initiate event procedures. Lines can be placed in a report.

Properties:

Use the Line right-click menu to set the properties of a line while laying out the application window. Use event procedures to set line properties at run time. A line has the following properties:

| | | |
|---|---|---|
| Arrows | DDEServerEnable | Name |
| Bottom | Description | Parent |
| Cursor | Enabled | Right |
| DDEClientDataType | EndX | StartX |
| DDEClientItem | EndY | StartY |
| DDEClientMode | Height | TabIndex |
| DDEClientServer | Layer | Top |
| DDEClientStatus | Left | Transparent |
| DDEClientTimeOut | LineColor | Visible |
| DDEClientTopic | LineStyle | Width |
| DDEServerActive | LineWidth | |

Predefined link behaviors:

The user can use predefined link behaviors to respond to line events. A line has the following link behaviors depending on whether it is the source or the destination of a link:

As the source:

| | |
|---|---|
| Clear | LastRow |
| DoEventClick | NextRow |
| DrawChart | PreviousRow |
| ExecuteQuery | RowDelete |

App - 25

ExecuteUpdate          RowNew
ExportText             ToggleState
FirstRow

As the destination:

StateSetProperty       ToggleVisibility

Methods:

In scripts, the user can use the following methods to manipulate lines:

```
Class               DDEClientRequest    GetProperty
ClipboardCopy       DDEUseData          GetScript
ClipboardPaste      DoEvent             Move
CursorCopy          DoEventArgs         Position
CursorLoad          FindEvent           Repaint
DDEClientExecute    FindLink            SetProperty
DDEClientPoke       FindProperty        SetScript
Events
```

The user can create scripts and (in some cases) links to respond to the following line events:

```
DDEActivity         DoubleClick         User
DDEClientArriving   LeftClick
DDEServerPoke       RightClick
```

App - 26

APPENDIX 11

Rectangle

A rectangle is a ViP graphic object that is an instance of the Rectangle class. The user can use rectangles to display pictures and in this way enhance the appearance of an application window. The user can also use rectangle events to initiate event procedures. Rectangles can also be placed in a report.

Properties:

Use the Rectangle right-click menu to set the properties of a rectangle while laying out the application window. Use event procedures to set rectangle properties at run time. A rectangle has the following properties:

| | | |
|---|---|---|
| BackColor | Description | Name |
| Bottom | Enabled | Parent |
| CornerRounding | FontName | Pattern |
| Cursor | FontSize | PatternColor |
| DDEClientDataType | FontStyle | PictureAutoSize |
| DDEClientItem | ForeColor | PictureJustify |
| DDEClientMode | Height | Right |
| DDEClientServer | Justify | TabIndex |
| DDEClientStatus | Layer | Text |
| DDEClientTimeOut | Left | Top |
| DDEClientTopic | LineColor | Transparent |
| DDEServerActive | LineStyle | Visible |
| DDEServerEnable | LineWidth | Width |

Predefined link behaviors:

The user can use predefined link behaviors to respond to rectangle events. A rectangle has the following link behaviors depending on whether it is the source or the destination of a link:

As the source:

| | |
|---|---|
| Clear | PictureLoad |
| Directory | Select |

App - 27

DoEventClick          SetTimerInterval
FillFromFile          SetValue
ItemAdd               TextCopy
ItemAddUnique         ToggleState
ItemFind              ToggleTimer
PictureCopy

As the destination:

CopyResultRowCount    StateTextCopy
CopyValue             TextCopy
PictureCopy           TextCopyFromCell
PictureLoad           TextCopyFromGroup
PictureLoadFromList   TextCopyFromList
ScrollSetBackColor    TextCopyFromMultiList
ScrollSetForeColor    ToggleVisibility
StateSetProperty

Methods:

In scripts, the user can use the following methods to manipulate rectangles:

Class                 DDEUseData        GetScript
ClipboardCopy         DoEvent           Move
ClipboardPaste        DoEventArgs       PictureCopy
CursorCopy            FindEvent         PictureLoad
CursorLoad            FindLink          Position
DDEClientExecute      FindProperty      Repaint
DDEClientPoke         FontSelect        SetProperty
DDEClientRequest      GetProperty       SetScript

Events:

The user can create scripts and (in some cases) links to respond to the following rectangle events:

Change                DDEServerPoke     RightClick
DDEActivity           DoubleClick       User
DDEClientArriving     LeftClick App - 28

APPENDIX 12

Ellipse

An ellipse is a ViP graphic object that is an instance of the Ellipse class. The user can use ellipses or circles (which are drawn with the ellipse tool) to display pictures and in this way enhance the appearance of an application window. The user can also use ellipse events to initiate event procedures.

Properties:

Use the Ellipse right-click menu to set the properties of an ellipse while laying out the application window. Use event procedures to set ellipse properties at run time. An ellipse has the following properties:

| | | |
|---|---|---|
| BackColor | Enabled | Parent |
| Bottom | FontName | Pattern |
| Cursor | FontSize | PatternColor |
| DDEClientDataType | FontStyle | PictureAutoSize |
| DDEClientItem | ForeColor | Right |
| DDEClientMode | Height | TabIndex |
| DDEClientServer | Justify | Text |
| DDEClientStatus | Layer | Top |
| DDEClientTimeOut | Left | Transparent |
| DDEClientTopic | LineColor | Visible |
| DDEServerActive | LineStyle | Width |
| DDEServerEnable | LineWidth | |
| Description | Name | |

Predefined link behaviors:

The user can use predefined link behaviors to respond to ellipse events. An ellipse has the following link behaviors depending on whether it is the source or the destination of a link:

As the source:

| | |
|---|---|
| Clear | PictureLoad |
| Directory | Select |
| DoEventClick | SetTimerInterval |

App - 29

FillFromFile          SetValue
ItemAdd               TextCopy
ItemAddUnique         ToggleState
ItemFind              ToggleTimer
PictureCopy

As the destination:

CopyResultRowCount    StateTextCopy
CopyValue             TextCopy
PictureCopy           TextCopyFromCell
PictureLoad           TextCopyFromGroup
PictureLoadFromList   TextCopyFromList
ScrollSetBackColor    TextCopyFromMultiList
ScrollSetForeColor    ToggleVisibility
StateSetProperty

Methods:

In scripts, the user can use the following methods to manipulate ellipses:

Class                 DDEUseData         GetScript
ClipboardCopy         DoEvent            Move
ClipboardPaste        DoEventArgs        PictureCopy
CursorCopy            FindEvent          PictureLoad
CursorLoad            FindLink           Position
DDEClientExecute      FindProperty       Repaint
DDEClientPoke         FontSelect         SetProperty
DDEClientRequest      GetProperty        SetScript

Events:

The user can create scripts and (in some cases) links to respond to the following ellipse events:

Change                DDEServerPoke      RightClick
DDEActivity           DoubleClick        User
DDEClientArriving     LeftClick

APPENDIX 13

Static Text

A static text object is a ViP graphic object that is an instance of the StaticText class. The user can use static text (which is uneditable text) as a design element in an application window. The size of the static text object is determined by the amount of text and by the font being used. Static text objects are borderless and transparent, so the user can overlay a static text object on other objects, including the application window. The user can
also use static text object events to initiate event procedures. Static text objects can be placed in a report.

Properties:

Use the Static Text right-click menu to set the properties of a static text object while laying out the application window. Use event procedures to set static text object properties at run time. A static text object has the following properties:

| | | |
|---|---|---|
| Bottom | DDEServerEnable | Left |
| Cursor | Description | Name |
| DDEClientDataType | Enabled | Parent |
| DDEClientItem | FontName | Right |
| DDEClientMode | FontSize | TabIndex |
| DDEClientServer | FontStyle | Text |
| DDEClientStatus | ForeColor | Top |
| DDEClientTimeOut | Height | Transparent |
| DDEClientTopic | Justify | Visible |
| DDEServerActive | Layer | Width |

Predefined link behaviors:

The user can use predefined link behaviors to respond to static text object events. A static text object has the following link behaviors depending on whether it is the source or the destination of a link:

App - 31

As the source:

DoEventClick            TextCopy
SetTimerInterval        ToggleTimer
SetValue

As the destination:

CopyResultRowCount      TextCopyFromCell
CopyValue               TextCopyFromGroup
ScrollSetForeColor      TextCopyFromList
StateSetProperty        TextCopyFromMultiList
StateTextCopy           ToggleVisibility
TextCopy

Methods

In scripts, the user can use the following methods to manipulate static text objects:

Class                   DDEUseData          GetScript
ClipboardCopy           DoEvent             Move
ClipboardPaste          DoEventArgs         Position
CursorCopy              FindEvent           Repaint
CursorLoad              FindLink            SetProperty
DDEClientExecute        FindProperty        SetScript
DDEClientPoke           FontSelect
DDEClientRequest        GetProperty

Events:

The user can create scripts and (in some cases) links to respond to the following static text events:

Change                  DDEServerPoke       RightClick
DDEActivity             DoubleClick         User
DDEClientArriving       LeftClick

APPENDIX 14

Group Box

A group box is a ViP graphic object that is an instance of the Group class. A group box also functions as a container object. The user can use group boxes as containers in which to place one or more objects. Check boxes, option buttons, and command buttons with a non-default style act differently when they are placed in a group box. Group boxes can contain pictures.
The user can use group box events to initiate event procedures.

Properties:

Use the Group Box right-click menu to set the properties of a group box while laying out an application window. Use event procedures to set group box properties at run time. A group box has the following properties:

| | | |
|---|---|---|
| BackColor | Hwnd | PictureAutoSize |
| Bottom | Layer | PictureJustify |
| Cursor | Left | Right |
| Description | LineColor | TabIndex |
| Enabled | LineStyle | Text |
| FontName | LineWidth | Top |
| FontSize | Name | Transparent |
| FontStyle | Parent | Visible |
| ForeColor | Pattern | Width |
| Height | PatternColor | |

Predefined link behaviors:

The user can use predefined link behaviors to respond to group box events. A group box has the following link behaviors depending on whether it is the source or the destination of a link:

As the source:

| | |
|---|---|
| CellSetDataFromGroup | PictureCopy |
| CellSetQueryFromGroup | SetVendorRetrievalFromGroupAndExecute |

App - 33

```
CellSetQueryFromGroupAndExecute    TextCopyFromGroup
```

As the destination:

```
CopyValue              ScrollSetForeColor
PictureCopy            SetGroupOptionFromCell
PictureLoad            StateSetProperty
PictureLoadFromList    TextCopyFromGroup
ScrollSetBackColor     ToggleVisibility
```

Methods:

In scripts, the user can use the following methods to manipulate a group box:

```
Class              FindEvent        Move
ClipboardCopy      FindLink         PictureCopy
ClipboardPaste     FindObject       PictureLoad
CursorCopy         FindProperty     Position
CursorLoad         FontSelect       Repaint
DoEvent            GetProperty      SetProperty
DoEventArgs        GetScript        SetScript
```

Events:

The user can create scripts and (in some cases) links to respond to the following group box events:

```
Change             User
```

App - 34

APPENDIX 15

Data Object

A data object is a ViP object that is an instance of the Data class. The user can use a data object to query and update a data source, to provide input for charts and a report, and to export data to a dBASE or Paradox table. The data source may be a Notes database, a relational database, a database file, or a spreadsheet database range. A data object can also function as a temporary local data repository or as a DDE client of another Windows application.

Properties:

Use the Data object right-click menu to set data object properties while laying out the application window. Use links and scripts to set data object properties at run time. Data objects have the following properties:

| | | |
|---|---|---|
| AllowDelete | DDEClientTopic | Parent |
| AllowInsert | DDEServerActive | QueryColumnCount |
| AllowModify | DDEServerEnable | QueryLimit |
| AutoQuery | Description | QueryRowCount |
| Bottom | Distinct | ResultColumnCount |
| Connection | EditState | ResultRowCount |
| Contents | Enabled | Right |
| CurrentColumn | Height | TabIndex |
| CurrentRow | HighPerformance | TabStop |
| DDEClientDataType | Hwnd | Text |
| DDEClientItem | LastError | Top |
| DDEClientMode | LastVendorString | VendorRetrieval |
| DDEClientServer | Layer | VerifyDelete |
| DDEClientStatus | Left | Visible |
| DDEClientTimeOut | Name | Width |

Predefined link behaviors

The user can use predefined link behaviors to and from regions of a data object to perform a variety of operations, such as specifying selection criteria, executing queries and update operations, and copying data to and from a data object. As the source or destination for a predefined link, data object regions App - 35 represent the following:

| REGION | WHAT IT REPRESENTS |
|---|---|
| Title bar: | The data object as source or destination for a global operation, such as drawing a chart or executing a query. |
| Column Label: | The column in the currently selected row as source or destination for a data transfer. |
| Query Cell: | (Destination only) The query cell in the first row of the query grid as destination for selection criteria. |

Regions of the data object can function as the source or destination for the following predefined link behaviors:

Title bar as source:

CopyContents            DrawChart
CopyContentsToText      ExecuteQuery
CopyResultRowCount      SetAndDrawChart

Column label as source:

CellSetQueryFromCell            FindFromCell
CellSetQueryFromCellAndExecute  SetGroupOptionFromCell
CellTransferValue               SetStateFromCell
ColumnContentsUnique            TextCopyFromCell

Title bar as destination:

CopyContents        PrintReport
ExecuteQuery        RowDelete
ExecuteUpdate       RowNew
ExportText          SetVendorRetrievalAndExecute
FirstRow            SetVendorRetrievalFromGroupAndExecute
IterateOverDataObject   SetVendorRetrievalFromListAndExecute
LastRow             StateSetProperty
NextRow             StateSetVendorRetrievalAndExecute
PreviousRow         ToggleVisibility
PrintPreview

Column label as destination:

CellSetData             CellTransferValue
CellSetDataFromGroup    ColumnContentsUnique
CellSetDataFromList     StateCellSetData

Query cell as destination:

```
CellClearQueryAndExecute              CellSetQueryFromList
CellSetFormattedQuery                 CellSetQueryFromListAndExecute
CellSetFormattedQueryAndExecute       CellSetQueryFromMultiList
CellSetQuery                          CopyValueToQuery
CellSetQueryAndExecute                CopyValueToQueryAndExecute
CellSetQueryFromCell                  StateCellSetQuery
CellSetQueryFromCellAndExecute        StateCellSetQueryAndExecute
CellSetQueryFromGroup                 TimerCellSetQueryAndExecute
CellSetQueryFromGroupAndExecute
```

Methods:

The uesr can use the following methods with data objects:

```
CellGetData              DoEventArgs              PrintPreview
CellGetQuery             DoEvent                  PrintReport
CellRevert               ExecuteQuery             PrintSetup
CellSetDataFromResult    ExecuteUpdate            QueryDestroy
CellSetData              ExecuteVendorCommand        Repaint
CellSetQueryFromResult   ExportToDbase            Replicate
CellSetQuery             ExportToParadox          ResultDestroy
Class                    FindEvent                ResultTransfer
ClipboardCopy            FindLink                 RowMarkForDelete
ClipboardPaste           FindProperty             RowNew
ColumnContentsUnique     FormatCriteria           RowOpen
DDEClientExecute         GetProperty              RowRevert
DDEClientPoke            GetScript                SetFocus
DDEClientRequest         Move                     SetProperty
DDEUseData               Position                 SetScript
```

Events:

The user can create scripts and links to respond to the following data object events:

```
CellValidate             Execute                  RowSelect
DDEActivity              GotFocus                 RowValidate
DDEClientArriving        LostFocus                User
DDEServerPoke            NewRow
```

APPENDIX 16

OLE Object

An OLE object is a ViP object that is an instance of the OLE class. The user can use an OLE object to link to data in another Windows application or to embed data from another Windows application. The ViP application uses the OLE object (the client) to request data from and send instructions to the other Windows application (the server). Depending on the support provided by the server application, the OLE object displays either the data or an icon provided by the server. In either case, the user can use the OLE object to open the server application and manipulate the data (for example, edit a spreadsheet range or play an animation).

Properties:

Use the OLE object right-click menu to set OLE object properties while laying out an application window. Use links and scripts to set OLE object properties at run time. An OLE object has the following properties:

| | | |
|---|---|---|
| Bottom | Left | OLEType |
| Cursor | Name | Parent |
| Description | OLEClassName | Right |
| Enabled | OLEFormat | Top |
| Height | OLEItem | Visible |
| Hwnd | OLEMode | Width |
| Layer | OLETopic | |

Predefined link behaviors:

The user can use OLE objects as the source or destination of the following predefined link behaviors:

As the source:

None

App - 38

As the destination:

ExecuteVerb          ToggleVisibility
StateSetProperty

Methods:

In scripts, the user can use the following methods to manipulate OLE objects:

| | | |
|---|---|---|
| Class | FindEvent | OLEExecuteVerb |
| ClipboardCopy | FindLink | OLEInsertObject |
| ClipboardPaste | FindProperty | OLEUpdateObject |
| CursorCopy | GetProperty | Position |
| CursorLoad | GetScript | Repaint |
| DoEvent | Move | SetProperty |
| DoEventArgs | OLECreateNewLink | SetScript |

Events:

The user can create scripts and links to respond to the following OLE object events:

| | | |
|---|---|---|
| DoubleClick | RightClick | User |
| LeftClick | | |

App - 39

APPENDIX 17

Chart

A chart is a ViP object that is an instance of the Chart class. Use a chart to plot data from a data object. The chart object provides access to the functionality of Lotus Chart, a tool available in a variety of applications available through Lotus Development Corporation.

Properties:

Use the Chart right-click menu to set chart properties while laying out the application window. Use links and scripts to set chart properties at run time. Charts have the following properties:

| | | |
|---|---|---|
| Bottom | Description | Name |
| ChartSource | Enabled | Parent |
| ChartTitle | Height | Right |
| ChartType | Hwnd | Top |
| ChartXTitle | Layer | Visible |
| ChartYTitle | Left | Width |
| Cursor | | |

Predefined link behaviors:

The user can use predefined link behaviors to set a data source for a chart, draw a chart, print a chart, edit a chart definition, show or hide a chart (the Visible property), and enable or disable a chart (the Enabled property). The user can use charts as the destination of the following predefined link behaviors:

As the source:

None

App - 40

As the destination:

| | | |
|---|---|---|
| DrawChart | PrintChart | StateSetProperty |
| EditChart | SetAndDrawChart | ToggleVisibility |

Methods:

In scripts, the user can use the following methods to manipulate charts:

| | | |
|---|---|---|
| Class | EditChart | Move |
| ClipboardCopy | FindEvent | Position |
| ClipboardPaste | FindLink | PrintChart |
| CursorCopy | FindProperty | Repaint |
| CursorLoad | GetColumnUsage | SetColumnUsage |
| DoEvent | GetProperty | SetProperty |
| DoEventArgs | GetScript | SetScript |
| DrawChart | | |

Events:

The user can create scripts links to respond to the following chart events:

| | | |
|---|---|---|
| DoubleClick | RightClick | User |
| LeftClick | | |

APPENDIX 18

Link Object

A link is a ViP object that is an instance of the Link class. It connects two other ViP objects and allows an event associated with one object (the source object) to execute a script that changes or in some other way affects the second object (the destination object). Activities generated by the script are called the link behavior. The user defines a link by using the ViP Designer Toolbox to draw the source and destination objects in an application window and to draw a link between them. The user can use any ViP objects, except the application window object and the Clipboard object, to create a link. At design time, ViP represents a link as a line between two objects with an arrow pointing from the source object to the destination object. There is no visual representation of a link at run time. Because a link establishes a relationship between two objects, a link is a good way to activate controls such as check boxes, combo boxes, command buttons, option buttons, list boxes, and scroll bars. Links are also easy ways to send data from one object to another and to specify and execute data object queries.

In ViP, a link is a special type of object that, like regular objects, has properties, methods, and events.

Properties

Use the Link right-click menu to set the properties of a link while laying out an application window. A link has the following properties:

| | | |
|---|---|---|
| AutoDisable | FromName | ToColumn |
| Cause | LineColor | ToName |
| Description | LineWidth | Visible |
| Enabled | Name | |
| FromColumn | Order | |

App - 42

Methods:

In scripts, the user can use the following methods with links:

| | | |
|---|---|---|
| Class | FindProperty | SetProperty |
| DoEventArgs | GetProperty | SetScript |
| FindEvent | GetScript | |

Events:

The following event is associated with links:

Link

APPENDIX 19

Clipboard

The Clipboard object is an instance of the ClipboardObject class. There can only be one instance of the Clipboard object in a ViP application. ViP automatically provides this instance. The user does not have to create or bind a Clipboard object. The user can use the Clipboard object as a temporary storage area when moving or copying ViP objects, text, pictures, or DDE links.

Properties:

The Clipboard object has the following property:

Text

Predefined link behaviors:

There are no links to or from the Clipboard object.

Methods:

In scripts, the user can use the following methods to manipulate the Clipboard object:

| | | |
|---|---|---|
| Class | FindProperty | GetProperty |
| Empty | FormatAvailable | SetProperty |

In scripts, the user can use the following methods with other objects to copy and paste data to and from the Clipboard:

ClipboardCopy    ClipboardPaste

Events:

There are no Clipboard object events.

App - 44

APPENDIX 20

Generic Object

In a script, the user can declare a variable to refer to an instance of the Object class, which is a virtual class. An instance of the Object class has no actual existence in its own right. This variable is a generic object reference. The user can bind this generic object reference to objects of any class regardless of the class of the object. This capability is very useful when creating designer tools.

Generic Properties:

A generic property is a property that the user can specify for a ViP object that is an instance of the Object class. ViP generic properties are listed below:

| | | |
|---|---|---|
| BackColor | Description | LineWidth |
| Bottom | Enabled | Name |
| Cursor | FontName | Parent |
| DDEClientDataType | FontSize | Right |
| DDEClientItem | FontStyle | TabIndex |
| DDEClientMode | ForeColor | TabStop |
| DDEClientServer | Height | Text |
| DDEClientStatus | Justify | Top |
| DDEClientTimeOut | Layer | Transparent |
| DDEClientTopic | Left | Visible |
| DDEServerActive | LineColor | Width |
| DDEServerEnable | LineStyle | |

Predefined link behaviors:

There are no links to or from the generic object.

Generic Methods:

A generic method is a method that the user can use with a ViP object that is an instance of the Object class. ViP generic methods are listed below:

| | | |
|---|---|---|
| Class | DDEUseData | GetProperty |
| ClipboardCopy | DoEvent | GetScript |

```
ClipboardPaste       DoEventArgs      Move
CursorCopy           FindEvent        Position
CursorLoad           FindLink         Repaint
DDEClientExecute     FindProperty     SetProperty
DDEClientPoke        FontSelect       SetScript
DDEClientRequest
```

Events

There are no generic object events.

APPENDIX 21

VIPLINK.BHV File

[CellClearQueryAndExecute]
summary=Clears destination data object query cell; then executes the query.
source=CommandButton;OptionButton;TimerObject
destination=DataQueryCell
comments=
CODE=
'=========================================
'Clear destination query cell criteria and
'execute query (show all data).
'=========================================
dim retCode%
retCode% = dest.cellSetQuery(1, destColumn, "")
retCode% = dest.ExecuteQuery()

[CellSetData]
summary=Copies the text of source object to the current data cell in destination data object without updating the row.
source=CheckBox;ComboBox;CommandButton;OptionButton;TextBox
destination=DataColumnLabel
comments=
CODE=
'=========================================
'copies source text to data object result cell
'=========================================
dim updateValue$
dim retCode%
if dest.currentRow > 0 Then     'If there is at least one row
  if dest.RowOpen(dest.CurrentRow)> 0 then   'If RowOpen returns a valid row number
    updateValue$ = src.text
    'Can transform updateValue$ here if desired.
    retCode% = dest.CellSetData(dest.CurrentRow, destColumn, updateValue$)
    retCode% = dest.Repaint()
  end if
end if

[CellSetDataFromGroup]
summary=Copies the text of the selected option button in source group box to the current destination data object data cell without updating the row.
source=Group
destination=DataColumnLabel
comments=

App - 47

CODE=
'===========================================================
'Copies selected (if any) option button text from
'within source group box to destination result cell
'===========================================================
```
dim optButton as OptionButton
dim obj as Object
dim objName$
dim updateValue$
dim found%
dim retCode% found% = FALSE
objName$ = src.FindObject("",FINDFIRST)
while objName$ <> "" and not found%
   set obj = Bind(objName$)

if obj.class() = "OptionButton" then
      set optButton = Bind(objName$)
      if optButton.state <> FALSE then
         found% = TRUE
      end if
   end if
   objName$ = src.FindObject(objName,FINDNEXT)
wend
if found% then
   updateValue$ = optButton.text
else
   updateValue$ = ""
end if if dest.currentRow > 0 Then              'If there is at least one row
   if dest.RowOpen(dest.CurrentRow) > 0 then     'If RowOpen returns a valid row number
      retCode% = dest.CellSetData(dest.CurrentRow, DestColumn, updateValue$)
      retCode% = dest.Repaint()
   end if
end if
```

[CellSetDataFromList]
summary=Copies the text of the selected item in a single-selection list box (combo box) to the current data cell in destination data object without updating the row.
source=ComboBox;ListBox
destination=DataColumnLabel
comments=

```
CODE=
'===========================================
'Copies selected (if any) list box text to
'destination result cell
'===========================================
dim updateValue$
dim index%
dim retCode% if dest.currentRow > 0 Then              'If there is at least one row
   if dest.RowOpen(dest.CurrentRow) > 0 then    'If RowOpen returns a valid row number
      index% = src.ItemSelected
      if index% > 0 then
         updateValue$ = src.ItemGet(index%)
         retCode% = dest.CellSetData(dest.CurrentRow, DestColumn, updateValue$)
         retCode% = dest.Repaint()
      end if
   end if
end if

[CellSetFormattedQuery]
summary=Copies the text of source object to destination data object query cell, formats the text
based on the data type of the query cell.
source=OptionButton;TextBox
destination=DataQueryCell
comments=
CODE=
'===========================================
'Copy text from source object to query cell of
'destination object. Format text based on column type.
'===========================================
dim patternMatch!
dim operator$
dim queryString$
dim retCode%
'*******************************************************
'possible operators are "< ", "> ", "<= ", ">= "
'To enable pattern matching, set patternMatch to TRUE
'(Patternmatch only works for columns of type TEXT)
'*******************************************************
operator$ = ""
patternMatch! = FALSE 'if no text, no query
```

```
if src.Text = "" then
  queryString$ = ""
else
  if patternMatch! then
    queryString$ = "like " + dest.FormatCriteria(destColumn, src.Text + "*")
  else
    if operator$ <> "" then
      queryString$ = operator$ + dest.FormatCriteria(destColumn, src.Text)
    else
      queryString$ = dest.FormatCriteria(destColumn, src.Text)
    end if
  end if
end if 'set the query string
retCode% = dest.cellSetQuery(1, destColumn, queryString$)

[CellSetFormattedQueryAndExecute]
summary=Copies the text of source object to destination data object query cell, formats the text
based on the data type of the query cell, and executes the query.
source=OptionButton;TextBox
destination=DataQueryCell
comments=
CODE=
'===========================================================
'Copy text from source object to the query cell of
'destination object. Format text based on column type.
'===========================================================
dim patternMatch!
dim operator$
dim queryString$
dim retCode%
'*********************************************************
'possible operators are "< ", "> ", "<= ", ">= "
'To enable pattern matching, set patternMatch to TRUE
'(Patternmatch only works for columns of type TEXT)
'*********************************************************
operator$ = ""
patternMatch! = FALSE 'if no text, no query
if src.Text = "" then
  queryString$ = ""
else
```

```
if patternMatch! then
  queryString$ = "like " + dest.FormatCriteria(destColumn, src.Text + "*")
else
  if operator$ <> "" then
    queryString$ = operator$ + dest.FormatCriteria(destColumn, src.Text)
  else
    queryString$ = dest.FormatCriteria(destColumn, src.Text)
  end if
end if
end if 'set the query string
retCode% = dest.cellSetQuery(1, destColumn, queryString$)
retCode% = dest.executeQuery()

[CellSetQuery]
summary=Copies the text of source object to destination data object query cell without
formatting.
source=CommandButton;OptionButton;TextBox
destination=DataQueryCell
comments=
CODE=
'==================================================
'Copy text from source object to the query cell
'of the destination object.
'==================================================
dim retCode%

'set the query cell criteria
retCode% = dest.cellSetQuery(1, destColumn, src.Text)

[CellSetQueryAndExecute]
summary=Copies the text of source object to destination data object query cell without
formatting, and executes query.

source=CommandButton;OptionButton;TextBox
destination=DataQueryCell
comments=
CODE=
'==================================================
'Copy text from source object to the query cell
'of the destination object and executes query.
'==================================================
dim retCode%
```

App - 51

```
'set the query cell criteria
retCode% = dest.cellSetQuery(1, destColumn, src.Text)
retCode% = dest.ExecuteQuery()
```

[CellSetQueryFromCell]
summary=Copies the contents of the source data object data cell (formats the copied data cell
contents based on the data type of the query cell) to query cell in destination data object.
source=DataColumnLabel
destination=DataQueryCell
comments=
CODE=

```
'==================================================
'Set query cell from current source object result cell.
'Destination cleared if source data object has no rows
'================================================== dim s$
dim retCode%
if src.resultRowCount > 0 then
   s$ = dest.formatCriteria(destColumn, src.cellGetData(src.currentRow, srcColumn))
   retCode% = dest.cellSetQuery(1, destColumn, s$)
else
   'if no rows in source object, then clear result matrix here
   retCode% = dest.resultDestroy()
end if
```

[CellSetQueryFromCellAndExecute]
summary=Copies the contents of the source data object data cell (formats the copied data cell
contents based on the data type of the query cell) to query cell in destination data object, and
execute the query.
source=DataColumnLabel
destination=DataQueryCell
comments=
CODE=

```
'==================================================
'Set query cell from current source object result cell,
'and execute query. If source object has no rows, then
'the destination object is cleared.
'================================================== dim s$
dim retCode%
if src.resultRowCount > 0 then
   s$ = dest.formatCriteria(destColumn, src.cellGetData(src.currentRow, srcColumn))
   retCode% = dest.cellSetQuery(1, destColumn, s$)
   retCode% = dest.ExecuteQuery()
```

```
else
   'if no source object rows, clear result matrix here
   retCode% = dest.resultDestroy()
end if
```

[CellSetQueryFromGroup]
summary=Copies the text of the selected option button in source group box to destination data object query cell, formats the text based on the data type of the query cell.

source=Group
destination=DataQueryCell
comments=
CODE=

```
'===========================================================
'Set query cell with text of last option button that
'is in the "on" state in the source group box.
'===========================================================
dim optButton as OptionButton
dim obj as Object
dim objName$
dim found%
dim s$
dim retCode% found% = FALSE
objName$ = src.FindObject("", FINDFIRST)
while objName$ <> "" and not found%
   set obj = bind(objName$ )
   if obj.class() = "OptionButton" then
      set optButton = bind(objName$)
      if optButton.state <> FALSE then
         found% = TRUE
      end if
   end if
   objName$ = src.FindObject(objName$, FINDNEXT)
wend if found% then
   s$ = dest.formatCriteria(destColumn, optButton.text)
   retCode% = dest.cellSetQuery(1, destColumn, s$)
end if
```

[CellSetQueryFromGroupAndExecute]
summary=Copies the text of the selected option button in source group box to destination data object query cell, formats the text based on the data type of the query cell, and executes the query.
source=Group
destination=DataQueryCell
comments=
CODE=
'==================================================
'Set query cell with text of last option button that
'is in "on" state in source group box; execute query.
'==================================================
dim optButton as OptionButton
dim obj as Object
dim objName$
dim found%
dim s$
dim retCode% found% = FALSE
objName$ = src.FindObject("", FINDFIRST)
while objName$ <> "" and not found%
   set obj = bind(objName$ )
   if obj.class() = "OptionButton" then
     set optButton = bind(objName$)
     if optButton.state <> FALSE then
       found% = TRUE
     end if
   end if
   objName$ = src.FindObject(objName$, FINDNEXT)
wend if found% then
   s$ = dest.formatCriteria(destColumn, optButton.text)
   retCode% = dest.cellSetQuery(1, destColumn, s$)
   retCode% = dest.ExecuteQuery()
end if

[CellSetQueryFromList]
summary=Copies the text of the selected item in source single-selection list box (or combo box) to destination data object query cell (formats the text based on the data type of the query cell).
source=ComboBox;ListBox
destination=DataQueryCell
comments=
CODE=
'==================================================

```
'Set query cell with the text of the current
'selected item in listbox or combobox.
'================================================= dim index%
dim s$
dim retCode% s$ = ""
index% = src.ItemSelected
if index% > 0 then
    s$ = dest.formatCriteria(destColumn, src.ItemGet(index%))
    's$ contains the formatted value
end if
retCode% = dest.cellSetQuery(1, destColumn, s$)
```

[CellSetQueryFromListAndExecute]
summary=Copies the text of the selected item in source single-selection list box (or combo box) to destination data object query cell (formats the text based on the data type of the query cell) and execute query.
source=ComboBox;ListBox
destination=DataQueryCell
comments=
CODE=

```
'=================================================
'Set query cell with the text of current selected
'item in listbox or combobox, and execute a query.
'================================================= dim index%
dim s$
dim retCode% s$ = ""
index% = src.ItemSelected
if index% > 0 then
    s$ = dest.formatCriteria(destColumn, src.ItemGet(index%))
    's$ contains formatted value
end if
retCode% = dest.cellSetQuery(1, destColumn, s$)
retCode% = dest.ExecuteQuery()
```

[CellSetQueryFromMultiList]
summary=Copies the text of the selected items in source list box (separated by "OR") to destination data object query cell (formats the text based on the data type of the query cell).
source=ListBox
destination=DataQueryCell
comments=
CODE=
'=================================================
'Set query cell with the text of selected items in
'a multi-select listbox using "OR" separator.
'=================================================
dim index%
dim s$
dim addSep!
dim sep$
dim retCode%
'*************************************************************
'separator can be changed in following line, if desired
'*************************************************************
sep$ = " OR "

s$ = ""
index% = src.ItemGetNextSel(0)
if index% > 0 then
  s$ = ""
  addSep! = FALSE
  while index% > 0
    if addSep! then
      s$ = s$ + sep$
    end if
    s$ = s$ + dest.formatCriteria(destColumn, src.ItemGet(index%))
    addSep! = TRUE
    index% = src.ItemGetNextSel(index%)
  wend
end if
retCode% = dest.cellSetQuery(1, destColumn, s$)

[CellTransferValue]
summary=Copies the contents of the current data cell in one data object to the current data cell in another data object and displays the copied value without updating the underlying data source table(s).
source=DataColumnLabel
destination=DataColumnLabel
comments=
CODE=
'=================================================

'Sets destination result cell value to that of currently
'selected result cell from the source result cell.
'==============================================
dim retCode%
dim updateValue$
if dest.currentRow > 0 Then            'If there is at least one row
    if dest.RowOpen(dest.CurrentRow) > 0 then    'If RowOpen returns a valid row number
        updateValue$ = src.cellGetData(src.CurrentRow, srcColumn)
        retCode% = dest.cellSetData(dest.currentRow, destColumn, updateValue$)
        retCode% = dest.Repaint()
    end if
end if

[Clear]
summary=Removes all items from a list box or combobox.
source=CommandButton;Ellipse;OptionButton;Rectangle;TextBox
destination=ComboBox;ListBox
comments=
CODE=
'==============================================
'Clears destination list or combo box
'==============================================
Dest.Clear

[ColumnContentsUnique]
summary=Copies the contents of a column in source data object to destination object,
eliminating duplicates.
source=DataColumnLabel
destination=ComboBox;DataColumnLabel;ListBox
comments=
CODE=
'==============================================
'Fill destination object with unique values from
'a data object column. s$ contains the column unique
'values, separated by a <CR> delimiter
'==============================================
dim s$
s$ = src.columnContentsUnique(srcColumn)
dest.contents = s$

[CopyContents]
summary=Copies the entire contents of source object to destination object.
source=ComboBox;DataTitleBar;ListBox
destination=ComboBox;DataTitleBar;ListBox

```
comments=
CODE=
'==========================================
'Copy contents of source object to destination.
'Note: Contents to be copied is limited to 64K.
'========================================== dest.contents = src.contents

[CopyContentsToText]
summary=Copies the entire contents of source object to destination text box.
source=ComboBox;DataTitleBar;ListBox
destination=TextBox
comments=Destination textbox should be setup as multiline.
CODE=
'==========================================
'Copies the source object contents to destination
'text. Note: Contents to be copied is limited to 64K.
'========================================== dest.text = src.contents

[CopyResultRowCount]
summary=Copies the number of rows in the result set of source data object as the text of
destination object.
source=DataTitleBar
destination=Rectangle;Ellipse;TextBox;StaticText
comments=
CODE=
'==========================================
'Copy source data object row count to destination.
'========================================== dest.text = str$(src.ResultRowCount)

[CopyValue]
summary=Copies the value of the source scroll bar to the text of the destination object.
source=ScrollBar
destination=CheckBox;CommandButton;Ellipse;Group;OptionButton;Rectangle;StaticText;Text
Box
comments=
CODE=
'==========================================
'Converts scrollbar numerical value to text and
'copies this to destination as text.
'========================================== dest.Text = ltrim$(str$(src.value))
```

[CopyValueToQuery]
summary=Converts the value of a scroll bar to text and copies the text without formatting it to destination data object query cell.
source=ScrollBar
destination=DataQueryCell
comments=
CODE=
'================================================================
'Converts scrollbar numerical value to text and
'copies this to destination query cell.
'================================================================
dim retCode%
retCode% = dest.cellSetQuery(1, destColumn, ltrim$(str$(src.value)))

[CopyValueToQueryAndExecute]
summary=Converts the value of a scroll bar to text, copies the text without formatting it to destination data object query cell, and executes the query.
source=ScrollBar
destination=DataQueryCell
comments=
CODE=
'================================================================
'Converts scrollbar numerical value to text, copies
'to destination query cell, and executes a query
'================================================================
dim retCode%
retCode% = dest.cellSetQuery(1, destColumn, ltrim$(str$(src.value)))
retCode% = dest.ExecuteQuery()

[CopyValueToValue]
summary=Copies the value of source scroll bar to destination scroll bar value.
source=ScrollBar
destination=ScrollBar
comments=
CODE=
'================================================================
'Copy source scrollbar numerical value to destination
'scrollbar value.
'================================================================
dest.value = src.value

[Directory]
summary=Fills destination list box with a list of files from the current directory (by default) or from another directory specified in the link behavior code.

```
source=CheckBox;CommandButton;Ellipse;OptionButton;Rectangle;TextBox
destination=ListBox;ComboBox
comments=
CODE=
'==========================================================
' Fill destination listbox with directory
'==========================================================
dim path$
dim pattern$
dim fileType%
'**********************************************************
'For a particular subdirectory, set path$ - path must
'be terminated with a "\". example: path$ = "c:\dos\"
'Note: If you set path$ to a value, user will not
'be able to do directory navigation in source textbox
'**********************************************************
path$ = ""
'**********************************************************
'pattern$ can be changed. example: pattern$ = "*.bmp"
'**********************************************************
pattern$ = "*.*"
if src.class() = "TextBox" and src.text <> "" then
    pattern$ = src.text
end if
'**********************************************************
'fileType% values: READONLY, HIDDEN, SYSTEM, DIRECTORY
'ARCHIVED, NORMAL
'**********************************************************
fileType% = NORMAL dest.clear
Call dest.dir(path$ + pattern$, fileType%)

[DoEventClick]
summary=Causes a click event to occur for a command button.
source=CommandButton;Ellipse;OptionButton;Rectangle;StaticText;TimerObject
destination=CommandButton
comments=
CODE=
'==========================================================
'Send click event to destination Command Button.
'==========================================================
dim retCode%
retCode% = dest.DoEvent("click")
```

App - 60

[DrawChart]
summary=Redraws destination chart using current data from the data object associated with the chart.
source=CheckBox;CommandButton;DataTitleBar;OptionButton;TimerObject
destination=Chart
comments=
CODE=
'===========================================
'Cause destination chart to draw.
'===========================================
dim retCode%
retCode% = dest.DrawChart()

[EditChart]
summary=Edit destination chart definition.
source=CommandButton;OptionButton
destination=Chart
comments=
CODE=
'===========================================
'Edit chart definition
'===========================================
dim retCode%
retCode% = dest.EditChart()

[ExecuteQuery]
summary=Executes the query currently defined for a data object and displays the results of the query.
source=CommandButton;DataTitleBar;TimerObject
destination=DataTitleBar
comments=
CODE=
'===========================================
'Cause the data object to execute its current query.
'===========================================
dim retCode%
retCode% = Dest.ExecuteQuery()

[ExecuteUpdate]
summary=Execute pending data object updates (Insert/Modify/Delete); both the underlying data source table(s) and data display will be updated.
source=CommandButton
destination=DataTitleBar
comments=

```
CODE=
'==========================================================
'Execute pending data object updates
'(Insert/Modify/Delete).
'==========================================================
dim retCode%
retCode% = Dest.ExecuteUpdate()

[ExecuteVerb]
summary=Execute the primary verb for the OLE object.
source=CommandButton;OptionButton
destination=Ole
comments=
CODE=
'==========================================================
'Execute verb for the OLE object
'The default is the primary verb (0)
'==========================================================
dim verb%
verb = 0
ret% = dest.OLEExecuteVerb(verb)

[ExportText]
summary=Creates a text file and copies each row of a destination data object to a separate line in
the file.
source=CommandButton;OptionButton
destination=DataTitleBar
comments=
CODE=
'==========================================================
'Writes contents of destination data object to text
'file (filename is made up of first 8 characters of
'data object with .OUT extension.
'Data column items are quote and comma delimited.
'==========================================================
dim outputFile$
dim fileexists as integer
dim answer as integer
dim r as long
dim c as long
dim temp$
dim FileHandle as integer
```

```
outputFile$ = left$(Dest.Name,8)+".OUT"

If dest.ResultRowCount > 0 Then
  FileHandle = FreeFile            'Get the next free file handle On Error Resume Next Open OutputFile$ For Input As #FileHandle
  If Err = 0 Then
    Close #FileHandle
    answer = MessageBox("Overwrite existing file " + outputFile$ + "?", 4, "ExportText")
    If answer <> 6 Then Exit Function    'The answer is not Yes so exit
  End If
  open outputFile$ for output as #FileHandle
    for r = 1 to dest.ResultRowCount        'Loop through result rows of the data object
      for c = 1 to dest.ResultColumnCount   'Loop through columns of the result rows
        'To exclude a column, for example hidden columns, uncomment the next line and the End If
        'and replace the 1 with the column number you want to exclude.
        'If c <> 1 Then
          temp$ = dest.CellGetData(r,c)     'Get the column's value
          print #FileHandle, chr$(34)+temp$+chr$(34);       'Print it to the file in quotes
        'End If
        if c < dest.ResultColumnCount then print #FileHandle,",";  'If we are not on the last column then we need a comma
      next c
      print #FileHandle,              'This ends the current line in the file
    next r
  close #FileHandle MessageBox "Table exported to " + OutputFile$ + " in " + CurDir$, 0, "ExportText"
End If

[FillFromFile]
summary=Copies each line in a text file to a separate line in a list box (or combo box).
source=CommandButton;Ellipse;OptionButton;Rectangle;TextBox
destination=ListBox;ComboBox
comments=
CODE=
'==========================================================
'Copies text of file to list box or combo box, one
'line at a time. File name is taken from source text.
'==========================================================
dim FileName$
```

```
dim OneLine$
dim FileHandle as integer

FileName$ = src.Text
'*******************************************************
'Modify FileName$ here (add paths, etc)
'Example: FileName$ = "\windows\"+FileName$
'*******************************************************

FileHandle = FreeFile              'Get the next free file handle
open FileName$ for input as #FileHandle
    dest.Clear                     'Clear every item from the list
                                   'before starting to add
    do while not eof(FileHandle)
        line input #FileHandle, OneLine$   'read a single line from the file
        if dest.ItemAdd(OneLine$) then     'if can't add any more, then
            exit do                        'finish this routine
        end if
    loop close #FileHandle

[FillFromListFile]
summary=Copies each line from the file specified by the selected item in source single-selection
list box (or combo box) to a separate line in destination list box (or combo box).
source=ListBox;ComboBox
destination=ListBox;ComboBox
comments=
CODE=
'===========================================================
'Copies text of the file specified by selected item in
'source listbox to destination, one line at a time.
'If the source object is a simple or dropdown combo and
'you wish to get the combo textbox text, then you will
'need to define a second FillFromListFile link with
'an "enter" cause event, and uncomment the second
'FileName$ line below.
'===========================================================
dim FileName$
dim OneLine$
dim FileHandle as integer FileName$ = src.itemGet(src.itemSelected)
'uncomment for second link if source is simple or dropdown combo
```

```
'FileName$ = src.text

'*******************************************************
'Modify FileName$ here (add path, etc) if desired
'Example: FileName$ = "\windows\"+FileName$
'*******************************************************

FileHandle = FreeFile              'Get the next free file handle
open FileName$ for input as #FileHandle
    dest.Clear                     'Clear any items from the listbox before
                                   'starting to add
    do while not eof(FileHandle)
        line input #FileHandle, OneLine$    'read a single line from the file
        if dest.ItemAdd(OneLine$) then      'if can't add any more, then
            exit do                         'exit the loop
        end if
    loop close #FileHandle
```

[FindFromCell]
summary=Selects an item in a single-selection list box (or combo box) that matches (prefix) the text in the data object column.
source=DataColumnLabel
destination=ComboBox;ListBox
comments=
CODE=

```
'=========================================================
'Select list box or combo box entry that matches the
'data object result cell value.
'=========================================================
dim s$
dim index%
if src.currentRow > 0 Then        'If there is at least one row
    s$ = src.cellGetData(src.currentRow, srcColumn)
    index = dest.ItemFindExact(s$, 0)
else
    index = 0
end if
if index < 0 then index = 0       'if not found, select 0 which unselects.
dest.ItemSelected = index
If dest.Class() = "ListBox" then Call dest.SetProperty("ItemTopVisible", Str$(index))
```

[FirstRow]

summary=Selects the first row in the result set of a data object.
source=CommandButton;OptionButton
destination=DataTitleBar
comments=
CODE=
'=========================================
'Moves selection to first record
'in data object result set
'=========================================
if Dest.ResultRowCount > 0 then
    Dest.CurrentRow = 1
    Call Dest.Repaint()
End If

[ItemAdd]
summary=Adds the text of an object as an item in a list box (or combo box), whether or not the text is already in the list.
source=CheckBox;CommandButton;Ellipse;OptionButton;Rectangle;TextBox
destination=ListBox;ComboBox
comments=
CODE=
'=========================================
'Add entry to destination list box (or combo box).
'Additions are sequential, duplicates will be added.
'=========================================
dim st%

If Src.Class() = "CheckBox" Or Src.Class() = "OptionButton" Then
    If Val(Src.GetProperty("State"))<>FALSE Then st% = dest.ItemAdd(src.text)
Else
    st% = dest.ItemAdd(src.text)
End If '*******************************************************
'Clear the source text in preparation for adding next
'item. Useful if doing a repetitive add operation.
'Remove comment from line below if desired.
'*******************************************************
'src.text = ""

[ItemAddUnique]
summary=Adds the text of an object as an item in a list box (or combo box); duplicates are not added.
source=CheckBox;CommandButton;Ellipse;OptionButton;Rectangle;TextBox

```
destination=ListBox;ComboBox
comments=
CODE=
'========================================================
'Add unique source text entry to list box.
'========================================================
dim n%, st%
'check to see if destination already contains entry
n% = dest.ItemFindExact(src.text,0)

'If unique, then add the entry to destination
if n% = -1 then
   If Src.Class() = "CheckBox" Or Src.Class() = "OptionButton" Then
      If Val(Src.GetProperty("State"))<>FALSE Then st% = dest.ItemAdd(src.text)
   Else
      st% = dest.ItemAdd(src.text)
   End If
End if '********************************************************
'Clear the source text in preparation for adding next
'item. Useful if doing a repetitive add operation.
'Remove comment from line below if desired.
'********************************************************
'src.text = ""

[ItemFind]
summary=Selects the first string in a single-selection list box (or combo box) that matches the
source text (prefix match).
source=CheckBox;CommandButton;Ellipse;OptionButton;Rectangle;TextBox
destination=ListBox;ComboBox
comments=
CODE=
'========================================================
'Find a string in a list box or combo box. Only
'works for single selection list boxes; combo boxes.
'========================================================
dim findStr$
findStr$ = src.text dest.ItemSelected = dest.ItemFind(findStr$, 0)

[IterateOverDataObject]
summary=Selects each destination data object row in turn, causing the RowSelect event to occur
``` for each row.
source=CommandButton;OptionButton;TimerObject
destination=DataTitleBar
comments=Iterates over the data object, selecting each row in turn (and firing the RowSelect event, which can be used to trigger other links)
CODE=
```
'===============================================
'Selects every row in the destination object in turn,
'triggering RowSelect event.
'===============================================
dim i as long
for i = 1 to dest.ResultRowCount
  dest.CurrentRow = i
  call dest.repaint()
next i
```

[LastRow]
summary=Selects the last row in the result set of a data object.
source=CommandButton;OptionButton
destination=DataTitleBar
comments=
CODE=
```
'===============================================
'Moves selection to last record
'in data object result set
'===============================================
if Dest.CurrentRow < Dest.ResultRowCount then
    Dest.CurrentRow = Dest.ResultRowCount
    Call Dest.Repaint()
end if
```

[NextRow]
summary=Selects the next row in the result set of a data object.
source=CommandButton;OptionButton
destination=DataTitleBar
comments=
CODE=
```
'===============================================
'Moves selection to next record in
'data object result set
'===============================================
if Dest.CurrentRow < Dest.ResultRowCount then
    Dest.CurrentRow = Dest.CurrentRow + 1
    Call Dest.Repaint()
``` end if

[PictureCopy]
summary=Copies a picture from one object to another.
source=CommandButton;Ellipse;Rectangle;Group
destination=CommandButton;Ellipse;Rectangle;Group
comments=
CODE=
'===================================================
'Copies picture from source object to destination.
'===================================================
dim retCode%
retCode% = dest.PictureCopy(src.name)

[PictureLoad]
summary=Loads a picture from a file (bitmap or metafile) into an object when source text not null(""), else clears the picture.
source=Rectangle;CheckBox;Ellipse;TextBox;CommandButton;OptionButton
destination=Rectangle;Ellipse;Group;CommandButton
comments=
CODE=
'===================================================
'Load picture (bitmap or metafile) into graphic
'object. File name is taken from source text.
'===================================================
dim fileName$
dim retCode%
fileName$ = src.Text '**************************************************************
'Modify fileName$ here if you need to -- for example:
'fileName$ = "\windows\"+fileName$
'************************************************************** retCode% = Dest.PictureLoad(fileName$)

[PictureLoadFromList]
summary=Loads a picture into an object from the file (bitmap or metafile) named by the selected item in a single-selection list box (or combo box).
source=ComboBox;ListBox
destination=Rectangle;Ellipse;Group;CommandButton
comments=
CODE=
'===================================================

```
'Load picture (bitmap or metafile) into graphic
'object. Selected item in single selection listbox
'(or combobox) is used as file name.
'If the source object is a simple or dropdown combo and
'you wish to get the combo textbox text, then you will
'need to define a second PictureLoadFromList link with
'an "enter" cause event, and uncomment the second
'fileName$ line below.
'===========================================================
dim filename$
dim retCode%
fileName$ = src.ItemGet(src.ItemSelected)
'uncomment for second link if source is simple or dropdown combo
'fileName$ = src.text '*********************************************************
'Modify fileName$ here if you need to -- for example:
'fileName$ = "\windows\"+fileName$
'********************************************************* retCode% = Dest.PictureLoad(fileName$)
```

[PreviousRow]
summary=Selects the previous row in the result set of a data object.
source=CommandButton;OptionButton
destination=DataTitleBar
comments=
CODE=

```
'===========================================================
'Moves selection to previous record in
'data object result set.
'===========================================================
if Dest.CurrentRow > 1 then
  Dest.CurrentRow = Dest.CurrentRow - 1
  Call Dest.Repaint()
end if
```

[PrintChart]
summary=Prints destination chart.
source=CommandButton;OptionButton;TimerObject
destination=Chart
comments=
CODE=

```
'===========================================================
'Cause destination chart to print.
```

```
'==================================================
dim retCode%
retCode% = dest.PrintChart()

[PrintPreview]
summary=Previews the report associated with a data object.
source=CommandButton;OptionButton;TimerObject
destination=DataTitleBar
comments=
CODE=
'==================================================
' Preview report for data object
'==================================================
dim retCode%
retCode% = dest.PrintPreview()

[PrintReport]
summary=Prints the report associated with a data object.
source=CommandButton
destination=DataTitleBar
comments=
CODE=
'==================================================
'Print report for data object.
'==================================================
dim retCode%
retCode% = dest.PrintReport()

[RowDelete]
summary=Deletes the current row in a data object.
source=CommandButton;OptionButton
destination=DataTitleBar
comments=
CODE=
'==================================================
'Delete selected row in destination data object.
'==================================================
dim retCode%
if dest.currentRow > 0 Then          'If there is at least one row
   retCode% = Dest.RowMarkForDelete(Dest.CurrentRow)
   if retCode% >= ADT_OK then
      retCode% = Dest.ExecuteUpdate()
   end if
```

App - 71 end if

[RowNew]
summary=Appends a new row at the end of a data object.
source=CommandButton;OptionButton
destination=DataTitleBar
comments=
CODE=
'======================================================
'Open new data object row at end.
'======================================================
dim retCode%
retCode% = Dest.RowNew()

[ScrollSetBackColor]
summary=Sets the background color of an object to the color associated with the value of a scoll bar.
source=ScrollBar
destination=CheckBox;ComboBox;Ellipse;Group;ListBox;Rectangle;TextBox
comments=
CODE=
'======================================================
'Set the backcolor of destination object based on
'scoll bar movement. Only 16 solid colors are used.
'======================================================
dim ColorValue&

'set scrollbar min, max, and change amounts to
'accomodate 16 colors
src.Min = 0
src.Max = 15
src.LargeChange =1 select Case src.value
     case 0
        ColorValue& = WHITE&
     case 1
        ColorValue& = DARK_RED&
     case 2
        ColorValue& = RED&
     case 3
        ColorValue& = YELLOW&
     case 4
        ColorValue& = DARK_YELLOW&

```
        case 5
          ColorValue& = GREEN&
        case 6
          ColorValue& = DARK_GREEN&
        case 7
          ColorValue& = CYAN&
        case 8
          ColorValue& = DARK_CYAN&
        case 9
          ColorValue& = DARK_MAGENTA&
        case 10
          ColorValue& = MAGENTA&
        case 11
          ColorValue& = BLUE&
        case 12
          ColorValue& = DARK_BLUE&
        case 13
          ColorValue& = LIGHT_GRAY&
        case 14
          ColorValue& = DARK_GRAY&
        case 15
          ColorValue& = BLACK&
end select
'apply the color to destination
dest.Backcolor = ColorValue&
```

[ScrollSetForeColor]
summary=Sets the foreground (text) color of destination object to the color associated with the value of a scoll bar.
source=ScrollBar
destination=ListBox;ComboBox;TextBox;Rectangle;Ellipse;CheckBox;OptionButton;StaticText;Group
comments=
CODE=

```
'=========================================================
'Set the forecolor (text) of destination object
'based on scollbar value. 16 solid colors are used.
'=========================================================
dim ColorValue&

'set scrollbar min, max, and change to accomodate 16 colors
src.Min = 0
src.Max = 15
src.LargeChange =1
```

```
select Case src.value
      case 0
        ColorValue& = WHITE&
      case 1
        ColorValue& = DARK_RED&
      case 2
        ColorValue& = RED&
      case 3
        ColorValue& = YELLOW&
      case 4
        ColorValue& = DARK_YELLOW&
      case 5
        ColorValue& = GREEN&
      case 6
        ColorValue& = DARK_GREEN&
      case 7
        ColorValue& = CYAN&
      case 8
        ColorValue& = DARK_CYAN&
      case 9
        ColorValue& = DARK_MAGENTA&
      case 10
        ColorValue& = MAGENTA&
      case 11
        ColorValue& = BLUE&
      case 12
        ColorValue& = DARK_BLUE&
      case 13
        ColorValue& = LIGHT_GRAY&
      case 14
        ColorValue& = DARK_GRAY&
      case 15
        ColorValue& = BLACK&
end select
'apply color to destination object
dest.forecolor = ColorValue&

[Select]
summary=Selects an item in a combo or list box by number (1 based, 0 deselects all).
source=CheckBox;CommandButton;Ellipse;OptionButton;Rectangle;TextBox
destination=ComboBox;ListBox
comments=
CODE=
'=========================================================
```

'Selects entry in single selection listbox or
'combobox by number (1 based, 0 deselects all).
'========================================================
dim SrcInput%
dim SrcClassname$    'classname of source var
dim DestClassname$   'classname of destination
dim DestSelectCount$
dim StateValue$              'return value for source state '========================================================
'note: user may use source other than input text for
'select criteria
'========================================================
SrcInput% = val(src.Text)    'def source value from text property
SrcClassname$ = src.class()         'get the source class
DestClassname$ = dest.class()       'get the destination class
if DestClassname$ = "ListBox" then
   DestSelectCount$ = dest.getproperty("ItemSelCount")
else
   DestSelectCount$ = "0"
end if
select case SrcClassname$            'find out what we have
   case "CheckBox", "OptionButton"         'add only on check for checkbox
      StateValue$ = src.GetProperty ("state")
      if val(StateValue$) = TRUE then
         dest.ItemSelected = SrcInput%       'select item
      elseif val(DestSelectCount$) > 1 then
         dest.ItemSelected = SrcInput%       'de-select single item if multi-select LB
      elseif dest.ItemSelected = SrcInput% then
         dest.ItemSelected = 0           'de-select all if single select and current selection is = SrcInput%
      end if
   case else                         'if not a checkbox or option button then add on each event
      dest.ItemSelected = SrcInput%       'add source text item
end select

[SetAndDrawChart]
summary=Sets source data object as the data source for a chart and draws the chart using data from the data object.
source=DataTitleBar
destination=Chart
comments=
CODE=
'=============================================

'Set data source for chart and draw chart.
'=============================================
dim retCode%, i%
dest.ChartSource = src.name
For i = 1 To src.ResultColumnCount
    retCode% = dest.SetColumnUsage(i, DONTCHART)
Next i
retCode% = dest.DrawChart()

[SetGroupOptionFromCell]
summary=Finds the group box option button whose text matches the text of the data object column current cell and sets the option button on.
source=DataColumnLabel
destination=Group
comments=
CODE=
'=============================================
'Set option button within group box whose
'text matches the source data object result
'cell text to "on" state.
'=============================================
dim optButton as OptionButton
dim obj as Object
dim found%
dim objName$ found% = FALSE
if src.currentRow > 0 Then                    'If there is at least one row
    s$ = src.cellGetData(src.currentRow, srcColumn)   'Get the current cell's value
else
    s$ = ""
end if
objName$ = dest.FindObject("", FINDFIRST)      'Find the name of the first object within the group box
do while objName$ <> "" and not found%         'While we find objects but haven't found the one we're looking for
    set obj = bind(objName$)                   'Bind a generic object to the object name
    if obj.class() = "OptionButton" then       'If it is an OptionButton, then
        set optButton = bind(objname$)         'Bind an OptionButton object to it (so we can set the state)
        if optButton.text = s$ then            'If the text matches the cell's value, then
            optButton.state = TRUE             'Set the state to TRUE, this is the one we want
            found%=TRUE                        'We found the one we were looking for
            exit do                            'No need to look any further, we're done

```
    end if
  end if
  objName$ = dest.FindObject(objName$, FINDNEXT)    'Get the next object's name
loop
```

[SetStateFromCell]
summary=Sets the state of a check box, command button, or option button on when its text matches the text of the current cell in the result set of a data object, or sets the state off when the text does not match.
source=DataColumnLabel
destination=CheckBox;OptionButton;CommandButton
comments=
CODE=

```
'========================================
'If text of destination object matches data
'object result cell, then set state to be "on"
'or checked state, else set state to be "off"
'========================================
dim s$
if src.currentRow > 0 Then              'If there is at least one row
   s$ = src.cellGetData(src.currentRow, srcColumn)  'Get the cell's value
else
   s$ = ""
end if
if dest.Text = s$ then                  'If the text matches, then
   dest.State = TRUE                        'Set it "on"
else                                    'Otherwise
   dest.State = FALSE                       'Set it "off"
end if
```

[SetTimerInterval]
summary=Sets the tick interval for destination timer from the value of the text of the source object.
source=CommandButton;Ellipse;OptionButton;Rectangle;StaticText;TextBox
destination=TimerObject
comments=
CODE=

```
'========================================
'Set destination timer tick interval.
'======================================== dest.interval = val(src.text)
```

[SetValue]
summary=Sets the value of a scroll bar from the value of the text of the source object.

App - 77 source=Ellipse;OptionButton;Rectangle;StaticText;TextBox
destination=ScrollBar
comments=
CODE=
'================================================================
'Sets scroll bar value from text of source object.
'================================================================ dest.value = val(src.text)

[SetVendorRetrievalAndExecute]
summary=Sets the vendor retrieval query string for destination data object from the text of source object, and executes the query.
source=OptionButton;TextBox
destination=DataTitleBar
comments=
CODE=
'================================================================
'Set data object vendor retrieval string with source
'object text and trigger query execution.
'================================================================ dim retCode%
dest.VendorRetrieval = src.text
retCode% = dest.ExecuteQuery()

[SetVendorRetrievalFromGroupAndExecute]
summary=Sets the vendor retrieval query string for a data object from the text of the selected option button in a group box, and executes the query.
source=Group
destination=DataTitleBar
comments=
CODE=
'================================================================
'Set data object vendor retrieval property using text
'of selected option button within the group.
'================================================================ dim optButton as OptionButton
dim obj as Object
dim objName$
dim found%
dim retCode% found% = FALSE
objName$ = src.FindObject("",FINDFIRST)    'Find the name of the first object within the group box

```
while objName$ <> "" and not found%         'While we find an object but not the one we're
looking for
  set obj = bind(objName$)                  'Bind a generic object to the object name if obj.class() = "OptionButton" then      'If it's and OptionButton, then
    set optButton = bind(objName$)            'Bind an OptionButton object to it (so we can get
the state)
    if optButton.state <> FALSE then         'If the state is True, then
      found% = TRUE                          'we found the object we want
    end if
  end if
  objName$ = src.FindObject(objName$,FINDNEXT)  'Get the next object's name
wend
if found% then                              'If we found a True OptionButton, then
  dest.VendorRetrieval = optButton.text       'Set the data object's vendor retrieval property to
it's text
else                                        'Otherwise
  dest.VendorRetrieval = ""                  'Make it blank
end if
retCode% = dest.ExecuteQuery()              'Execute the data object's query
```

[SetVendorRetrievalFromListAndExecute]
summary=Sets the vendor retrieval query string for destination data object from the text of the
selected item in a single-selection list box (or combo box), and executes the query.
source=ComboBox;ListBox
destination=DataTitleBar
comments=This only works from single-selection list boxes.
CODE=

```
'===========================================================
'Set data object vendor retrieval property and
'execute query using using the selected item in
'single selection list or combobox.
'===========================================================
dim index%
dim retCode%
index% = src.ItemSelected
if index% > 0 then
  dest.VendorRetrieval = src.ItemGet(index%)
  retCode% = dest.ExecuteQuery()
end if
```

[StateCellSetData]
summary=Copies the text of the source object to the current data cell in destination data object
when the source object is "on", or clears cell when the source object is "off".

```
source=CheckBox;CommandButton
destination=DataColumnLabel
comments=
CODE=
'==========================================================
'Update data object result cell with source object
'text if the source object is checked or in "on" state,
'else clears the result cell.
'==========================================================
dim updateValue$
dim retCode% if dest.currentRow > 0 Then              'If there is at least one row
   if dest.RowOpen(dest.CurrentRow) > 0 then    'If RowOpen returns a valid row number
      if src.State <> FALSE then
         updateValue$ = src.text
         retCode% = dest.CellSetData(dest.CurrentRow, DestColumn, updateValue)
      else
         retcode% = dest.CellRevert(dest.Currentrow, DestColumn)
      end if
      retCode% = dest.Repaint()
   end if
end if

[StateCellSetQuery]
summary=If source object state is "on", copies the source object text to destination data object
query cell, formatting the text based on the data type of the query cell; when the source object
state is "off", clears the query cell.
source=CheckBox;CommandButton
destination=DataQueryCell
comments=
CODE=
'==========================================================
'Update data object query cell with source object
'text if state is "on", else clears the query cell
'==========================================================
dim s$
dim retCode%
if src.State <> FALSE then
      s$ = dest.formatCriteria(destColumn, src.text)
      retCode% = dest.cellSetQuery(1, destColumn, s$)
else
      retCode% = dest.cellSetQuery(1, destColumn, "")
end if
```

App - 80

[StateCellSetQueryAndExecute]
summary=If source object state is "on", copies the source object text to destination data object query cell, formatting the text based on the data type of the query cell; when the source object state is "off", clears the query cell. Executes query.
source=CheckBox;CommandButton
destination=DataQueryCell
comments=
CODE=
'================================================
'Update data object query cell with source object
'text if state is "on", else clears the query cell.
'Query is then executed.
'================================================
```
dim s$
dim retCode%
if src.State <> FALSE then
     s$ = dest.formatCriteria(destColumn, src.text)
     retCode% = dest.cellSetQuery(1, destColumn, s$)
else
     retCode% = dest.cellSetQuery(1, destColumn, "")
end if
retCode% = dest.ExecuteQuery()
```

[StateSetProperty]
summary=Sets destination object property based on the state of source object.
source=CheckBox;CommandButton
destination=Chart;CheckBox;ComboBox;CommandButton;DataTitleBar;Ellipse;Group;LineObject;ListBox;Ole;OptionButton;Rectangle;ScrollBar;StaticText;TextBox
comments=
CODE=
'================================================
'Toggles property between 2 values based on state of
'source object. 'Note: default property is "visible"
'================================================
```
dim Result as Integer if src.State = FALSE then
   Result = FALSE
else
   Result = TRUE
end if '********************************************************
'change the property name below if you want to
```

'operate on a different property
'*********************************************************
dest.Visible = Result

[StateSetTimer]
summary=Enables or disables a timer based on the state of source object.
source=CheckBox;CommandButton
destination=TimerObject
comments=
CODE=
'=========================================
'Disable or enable destination timer
'based on source object state.
'=========================================
if src.State <> FALSE then
  if dest.Enabled = FALSE then
    dest.Enabled = TRUE
  end if
else
  dest.Enabled = FALSE
end if

[StateSetValue]
summary=Sets the value of a destination scroll bar to the value of the source object text when source object is on, else sets scrollbar value to minimum.
source=CheckBox;CommandButton
destination=ScrollBar
comments=
CODE=
'=================================================
'Set scroll bar value with the value of source text if
'check box or option button is checked or in "on" state.
'=================================================
if src.State = FALSE then
   dest.value = dest.min
else
   dest.value = val(src.text)
end if

[StateSetVendorRetrievalAndExecute]
summary=Sets the vendor retrieval query string in destination data object to the text of the source object when the source object is turned "on", clears the query string when "off", then executes the query.
source=CheckBox;OptionButton

```
destination=DataTitleBar
comments=
CODE=
'=================================================
'Set data object vendor retrieval property and
'execute query. If the source object is in the
'"on" state, then the source text is used for
'vendor retrieval property, else the it is cleared.
'=================================================
dim retCode%
if src.State <> FALSE then
    dest.VendorRetrieval = src.text
else
    dest.VendorRetrieval = ""
end if
retCode% = dest.ExecuteQuery()
```

[StateTextCopy]
summary=Copies text of the source object to destination object when the source object state is "on", or clear destination text when source object is "off".
source=CheckBox;CommandButton
destination=Rectangle;CheckBox;Ellipse;TextBox;CommandButton;OptionButton;StaticText
comments=
CODE=

```
'=================================================
'Copy source text to destination if source object is
'checked or in "on" state, else clear destination text.
'=================================================
if src.State = FALSE then
    dest.text = ""
else
    dest.text = src.text
end if
```

[TextCopy]
summary=Copies the source object text to the destination object text.
source=ComboBox;CommandButton;Ellipse;OptionButton;Rectangle;StaticText;TextBox
destination=CheckBox;CommandButton;Ellipse;OptionButton;Rectangle;StaticText;TextBox
comments=
CODE=

```
'=================================================
'Copies source text to the destination object.
'=================================================
dest.text = src.text
```

[TextCopyFromCell]
summary=Copies the contents of the source data object current data cell as text to the destination object.
source=DataColumnLabel
destination=TextBox;Rectangle;CheckBox;Ellipse;CommandButton;StaticText;OptionButton
comments=
CODE=
```
'================================================
'Copy data object result cell text to destination.
'================================================ dim s$
if src.ResultRowCount > 0 then
        s$ = src.cellGetData(src.CurrentRow,srcColumn)
else
        s$ = ""
end if
dest.text = s$
```

[TextCopyFromGroup]
summary=Copy the text from the selected option button in source group to the destination object text property.
source=Group
destination=CheckBox;ComboBox;CommandButton;Ellipse;OptionButton;Rectangle;StaticText;TextBox;Group
comments=
CODE=
```
'================================================
'Copy text from the selected option button in the
'source group to destination object text property
'================================================ dim optButton as OptionButton
dim obj as Object
dim objName$
dim found%
dim s$ found% = FALSE
objName$ = src.FindObject("", FINDFIRST)    'Find the name of the first object within the
group box
while objName$ <> "" and not found%         'While we find objects but haven't found the one
we're looking for
   set obj = bind(objName$)                 'Bind a generic object to the object name
   if obj.class() = "OptionButton" then     'If it is an OptionButton, then
      set optButton = bind(objName$)           'Bind an OptionButton object to it (so we can get
```

```
the state)
    if optButton.state <> FALSE then      'If it's state is true, then
       found% = TRUE                      'This is the one we're looking for
    end if
  end if
  objName$ = src.FindObject(objName$, FINDNEXT) 'Get the next object's name
wend if found% then
   dest.text = optButton.text    'Set the destination's text property to the found object's
end if
```

[TextCopyFromList]
summary=Copies the text of the selected item in a single-selection list box (or combo box) to the text of the destination object.
source=ComboBox;ListBox
destination=CheckBox;CommandButton;Ellipse;OptionButton;Rectangle;StaticText;TextBox
comments=
CODE=
```
'===========================================================
'Copy text of selected list box or combo box item to
'destination. (Only works for single select listbox)
'===========================================================
dim index%
index% = src.ItemSelected
if index% > 0 then
   dest.text = src.ItemGet(index%)
end if
```

[TextCopyFromMultiList]
summary=Copies text of selected items in a multi-selection list box to destination object.
source=ListBox
destination=OptionButton;CommandButton;TextBox;Rectangle;CheckBox;Ellipse;StaticText
comments=
CODE=
```
'===========================================================
'Copy selected listbox items to destination text.
'===========================================================
dim index%
dim sep$
dim s$
dim addSep!
'*****************************************************************
'item separator is a comma (,) by default - can change if desired
```

```
'****************************************************************
sep$ = " , "

index% = src.ItemGetNextSel(0)
if index% > 0 then
   s$ = ""
   addSep! = FALSE
   while index% > 0
      if addSep! = TRUE then
         s$ = s$ + sep$
      end if
      s$ = s$ + src.ItemGet(index%)
      addSep! = TRUE
      index% = src.ItemGetNextSel(index%)
   wend
   dest.text = s$
end if
```

[TimerCellSetQueryAndExecute]
summary=When a timer ticks, copies text specified in the link behavior code to destination data
object query cell in a data object and executes the query.
source=TimerObject
destination=DataQueryCell
comments=
CODE=

```
'=================================================================
'Set data object query cell and execute query
'on timer tick
'=================================================================
dim s$
dim retCode%
'*****************************************************
'supply a query value for destination column here
'***************************************************** s$ = ""

retCode% = dest.cellSetQuery(1, destColumn, s$)
retCode% = dest.ExecuteQuery()
```

[TimerMoveScrollBar]
summary=Move scroll bar when a timer ticks.
source=TimerObject
destination=ScrollBar
comments=

```
CODE=
'===========================================================
'Moves the ScrollBar in a series of timed moves
'Note: a. default of 1 for the scrollstep
'     b. by default will reverse direction when
'        scrollbar is at end of range
'===========================================================
dim x%
dim scrollstep%

'preset to increment by 1
scrollstep% = 1
x%  = val(dest.Description)

'comment out the next line for positive direction only
if (dest.value>=dest.max) then x = -scrollstep%
'comment out the next line for negative direction only
if (dest.value<=dest.min) then x = scrollstep% dest.Description=STR$(x%)
dest.value=dest.value + x%

[TimerSetIntervalFromScroll]
summary=Sets the tick interval for destination timer using the value of source scroll bar.
source=ScrollBar
destination=TimerObject
comments=
CODE=
'===========================================================
'Set timer interval from scroll bar
'Note: scaleValue is set to allow a default scroll
'bar to adjust a timer from 0 to 1 second.
'===========================================================
dim scaleValue as Long
scaleValue = 10
dest.Interval = scaleValue * src.value

[ToggleState]
summary=Sets the state of an object "on" when it is "off", or sets the state "off" when it is "on".
source=CommandButton;Ellipse;Rectangle;TimerObject
destination=CheckBox;CommandButton;OptionButton
comments=
CODE=
'===========================================================
```

'Toggles destination object state property.
'=============================================
dest.State = NOT dest.State

[ToggleTimer]
summary=Disables a running timer, enables a stopped timer.
source=CommandButton;Ellipse;Rectangle;StaticText;TimerObject
destination=TimerObject
comments=
CODE=
'=============================================
'Toggle enabled state of timer object
'=============================================
dest.enabled = not dest.enabled

[ToggleVisibility]
summary=Makes destination object visible when it is invisible, or makes it invisible when it is visible.
source=CommandButton;OptionButton;TimerObject
destination=Chart;CheckBox;ComboBox;CommandButton;DataTitleBar;Ellipse;Group;LineObject;ListBox;Ole;OptionButton;Rectangle;ScrollBar;StaticText;TextBox
comments=
CODE=
'=============================================
'Toggle destination object visibility.
'=============================================
dest.visible = not dest.visible

APPENDIX 22

Class Method

Returns the class name of the object to which an object reference
is bound. Objects in ViP are implemented as instances of a
LotusScript custom data type called a class. The class
definitions for ViP objects are predefined.

ViP automatically binds a permanent object to the value of its
name when the application is running. The user can also
explicitly bind an object reference to an object by issuing the
LotusScript SET statement with the BIND keyword.

This generic method applies to the following objects: application
window, chart, check box, Clipboard object, combo box, command
button, data object, ellipse, group box, line, link, list box,
OLE object, option button, rectangle, scroll bar, static text,
text box, and timer object.

Script syntax

*ClassName$* = *ObjectRef*.Class()

*ClassName$* is the class of an object.

APPENDIX 23

DIM Statement

A LotusScript statement that declares an object reference or
declares an object reference and creates a new object in a single
statement or just declares an object reference. Once the user
has declared an object reference, the user can use the SET
statement to bind an object reference to a ViP object or to
create an instance of a temporary ViP object.

Script syntax

The user can declare an object reference at all levels. The
following syntax is used to perform this task:

DIM *ObjectRefName* AS *ClassName*

The user can declare an object reference and create an instance
of an object in a single statement anywhere except the module
level. The following syntax is used to perform these tasks:

DIM *ObjectRefName* AS NEW *ClassName* (ArgumentList)

*ObjectRefName* is a variable name.
*ClassName* is the name of the class of the object that the user
wants to declare an object reference for or create an instance
of.

- Valid values if the user is declaring an object reference
  for an object are AppWindow, Chart, CheckBox, ComboBox,
  CommandButton, Data, Ellipse, Group, LineObject, Link,
  ListBox, OLE, OptionButton, Rectangle, ScrollBar,
  StaticText, TextBox, TimerObject.
- Valid values if the user is creating a temporary object are Chart, CheckBox, ComboBox, CommandButton, Data, Ellipse, Group, LineObject, Link, ListBox, OLE, OptionButton, Rectangle, ScrollBar, StaticText, TextBox, TimerObject.

NEW is a keyword that indicates that the statement is creating a new instance of an object of the class *ClassName*. This keyword is used if the user wants to create instances of the following ViP objects: chart, check box, combo box, command button, data object, ellipse, group box, line, link, list box, OLE object, option button, rectangle, scroll bar, static text, text box, and timer.

ArgumentList is a comma-separated list of object construction arguments that vary by object:

- To create a chart, check box, combo box, command button, data object, ellipse, group box, line, list box, OLE object, option button, rectangle, scroll bar and timer, use the following syntax:

(ParentObjectName$, Left&, Top&, Width&, Height&, Visible%)

ParentObjectName$ is the name of the parent of the object. The parent object is the group box or application window that the user wants to contain the new object. The values that the user specifies for the parent object vary, depending on whether the user is creating an object within an application that is in run time or in design time.

- If the user is creating an object in a design-time application, he specifies one of the values shown below:

| PARENT OBJECT | SPECIFY THESE VALUES |
|---|---|
| Group box | Specify "\" + *ParentObjectName$*. For example, specify "\Group1". |

App - 91

| | |
|---|---|
| Application window | The application window must be the current design-time application window, specify a null string (that is, ""). |

- If the user is creating an object in a run-time application, he specifies one of the values shown below:

| PARENT OBJECT | SPECIFY THESE VALUES |
|---|---|
| Group box | If the group box is in the same application window as the code that is creating the new object instance, specify *ParentObjectName$*.<br><br>If the group box is not in the same application window, specify *AppWindowInstanceName$* + "\" + *ParentObjectName$*. The OpenAppWindow function provides the instance name of an application window. |
| Application window | The application window must be the active window, specify *AppWindowInstanceName$*. The OpenAppWindow function provides the instance name of an application window. |

*Left&* specifies the value of the Left property of the object.

*Top&* specifies the value of the Top property of the object.

*Width&* specifies the value of the Width property of the object.

*Height&* specifies the value of the Height property of the object.

*Visible%* specifies the value of the Visible property of the object.

- The user can only create links in an application that is in design time. To create a link, use the following syntax:

(*FromName$, ToName$, FromColumn%, ToColumn%, FromRegion%,*

App - 92

ToRegion%)

*FromName$* specifies the source object of the link (that is, the value of the FromName property of the link).

*ToName$* specifies the destination object of the link (that is, the value of the ToName property of the link).

*FromColumn%* specifies the value of the FromColumn property of the link. This parameter is ignored if the link does not originate in a data object.

*ToColumn%* specifies the value of the ToColumn property of the link. This parameter is ignored if the link does not end in a data object or if the link is to the title bar of a data object (that is, to LINK_GRID_TITLE).

*FromRegion%* specifies the area of the source data object from which the link originates. If the link originates from the title bar of the data object, specify LINK_GRID_TITLE. If the link originates from the label of a column in the data object, specify LINK_GRID_COLUMNHEADER. The user cannot create a link from the cell of a data object. This parameter is ignored if the link does not originate in a data object.

*ToRegion%* is the area of the destination data object in which the link ends. If the link ends at the title bar of the data object, specify LINK_GRID_TITLE. If the link ends at the label of a column in the data object, specify LINK_GRID_COLUMNHEADER. If the link ends in the cell of a data object, specify LINK_GRID_COLUMN. This parameter is ignored if the link does not end in a data object.

Examples:

App - 93

Example 1

The statement below declares MyCheckBox as a ViP object reference of the class CheckBox.

```
DIM MyCheckBox AS CheckBox
```

Example 2

The statement below declares and creates a link named Link1. Link1 originates in a check box named Check1 and ends at the label of the first column in a data object named Data1.

```
DIM Link1 AS NEW Link ("\Check1","\Data1,0,1,0,
LINK_GRID_COLUMNHEADER)
```

APPENDIX 24

SET Statement

A LotusScript statement that binds an object reference to an existing object or creates a new object.

Script syntax

To create a new object, use the following syntax:

SET *ObjectRefName* = NEW *ClassName* (*ArgumentList*)

To bind an object reference variable to an existing object, use the following syntax:

SET *ObjectRefName* = BIND(*ObjectName$*)

*ObjectRefName* is a variable name. It must be previously declared as an object reference using the DIM statement.

NEW is a keyword that indicates that the statement is creating a new instance of an object of the class ClassName. This keyword is used if the user wants to create instances of the following ViP objects: chart, check box, combo box, command button, data object, ellipse, group box, line, link, list box, OLE object, option button, rectangle, scroll bar, static text, text box, and timer.

*ClassName* is the name of the class of the object that the user wants to create an instance of. Valid values are Chart, CheckBox, ComboBox, CommandButton, Data, Ellipse, Group, LineObject, Link, ListBox, OLE, OptionButton, Rectangle, ScrollBar, StaticText, TextBox, TimerObject.

*ArgumentList* is a comma-separated list of object construction arguments that vary by object:

- To create a chart, check box, combo box, command button, data object, ellipse, group box, line, list box, OLE object, option button, rectangle, scroll bar and timer, use the following syntax:

(*ParentObjectName$*, *Left&*, *Top&*, *Width&*, *Height&*, *Visible%*)
*ParentObjectName$* is the name of the parent of the object. The parent object is the group box or application window that the user wants to contain the new object. The values that are specified for the parent object vary, depending on whether the user is creating an object within an application that is in run time or in design time.

- If the user is creating an object in a design-time application, specify one of the values shown below:

| PARENT OBJECT | SPECIFY THESE VALUES |
|---|---|
| Group box | Specify "\" + *ParentObjectName$*. For example, specify '\Group1". |
| Application window | The application window must be the current design-time application window, specify a null string (that is, ""). |

- If the user is creating an object in a run-time application, specify one of the values shown below:

| PARENT OBJECT | SPECIFY THESE VALUES |
|---|---|
| Group box | If the group box is in the same application window as the code that is creating the new object instance, specify *ParentObjectName$*.<br><br>If the group box is not in the same application window, specify *AppWindowInstanceName$* + "\" + *ParentObjectName$*. The OpenAppWindow function provides the instance name of an application window. |

App - 96

| Application window | The application window must be the active window, specify *AppWindowInstanceName$*. The OpenAppWindow function provides the instance name of an application window. |
|---|---|

*Left&* specifies the value of the Left property of the object.

*Top&* specifies the value of the Top property of the object.

*Width&* specifies the value of the Width property of the object.

*Height&* specifies the value of the Height property of the object.

*Visible%* specifies the value of the Visible property of the object.

- The user can only create links in an application that is in design time. To create a link, use the following syntax:

(*FromName$, ToName$, FromColumn%, ToColumn%, FromRegion%, ToRegion%*)

*FromName$* specifies the source object of the link (that is, the value of the FromName property of the link).

*ToName$* specifies the destination object of the link (that is, the value of the ToName property of the link).

*FromColumn%* specifies the value of the FromColumn property of the link. This parameter is ignored if the link does not originate in a data object.

*ToColumn%* specifies the value of the ToColumn property of the link. This parameter is ignored if the link does not end in a data object or if the link is to the title bar of a data object (that is, to LINK_GRID_TITLE).

*FromRegion%* specifies the area of the source data object from which the link originates. If the link originates from the title bar of the data object, specify LINK_GRID_TITLE. If the link originates from the label of a column in the data object, specify LINK_GRID_COLUMNHEADER. The user cannot create a link from the cell of a data object. This parameter is ignored if the link does not originate in a data object.

*ToRegion%* is the area of the destination data object in which the link ends. If the link ends at the title bar of the data object, specify LINK_GRID_TITLE. If the link ends at the label of a column in the data object, specify LINK_GRID_COLUMNHEADER. If the link ends in the cell of a data object, specify LINK_GRID_COLUMN. This parameter is ignored if the link does not end in a data object.

BIND is a keyword that associates a ViP object with a variable. The association is made by name and is valid until the variable is out of scope, the ViP object no longer exists, or the variable is associated with another instance of the ViP object. The user can use this keyword to bind object reference to the following ViP objects: application window, chart, check box, combo box, command button, data object, ellipse, group box, line, list box, OLE object, option button, rectangle, scroll bar, static text, text box, and timer.

*ObjectName$* is the name of the ViP object. The user can include the path to the ViP object. The values that are specified for ObjectName$ vary, depending on whether the SET statement for the object that is being created is in a designer tool or a regular ViP application:

- If the SET statement for the object that is being created is in a designer tool, specify one of the values shown below:

| IF THE OBJECT IS | SPECIFY THESE VALUES |
|---|---|
| Application window | If the application window is the current application window, specify "\AppWindow".<br><br>If the application window is not the current application window, specify AppWindowInstanceName$ + "\AppWindow". The OpenAppWindow function provides the instance name of an application window. |
| Any other object | If the object is the current object in the design-time application window, specify a null string.<br><br>If the object is not the current object, specify "\" + ObjectName$. |

- If the SET statement for the object that is being created is in a regular Notes ViP application, specify one of the values shown below:

| IF THE OBJECT IS | SPECIFY THESE VALUES |
|---|---|
| Application window | If the application window is the current running window, specify "AppWindow".<br><br>If the application window is not the current window, specify AppWindowInstanceName$[ + "\AppWindow"]. The OpenAppWindow function provides the instance name of an application window. |
| Any other object | If the object is in the current application window, specify ObjectName$.<br><br>If the object is not in the current application window, specify AppWindowInstanceName$ + "\" + ObjectName$. The OpenAppWindow function provides the instance name of an application window. |

Examples

Example 1

The statements below declare and create a link named Link1. Link1 originates in a check box named Check1 and ends at the label of the first column in a data object named Data1.

```
DIM Link1 AS Link
SET Link1 = NEW Link
("\Check1","\Data1",0,1,0,LINK_GRID_COLUMNHEADER)
```

Example 2
The statements below declare and create a visible text box named
TextBox1.

```
DIM TextBox1 AS TextBox
SET TextBox1 = NEW TextBox( AppWin1.Name, 1, 1, 1000, 1000, TRUE)
```

APPENDIX 25

FindObject Method

Returns the name of an object from a list of objects in an application window or group box. ViP maintains the list of objects in Layer order. If the user specifies this method for an application window, the method returns the names of group boxes within the application window but does not return the names of objects within the group boxes.

Script syntax

*FoundObjectName$* = *ObjectRef*.FindObject(*CurrentObjectName$*, *Direction%*)

*FoundObjectName$* is the name of the requested object, or a null string when the method reaches the end of the object list.

*CurrentObjectName$* is the name of the object from which the user wants to start searching. The user must specify a value for this parameter if the value of *Direction%* is FINDNEXT or FINDPREV; however, the method ignores the value of this parameter if the user specifies FINDFIRST or FINDLAST for *Direction%*.

*Direction%* is the direction the user wants to search in or the location of the object that the user wants returned.

| DIRECTION | DESCRIPTION |
|---|---|
| FINDFIRST (-1) | The first object in the object list |
| FINDLAST  (-2) | The last object in the object list |
| FINDPREV  (-3) | The previous object in the object list |
| FINDNEXT  (-4) | The next object in the object list |

APPENDIX 26

FindSelectedObject Method

Returns the name of an object from a list of selected objects in an application window at design time. ViP maintains the list of selected objects in layer order. The method returns the names of all selected objects, including the names of selected objects that are in group boxes.

Script syntax

*FoundObjectName$* = AppWindowRef.FindSelectedObject( *CurrentObjectName$, Direction%*)

*FoundObjectName$* is the name of the requested object, or a null string when the method reaches the end of the object list.

*CurrentObjectName$* is the name of the object from which the user wants to start searching. The user must specify a value for this parameter if the value of *Direction%* is FINDNEXT or FINDPREV; however, the method ignores the value of this parameter if the user specifies FINDFIRST or FINDLAST for *Direction%*.

*Direction%* is the direction the user wants to search in or the location of the object the user wants returned.

| DIRECTION | DESCRIPTION |
| --- | --- |
| FINDFIRST (-1) | The first object in the list of selected objects |
| FINDLAST (-2) | The last object in the list of selected objects |
| FINDPREV (-3) | The previous object in the list of selected objects |
| FINDNEXT (-4) | The next object in the list of selected objects |

APPENDIX 27

MostSelectedObject Method

Returns the name of the most recently selected object from a list
of objects in an application window at design time. The most
recently selected object is the object that has red handles.
This method returns a value even when the most selected object is
contained within a group box.
The GetSelectedState method is used to retrieve the selection
state of an object at design time. The SetSelectedState method
to specify the selection state of an object at design time.

Script syntax

*FoundObjectName$* = [*AppWindowRef.*]MostSelectedObject( )

*FoundObjectName$* is the name of the most recently selected
object.

APPENDIX 28

FindLink Method

Returns the name of a link from a list of links to an object, or from a list of links from an object. ViP does not maintain a list of links in any particular order. This generic method applies to the following objects: chart, check box, combo box, command button, data object, ellipse, group box, line, list box, OLE object, option button, rectangle, scroll bar, static text, text box, and timer.

Script syntax

*FoundLinkName$* = *ObjectRef*.FindLink(*CurrentLinkName$, LinkType%, Direction%*)

*FoundLinkName$* is the name of the requested link, or a null string when the method reaches the end of the link list.

*CurrentLinkName$* is the name of the link from which the user wants to start searching. The user must specify a value for this parameter if the value of *Direction%* is FINDNEXT or FINDPREV; however, the method ignores the value of this parameter if the user specifies FINDFIRST or FINDLAST for *Direction%*.

*LinkType%* indicates the link list the user wants to search.

| LINK TYPE | DESCRIPTION |
| --- | --- |
| FINDFROM (-5) | Searches the list of links from an object. |
| FINDTO (-6) | Searches the list of links to an object. |

*Direction%* is the direction the user wants to search in or the

App - 104 location of the link the user wants returned.

| DIRECTION | DESCRIPTION |
|---|---|
| FINDFIRST (-1) | The first link in the link list |
| FINDLAST (-2) | The last link in the link list |
| FINDPREV (-3) | The previous link in the link list |
| FINDNEXT (-4) | The next link in the link list |

APPENDIX 29

GetSelectedState Method

Returns the selection state of an object in an application window at design time.

To specify this value, use the SetSelectedState method. To retrieve the name of the most recently selected object at design time, use the MostSelectedObject method.

Script syntax

*State%* = *AppWindowRef*.GetSelectedState(*ObjectName$*)

*State%* is the selection state of the object at design time when the operation is successful, or nonzero when it fails.

| STATE | DESCRIPTION |
|---|---|
| FALSE (0) | The object is not selected. |
| TRUE (-1) | The object is selected, but is not the most recently selected object. A selected object that is not the most recently selected object has gray handles. |
| MOSTSELECTED (2) | The object is the most recently (or only) selected object. The most recently selected object has red handles. |

*ObjectName$* is the name of the object for which the user wants to retrieve the selection state.

APPENDIX 30

SetSelectedState Method

Specifies the selection state of an object in an application window at design time.

To retrieve this value, use the GetSelectedState method.

Execution of this method causes the Designer event to occur in the design-tool application window.

Script syntax

*Status%* = AppWindowRef.SetSelectedState(*ObjectName$, State%*)

*Status%* is SUCCESS (0) when the operation is successful, or nonzero when it fails.

*ObjectName$* is the name of the object for which the user wants to specify a selection state.

*State%* is the selection state of the object at design time.

| STATE | DESCRIPTION |
|---|---|
| FALSE (0) | The object is not selected. |
| TRUE (1) | The object is selected, but is not the most recently selected object. A selected object that is not the most recently selected object has gray handles. If the user specifies this value and no other objects are selected, the method automatically assigns a value of MOSTSELECTED rather than SELECTED. |

App - 107

MOSTSELECTED (2)   The object is the most recently selected
                   object.  The most recently selected object
                   has red handles.

APPENDIX 31

GetScript Method

At design time, returns the contents of a script initiated by an
object event. To specify this value at design time, use the
SetScript method.

This generic method applies to the following objects: application
window, chart, check box, combo box, command button, data object,
ellipse, group box, line, link, list box, OLE object, option
button, rectangle, scroll bar, static text, text box, and timer.

Script syntax

*Script$* = *ObjectRef*.GetScript(*EventName$*)

*Script$* is the script in the form of a single text string; or a
null string if there is no script. Line endings are indicated by
the line-break characters CHR$(13) + CHR$(10).

*EventName$* is the name of the object event that initiates the
script.

APPENDIX 32

SetScript Method

At design time, sets the contents of a script initiated by an object event.

To retrieve this value, use the GetScript method.

This generic method applies to the following objects: application window, chart object, check box, combo box, command button, data object, ellipse, group box, line, link, list box, OLE object, option button, rectangle, scroll bar, static text, text box, and timer object.

ViP does not check the syntax of a script specified using this method; ViP checks the script syntax when ViP executes the script.

Script syntax

*Status%* = *ObjectRef*.SetScript(*EventName$*, *Script$*)

*Status%* is SUCCESS (0) when the operation is successful, or nonzero when it fails.

*EventName$* is the name of the object event that causes the script to execute.

*Script$* is the script in the form of a single text string. Indicate line endings with the line-break characters CHR$(13) + CHR$(10).

APPENDIX 33

DesignerNotify Property

A flag that specifies whether ViP causes the Designer event in a running ViP designer-tool application to occur when a selection changes in a design-time application window.

The following actions cause the Designer event for the application window of the designer tool to occur:

- Clicking on an object
- Adding an object to the selection or removing an object by pressing SHIFT and clicking the object
- Changing the most-selected object by clicking a selected object
- Deleting an object with a menu command, DEL, or a LotusScript statement
- Creating a new object
- Resizing or moving an object
- Cutting one or more objects to the Clipboard or pasting one or more objects from the Clipboard
- Deselecting all objects
- Selecting a different open application window
- Opening or closing an application window
- Deleting the active application window
- Issuing the SetSelectedState method for an object

| FLAG | DESCRIPTION |
| --- | --- |
| FALSE (0) | (Default) ViP does not cause the Designer event in a running ViP designer-tool application to occur. |
| TRUE (-1) | ViP causes the Designer event in a running ViP designer-tool application to occur. |

The user can use the DesignerNotify property to help create designer tools.

Dialog box

Use the Application Window Options dialog box to specify a non-default initial value for this property.

Script syntax

*AppWindowRef*.DesignerNotify = *Flag%*
*Flag%* = *AppWindowRef*.DesignerNotify

APPENDIX 34

Designer Event

This event occurs in a ViP designer-tool application at run time
when a selection in the current application window changes at
design time. Specifically, the following actions (if performed
in an application window at design time) initiate the Designer
event in the designer tool at run time:

- Clicking on an object
- Adding an object to the selection or removing an object from te selection using SHIFT+CLICK
- Changing the most-selected object by clicking on a selected object
- Deleting an object with the menu, the delete key, or LotusScript
- Drawing an object or creating an object using LotusScript
- Resizing or moving an object
- Cutting one or more objects to the Clipboard or pasting one or more objects from the Clipboard
- Deselecting all objects by clicking the window background
- Selecting a different open application window
- Opening or closing an application window
- Deleting the currently selected application window
- Issuing the SetSelectedState method for an object To receive a Designer event, the value of the DesignerNotify
property for the application window of the designer tool the must
be set to TRUE.

The user can use Designer event scripts to write designer tools.

APPENDIX 35

Link Behaviors

A link behavior is a script that determines what happens between
a source object and a destination object when a link is executed.
Predefined behaviors are supplied in ViP for most of the links
the user can create.  When the user creates a link, one of the
predefined behaviors is assigned to the link by default.  The
user can choose another behavior for the link in the Link Setup
dialog box.  The user can also modify behaviors that are
predefined in ViP or create new behaviors.

ViP provides the following predefined behaviors:

Behaviors that define and/or execute data object queries

```
CellClearQueryAndExecute              CellSetQueryFromMultiList
CellSetFormattedQuery                 CopyValueToQuery
CellSetFormattedQueryAndExecute       CopyValueToQueryAndExecute
CellSetQuery                          ExecuteQuery
CellSetQueryAndExecute                SetVendorRetrievalAndExecute
CellSetQueryFromCell       SetVendorRetrievalFromGroupAndExecute
CellSetQueryFromCellAndExecute
                           SetVendorRetrievalFromListAndExecute
CellSetQueryFromGroup                 StateCellSetQuery
CellSetQueryFromGroupAndExecute       StateCellSetQueryAndExecute
CellSetQueryFromList       StateSetVendorRetrievalAndExecute
CellSetQueryFromListAndExecute        TimerCellSetQueryAndExecute
```

Behaviors that update a data object and/or database

```
CellSetData                           ExecuteUpdate
CellSetDataFromGroup                  StateCellSetData
CellSetDataFromList
```

Behaviors that copy data from a data object

```
CellTransferValue                     CopyResultRowCount
ColumnContentsUnique                  ExportText
CopyContents                          TextCopyFromCell
CopyContentsToText
```

App - 114

Other behaviors that involve or affect data objects

FindFromCell
FirstRow
IterateOverDataObject
LastRow
NextRow
PreviousRow
PrintPreview PrintReport
RowDelete
RowNew
SetAndDrawChart
SetGroupOptionFromCell
SetStateFromCell

Behaviors that affect list boxes and/or combo boxes

Clear
Directory
FillFromFile
FillFromListFile

ItemAdd
ItemAddUnique
ItemFind
Select

Behaviors that involve or affect charts

DrawChart
EditChart

PrintChart
SetAndDrawChart

Behaviors that involve or affect scroll bars

CopyValue
CopyValueToValue
ScrollSetBackColor
ScrollSetForeColor

SetValue
StateSetValue
TimerMoveScrollBar
TimerSetIntervalFromScroll

Behaviors that involve or affect timers

SetTimerInterval
StateSetTimer
TimerMoveScrollBar

TimerSetIntervalFromScroll
ToggleTimer

Behaviors that involve OLE objects

ExecuteVerb

Other behaviors

DoEventClick
PictureCopy
PictureLoad
PictureLoadFromList
StateSetProperty
StateTextCopy TextCopy
TextCopyFromGroup
TextCopyFromList
TextCopyFromMultiList
ToggleState
ToggleVisibility App - 115

APPENDIX 36

Functional Description of Link behaviors listed in Appendix 35:

BEHAVIORS THAT DEFINE AND/OR EXECUTE DATA OBJECT QUERIES

CellClearQueryAndExecute Link Behavior

Clears a query cell in a data object so that the query cell column does not participate in the query; then executes the query.

CellSetFormattedQuery Link Behavior

Copies the text of an object to a query cell in a data object, formats the text based on the data type of the query cell, and places quotation marks around the text values in the cell.

CellSetFormattedQueryAndExecute Link Behavior

Copies the text of an object to a query cell in a data object, formats the text, places quotation marks around the text values in the cell, and executes the query.

CellSetQuery Link Behavior

Copies the text of an object to a query cell in a data object without formatting the text.

CellSetQueryAndExecute Link Behavior

Copies the text of an object to a query cell in a data object, without formatting the text, and executes the query.

CellSetQueryFromCell Link Behavior

Copies the contents of the current data cell in one data object to a query cell in another data object, formats the copied data cell contents based on the data type of the query cell, and places quotation marks around the copied values in the cell. If there are no rows in the source data object, the destination query cell is cleared.

CellSetQueryFromCellAndExecute Link Behavior

Copies the contents of the current data cell in one data object to a query cell in another data object, formats the copied data cell contents based on the data type of the query cell, places quotation marks around the copied values in the cell, and executes the query. If there are no rows in the source data object, the destination query cell is cleared.

App - 116

CellSetQueryFromGroup Link Behavior

Copies the text of the selected option button in a group box to a
query cell in a data object, formats the text based on the data
type of the query cell, and places quotation marks around the
text values in the cell.

CellSetQueryFromGroupAndExecute Link Behavior

Copies the text of the selected option button in a group box to a
query cell in a data object, formats the text based on the data
type of the query cell, places quotation marks around the text
values in the cell, and executes the query.

CellSetQueryFromList Link Behavior

Copies the text of the selected item in a single-selection list
box or the list box of a combo box to a query cell in a data
object, formats the text based on the data type of the query
cell, and places quotation marks around the text values in the
cell.

CellSetQueryFromListAndExecute Link Behavior

Copies the text of the selected item in a single-selection list
box or in the list box of a combo box to a query cell in a data
object, formats the text based on the data type of the query
cell, places quotation marks around the text values in the cell,
and executes the query.

CellSetQueryFromMultiList Link Behavior

Copies the text of selected items in a multi-selection list box
to a query cell in a data object, formats the text of each item
based on the data type of the query cell, places quotation marks
around each text item value, and joins the values by placing OR
between them.

CopyValueToQuery Link Behavior

Converts the value of a scroll bar to text and copies the text,
without formatting it, to a query cell in a data object.

CopyValueToQueryAndExecute Link Behavior

Converts the value of a scroll bar to text, copies the text,
without formatting it, to a query cell in a data object, and
executes the query.

ExecuteQuery Link Behavior

Executes the query currently defined for a data object and

App - 117 displays the results of the query.

SetVendorRetrievalAndExecute Link Behavior

Sets the vendor retrieval query string for a data object from the text of another object, and executes the query.

SetVendorRetrievalFromGroupAndExecute Link Behavior

Sets the vendor retrieval query string for a data object from the text of the selected option button in a group box, and executes the query.

SetVendorRetrievalFromListAndExecute Link Behavior

Sets the vendor retrieval query string for a data object from the text of the selected item in a single-selection list box or the list box of a combo box, and executes the query.

StateCellSetQuery Link Behavior

Sets a query cell in a data object to the text of the source object when the source object is selected, or to null when the source object is deselected.

StateCellSetQueryAndExecute Link Behavior

Sets a query cell in a data object to the text of the source object when the source object is turned on, or to null when the source object is turned off; then executes the query.

StateSetVendorRetrievalAndExecute Link Behavior

Sets the vendor retrieval query string in a data object to the text of a check box or an option button when the check box or option button is turned on, or to null when the check box or option button is turned off; then, executes the query.

TimerCellSetQueryAndExecute Link Behavior

Copies a value to a query cell in a data object when a timer ticks; then executes the query. By default, ViP copies a blank to the query cell.

BEHAVIORS THAT UPDATE A DATA OBJECT AND/OR DATABASE

CellSetData Link Behavior

Copies the text of an object to the current data cell in a data object, and displays the text in the cell without updating the row.

App - 118

CellSetDataFromGroup Link Behavior

Copies the text of the selected option button in a group box to the current data cell in a data object and displays the text in the cell without updating the row.

CellSetDataFromList Link Behavior

Copies the text of the selected item in a single-selection list box or the list box of a combo box to the current data cell in a data object, and displays the text in the cell without updating the row.

ExecuteUpdate Link Behavior

Updates a data object, the underlying data source table(s), and the display of data in the object.

StateCellSetData Link Behavior

Copies the text of the source object to the current data cell in a data object when the source object is turned on, or copies a blank to the cell when the source object is turned off; then redisplays the data object, without updating the row or underlying data source table(s).

BEHAVIORS THAT COPY DATA FROM A DATA OBJECT

CellTransferValue Link Behavior

Copies the contents of the current data cell in one data object to the current data cell in another data object and displays the copied value without updating the underlying data source table(s).

ColumnContentsUnique Link Behavior

Copies the contents of a column in a data object to a column in another data object, to a list box, or to the list box of a combo box, eliminating duplicates. In a list box, each row of data is copied to a separate line and columns are separated by Tab characters.

CopyContents Link Behavior

Copies up to 64K of contents from a data object, list box, or list box of a combo box to an unconnected data object, a list box, or the list box of a combo box. In a list box, each row of data is copied to a separate line and columns are separated by Tab characters. Note that a destination data object must be an unconnected data object; the CopyContents behavior cannot copy to App - 119 a data object that is connected to an external data source.

CopyContentsToText Link Behavior

Copies up to 64K of contents from a data object, list box, or list box of a combo box to a text box. Each row of data or list box item is copied to a separate line and columns are separated by Tab characters. The text box must be set up as a multiline text box.

CopyResultRowCount Link Behavior

Copies the number of rows in the result set of a data object as the text of another object.

ExportText Link Behavior

Creates a text file and copies each row of a data object to a separate line in the file. Column items are placed inside quotation marks and are separated by commas in the file.
The text file name is the first 8 characters of the data object name; the file extension is .OUT.

TextCopyFromCell Link Behavior

Sets the text of the destination object from the contents of the current data cell in a data object.

OTHER BEHAVIORS THAT INVOLVE OR AFFECT DATA OBJECTS

FindFromCell Link Behavior

Selects an item in a single-selection list box or in the list box of a combo box that exactly matches the data in the current data cell of a data object.

FirstRow Link Behavior

Selects the first row in the result set of a data object.

IterateOverDataObject Link Behavior

Selects each row in a data object -- one row after another -- and causes the RowSelect event to occur for each row.

LastRow Link Behavior

Selects the last row in the result set of a data object.

App - 120

NextRow Link Behavior

Selects the next row in the result set of a data object.

PreviousRow Link Behavior

Selects the previous row in the result set of a data object.

PrintPreview Link Behavior

Previews the report associated with a data object.

PrintReport Link Behavior

Prints the report associated with a data object.

RowDelete Link Behavior

Deletes the current row in a data object.

RowNew Link Behavior

Adds a new row at the end of a data object.

SetAndDrawChart Link Behavior

Sets a data object as the data source for a chart and draws the chart using data from the data object.

SetGroupOptionFromCell Link Behavior

Finds the option button in a group box whose text matches the text of the current data cell in a data object and sets the state of the button on.

SetStateFromCell Link Behavior

Sets the state of a check box, a command button, or an option button on when its text matches the text of the current cell in the result set of a data object, or sets the state off when the text does not match.

BEHAVIORS THAT AFFECT LIST BOXES AND/OR COMBO BOXES

Clear Link Behavior

Removes all items from a list box or from the list box and text box of a combo box.

Directory Link Behavior

App - 121

Fills a list box or the list box of a combo box with a list of
files from the current directory (the default) or from a
directory you specify in the link behavior script.

FillFromFile Link Behavior

Copies each line in a file to a separate line in a list box or
the list box of a combo box. By default Notes ViP copies lines
from the file whose name is specified by the text of the source
object. You can specify another file in the link behavior script.
If the value of the Sorted property of the list box or combo box
is TRUE, items are added in alphabetical order; otherwise, items
are added to the end of the list in the order they appear in the
file.

FillFromListFile Link Behavior

Copies each line from the file specified by the selected item in
a single-selection list box or the list box of a combo box to a
separate line in another list box or list box of a combo box.
If the value of the Sorted property of the destination list box
or combo box is TRUE, items are added in alphabetical order;
otherwise, items are added to the end of the list in the order
they appear in the file.

ItemAdd Link Behavior

Adds the text of an object as an item in a list box or the list
box of a combo box, whether or not the text is already in the
list. If the value of the Sorted property of the destination
list box or combo box is TRUE, items are added in alphabetical
order; otherwise, items are added to the end of the list.

ItemAddUnique Link Behavior

Adds the text of the source object as an item in a list box or
the list box of a combo box only when the text is not already in
the list. If the value of the Sorted property of the destination
list box or combo box is TRUE, items are added in alphabetical
order; otherwise, items are added to the end of the list.

ItemFind Link Behavior

Selects the first string in a single-selection list box or the
list box of a combo box that starts with the same characters as
the text of the source object.

Select Link Behavior

Selects an item in a single-selection list box or the list box of
a combo box based on the value of the text or other property of
the source object.

App - 122

BEHAVIORS THAT INVOLVE OR AFFECT CHARTS

DrawChart Link Behavior

Redraws a chart using data currently available in the data object associated with the chart.

EditChart Link Behavior

Opens the Infobox window in Lotus Chart Help to allow redefinition of chart properties.

PrintChart Link Behavior

Prints a chart.

SetAndDrawChart Link Behavior

Sets a data object as the data source for a chart and draws the chart using data from the data object.

BEHAVIORS THAT INVOLVE OR AFFECT SCROLL BARS

CopyValue Link Behavior

Copies the value of a scroll bar as the text of another object.

CopyValueToValue Link Behavior

Copies the value of a scroll bar as the value of another scroll bar.

ScrollSetBackColor Link Behavior

Sets the background color of an object to the color associated with the value of a scroll bar. The minimum value of the scroll bar is set to 0 (zero), the maximum value is set to 15, and the change value is set to 1.

ScrollSetForeColor Link Behavior

Sets the color of the text of an object to the color associated with the value of a scroll bar. The minimum value of the scroll bar is set to 0 (zero), the maximum value is set to 15, and the change value is set to 1.

SetValue Link Behavior

Sets the value of a scroll bar from the value of the text of another object, truncating the value if it exceeds the value App - 123 range defined for the scroll bar.

StateSetValue Link Behavior

Sets the value of a scroll bar to the value of the text of a check box or command button when the check box or command button is turned on, or sets the value to minimum when the check box or command button is turned off.

TimerMoveScrollBar Link Behavior

Moves a scroll bar when a timer ticks. By default, the scroll bar moves 10 steps in a positive direction and then 10 steps in a negative direction. The user can change this behavior so that the scroll bar moves only in a positive direction or only in a negative direction.

TimerSetIntervalFromScroll Link Behavior

Sets the tick interval for a timer from the value of a scroll bar. This behavior uses the default minimum value (zero) and the default maximum value (100) of a scroll bar and a scale value set to 10. The timer interval is 0 (zero) seconds when the scroll bar value is 0 (zero) and 1 second when the scroll bar value is 100.

BEHAVIORS THAT INVOLVE OR AFFECT TIMERS

SetTimerInterval Link Behavior

Sets the tick interval for a timer from the value of the text of another object.

StateSetTimer Link Behavior

Enables or disables a timer based on the state of a check box or command button.

TimerMoveScrollBar Link Behavior

Moves a scroll bar when a timer ticks. By default, the scroll bar moves 10 steps in a positive direction and then 10 steps in a negative direction. The user can change this behavior so that the scroll bar moves only in a positive direction or only in a negative direction.

TimerSetIntervalFromScroll Link Behavior

Sets the tick interval for a timer from the value of a scroll bar. This behavior uses the default minimum value (zero) and the default maximum value (100) of a scroll bar and a scale value set to 10. The timer interval is 0 (zero) seconds when the scroll bar value is 0 (zero) and 1 second when the scroll bar value is 100.

ToggleTimer Link Behavior

Enables a timer when it is not running, or disables a timer when it is running.

BEHAVIORS THAT INVOLVE OLE OBJECTS

ExecuteVerb Link Behavior

Executes a verb for a server application connected to an OLE object. By default, the primary verb is executed; you can specify another verb in the link behavior script.

OTHER BEHAVIORS

DoEventClick Link Behavior

Causes a Click event to occur for a command button.

PictureCopy Link Behavior

Copies a picture from one object to another. The picture is formatted according to the picture-formatting options in effect for the destination object.

PictureLoad Link Behavior

Loads a picture from a file (bitmap or metafile) into an object when the file name is specified, or clears the picture from the object when null is specified. By default ViP copies the picture from the file whose name matches the text of the source object.

StateSetProperty Link Behavior

Sets a property in one object based on the state of another object. By default, ViP sets the Visible property of the destination object on when the state of the source object is on, and sets the Visible property off when the state of the source object is off. The user can change the property by identifying another property in the link behavior script.

StateTextCopy Link Behavior

Copies the text of a check box or command button to another object when the check box or command button is turned on, or copies a blank to the object when the check box or command button is turned off.

TextCopy Link Behavior

Copies the text of the source object to the destination object.

TextCopyFromGroup Link Behavior

Sets the text of an object from the text of the selected option button in a group box.

TextCopyFromList Link Behavior

Sets the text of an object from the text of the selected item in a single-selection list box or the list box of a combo box.

TextCopyFromMultiList Link Behavior

Sets the text of an object from selected items in a multi-selection list box.

ToggleState Link Behavior

Sets the state of an object on when it is off, or sets the state off when it is on.

ToggleVisibility Link Behavior

Makes an object visible when it is invisible, or makes it invisible when it is visible.

APPENDIX 37

BackColor Property

The background color of an object. In ViP, color is expressed as a single long value that is equivalent to the RGB value of the color. The default value of this property is WHITE.
This generic property applies to the following objects: application window, check box, combo box, ellipse, group box, list box, option button, rectangle, and text box.

Dialog box
Use the Lines & Color dialog box to specify a non-default initial value for this property.

Script syntax
 *ObjectRef*.BackColor = *Color&*
 *Color&* = *ObjectRef*.BackColor

---

Bottom Property

The y-coordinate of the lower right corner of an object. This value is specified in either pixels or twips, depending on the value of the ScaleMode property. The default value of Bottom is the y-coordinate of the lower right corner of the object when the object is created.

This generic property applies to the following objects: chart, application window, check box, combo box, command button, data object, ellipse, group box, line, list box, OLE object, option button, rectangle, scroll bar, static text, text box, and timer.

ViP manages positioning and sizing differently, depending on the class of the object. For example, ViP determines the initial run-time value of this property differently for application windows than for other objects.

When the value of this property changes for an application window at run time, ViP causes the Positioning event to occur.

Dialog box
This property cannot be explicitly set by using a dialog box. However, the user can use the Setup dialog box to specify a value for the related Top property.

Script syntax
*ObjectRef*.Bottom = *Bottom&*
*Bottom&* = *ObjectRef*.Bottom

---

Cursor Property

The shape of the mouse pointer when the mouse is over a specified object at run time. This generic property applies to the following objects: application window, chart, check box, combo box, command button, ellipse, group box, line, list box, OLE object, option button, rectangle, scroll bar, static text, and text box.

| MOUSE POINTER | DESCRIPTION |
|---|---|
| CUSTOM (-1) | The mouse pointer was specified using the CursorLoad method. The user cannot set this value for the Cursor property. |
| NO_CHANGE (0) | (Default for ellipses, lines, rectangles, and static text) The shape of the mouse pointer does not change when it is over the object. The user cannot specify this value for check boxes, combo boxes, command buttons, list boxes, option boxes, scroll bars, or text boxes. |
| ARROW (1) | (Default for application windows, charts, check boxes, command buttons, group boxes, list boxes, OLE objects, option buttons, scroll bars, and the |

App - 128

|  |  |
|---|---|
|  | list box portion of combo boxes) Standard arrow cursor. |
| CROSSHAIR (2) | Crosshair cursor. |
| IBEAM (3) | (Default for text boxes and the text box portion of combo boxes) I-beam cursor. |
| EMPTY_ICON (4) | Empty icon. |
| SIZE (5) | Square cursor that has a smaller square in its lower-right corner. |
| SIZE_NESW (6) | Double-pointed cursor with arrows pointing toward the top right corner and the bottom left corner of the application window. |
| SIZE_NS (7) | Double-pointed cursor with arrows pointing toward the top and bottom of the application window. |
| SIZE_NWSE (8) | Double-pointed cursor with arrows pointing toward the top left corner and the bottom right corner of the application window. |
| SIZE_WE (9) | Double-pointed cursor with arrows pointing toward the left and right of the application window. |
| UP_ARROW (10) | Vertical arrow cursor. |
| WAIT (11) | Hourglass cursor. |

Dialog box

Use the Setup dialog box to specify a non-default initial value for this property.

Script syntax

*ObjectRef*.Cursor = *Cursor%*
 *Cursor%* = *ObjectRef*.Cursor

---

DDEClientDataType Property

The format in which the DDE server application sends the data to a ViP object functioning as a DDE client. The default value of this property varies by object:

App - 129

- For application windows, ellipses, and rectangles, the default value is VIPCF_BITMAP. The user can change this value to VIPCF_METAFILEPICT or VIPCF_DIB.
- For all other objects, the default value is VIPCF_TEXT.

This generic property applies to the following objects: application window, check box, combo box, command button, data object, ellipse, line, list box, option button, rectangle, scroll bar, static text, and text box.

| FORMAT NAME | DESCRIPTION |
|---|---|
| VIPCF_TEXT (1) | Text |
| VIPCF_BITMAP (2) | Bitmap |
| VIPCF_METAFILE (3) | Metafile |
| VIPCF_DIB (8) | Device-independent bitmap |

Dialog box
For application windows, ellipses, and rectangles, use the DDE dialog box to specify a non-default initial value for this property.

Script syntax
*ObjectRef*.DDEClientDataType = *FormatName*%
*FormatName*% = *ObjectRef*.DDEClientDataType

---

DDEClientItem Property

The name of the item on a DDE server that contains the data accessed by the ViP client object. Typically, the item name is the name of a data range in the server application (for example, an Ami Pro bookmark or a 1-2-3 range). The default value of this property is a null string.

This generic property applies to the following objects:
application window, check box, combo box, command button, data
object, ellipse, line, list box, option button, rectangle, scroll
bar, static text, and text box.

Dialog box
Use the DDE dialog box to specify a non-default initial value for
this property.

Script syntax
*ObjectRef*.DDEClientItem = *ItemName$*
*ItemName$* = *ObjectRef*.DDEClientItem

---

DDEClientMode Property

The type of DDE conversation requested for a ViP object
functioning as a DDE client.

This generic property applies to the following objects:
application window, check box, combo box, command button, data
object, ellipse, line, list box, option button, rectangle, scroll
bar, static text, and text box.

| MODE TYPE | DESCRIPTION |
|---|---|
| NONE (0) | (Default) There is no DDE link. |
| COLD (1) | Manual. The ViP client object is not notified of changes in the server data. The user must explicitly request the data by using the DDEClientRequest method. |
| WARM (2) | Notify. Whenever the server data changes, ViP causes a DDEActivity event for the client object to occur. The user must explicitly request the data by using the DDEClientRequest method. |
| HOT (3) | Automatic. Whenever the server data changes, the ViP client object receives the new data and ViP | causes a DDEClientArriving event for the client
object to occur.

Dialog box

Use the DDE dialog box to specify a non-default initial value for
this property.

Script syntax

*ObjectRef*.DDEClientMode = *ModeType%*
*ModeType%* = *ObjectRef*.DDEClientMode

---

DDEClientServer Property

The name of the application on the DDE server that contains the
data accessed by the ViP client object. Typically, the
application name is the name of a product (for example, AmiPro or
123W). The default value of this property is a null string.

This generic property applies to the following objects:
application window, check box, combo box, command button, data
object, ellipse, line, list box, option button, rectangle, scroll
bar, static text, and text box.

Dialog box

Use the DDE dialog box to specify a non-default initial value for
this property.

Script syntax

*ObjectRef*.DDEClientServer = *ServerName$*
*ServerName$* = *ObjectRef*.DDEClientServer

---

DDEClientStatus Property

A flag that specifies whether a ViP object is presently engaged as a client in a DDE conversation.

This generic property applies to the following objects at run time: application window, check box, combo box, command button, data object, ellipse, line, list box, option button, rectangle, scroll bar, static text, and text box.

| FLAG | DESCRIPTION |
|---|---|
| FALSE (0) | (Default) Disabled. The object is not presently engaged as a client in a DDE conversation. If the user specifies this value, ViP terminates DDE links defined for the object. |
| TRUE (-1) | Active. The object is presently engaged as a client in a DDE conversation. If the user specifies this value, ViP attempts to establish the DDE links defined for the object. |

Dialog box

Use the DDE dialog box to specify a non-default initial value for this property.

Script syntax

*ObjectRef*.DDEClientStatus = *Flag%*

*Flag%* = *ObjectRef*.DDEClientStatus

---

DDEClientTimeOut Property

The interval of time that a ViP object functioning as a DDE client waits for a DDE server response. The interval is expressed as 1/10 of a second of clock time, not CPU time. For example, a value of 10 means that the object waits 1 second for a DDE server response. The default value of this property is 50 (5 seconds). If the user wants the object to wait indefinitely, specify -1.

This generic property applies to the following objects:
application window, check box, combo box, command button, data
object, ellipse, line, list box, option button, rectangle, scroll
bar, static text, and text box.

Dialog box
Use the DDE dialog box to specify a non-default initial value for
this property.

Script syntax
 *ObjectRef*.DDEClientTimeOut = *Time%*
 *Time%* = *ObjectRef*.DDEClientTimeOut

---

DDEClientTopic Property

The name of the topic or subject on a DDE server that contains
the data accessed by the ViP client object. Typically, the topic
is the fully qualified name of a file in the server application
(for example, C:\DOCS\LOAN.SAM).

The default value of this property is a null string.

This generic property applies to the following objects:
application window, check box, combo box, command button, data
object, ellipse, line, list box, option button, rectangle, scroll
bar, static text, and text box.

Dialog box
Use the DDE dialog box to specify a non-default initial value for
this property.

Script syntax
 *ObjectRef*.DDEClientTopic = *FileName$*

App - 134

*FileName$* = *ObjectRef*.DDEClientTopic

---

DDEServerActive Property

A flag that specifies whether the ViP object is presently engaged as a server in a DDE conversation.

This generic property applies to the following objects at run time: application window, check box, combo box, command button, data object, ellipse, line, list box, option button, rectangle, scroll bar, static text, and text box.

| FLAG | DESCRIPTION |
|---|---|
| FALSE (0) | The Notes ViP object is not presently engaged as a server in a DDE conversation. If the user specifies this value, ViP terminates DDE links between the client and the ViP object. |
| TRUE (-1) | The ViP object is presently engaged as a server in a DDE conversation. The user can only retrieve this value. |

Dialog box

The user cannot specify a value for this property using a dialog box.

Script syntax

*ObjectRef*.DDEServerActive = *Flag%*

You can only set this property to FALSE.

*Flag%* = *ObjectRef*.DDEServerActive

---

DDEServerEnable Property

A flag that specifies whether a ViP object can function as a DDE server.

This generic property applies to the following objects: application window, check box, combo box, command button, data object, ellipse, line, list box, option button, rectangle, scroll bar, static text, and text box.

| FLAG | DESCRIPTION |
|---|---|
| FALSE (0) | The ViP object cannot function as a DDE server. |
| TRUE (-1) | (Default) The ViP object can function as a DDE server. |

Dialog box
Use the DDE dialog box to specify a non-default initial value for this property.

Script syntax
*ObjectRef*.DDEServerEnable = *Flag%*
*Flag%* = *ObjectRef*.DDEServerEnable

Description Property

A string that typically is used to store helpful comments about an object. The default value of this property is a null string.

This generic property applies to the following objects: application window, chart, check box, combo box, command button, data object, ellipse, group box, line, link, list box, OLE object, option button, rectangle, scroll bar, static text, text box, and timer.

ViP does not display a description automatically. The user can attach a script to a scroll bar GotFocus event to display a description in a text box when the scroll bar has the focus.

Dialog box
The user cannot use a dialog box to specify a value for this property.

Script syntax
*ObjectRef*.Description = *Description$*
*Description$* = *ObjectRef*.Description

Enabled Property

A flag that specifies whether an object is enabled at run time.

This generic property applies to the following objects: application window, chart, check box, combo box, command button, data object, ellipse, group box, line, link, list box, OLE object, option button, rectangle, scroll bar, static text, text box, and timer.

To get and set a flag that specifies whether an item in a menu for an application window is enabled or disabled, use the MenuGetEnabled and MenuSetEnabled methods.

| FLAG | DESCRIPTION |
| --- | --- |
| FALSE (0) | Disabled. The object does not respond to an access key or to user-generated events (for example, mouse and keyboard events) at run time. The appearance of the object changes at run time (for example, text and scroll bars become gray). |
| | ViP automatically disables objects in a disabled application window or group box. |
| TRUE (-1) | (Default) Enabled. |

Dialog box
Use the Setup or Link Setup dialog box to specify a non-default initial value for this property.

Script syntax
*ObjectRef*.Enabled = *Flag%*
*Flag%* = *ObjectRef*.Enabled

FontName Property

The name of the typeface used for the text and contents of an object. The default value of this property is the name of the System font. This generic property applies to the following objects: check box, combo box, command button, ellipse, group box, list box, option button, rectangle, static text, and text box.
Changing the font of a static text object typically changes the size of the object.

Dialog box
Use the Font dialog box to specify a non-default initial value for this property.

Script syntax
*ObjectRef*.FontName = *Font$*
*Font$* = *ObjectRef*.FontName

---

FontSize Property

The size of the typeface, in points, used for the text and contents of an object. The default value of this property is 10. You can specify a value from 1 through 255.
This generic property applies to the following objects: check box, combo box, command button, ellipse, group box, list box, option button, rectangle, static text, and text box.
Changing the font size of a static text object typically changes the size of the object.

Dialog box
Use the Font dialog box to specify a non-default initial value for this property.

Script syntax

```
ObjectRef.FontSize = Size%
Size% = ObjectRef.FontSize
```

FontStyle Property

The style of the typeface used for the text and contents of an object. This generic property applies to the following objects: check box, combo box, command button, ellipse, group box, list box, option button, rectangle, static text, and text box.

| FONT STYLE | DESCRIPTION |
|---|---|
| NORMAL (0) | (Default) Plain |
| BOLD (1) | Bold |
| ITALIC (2) | Italic |
| UNDERLINE (4) | Underline |
| STRIKEOUT (8) | Strikeout |

To create a composite style, combine FontStyle values using OR. For example, to specify bold italic text, specify BOLD OR ITALIC. Changing the font style of a static text object typically changes the size of the object.

Dialog box
Use the Font dialog box to specify a non-default initial value for this property.

Script syntax
```
ObjectRef.FontStyle = Style%
Style% = ObjectRef.FontStyle
```

ForeColor Property

The color of the typeface used for the text and contents of an object. In ViP, color is expressed as a single long value that is equivalent to the RGB value of the color. The default value of this property is BLACK.
This generic property applies to the following objects: check box, combo box, ellipse, group box, list box, option button, rectangle, static text, and text box.

Dialog box
Use the Lines & Color dialog box to specify a non-default initial value for this property.

Script syntax
*ObjectRef*.ForeColor = *Color&*
*Color&* = *ObjectRef*.ForeColor

Height Property

The height of an object. This value is specified in either pixels or twips, depending on the value of the ScaleMode property. The default value of this property is the height of the object when it is created.
This generic property applies to the following objects: application window, chart, check box, combo box, command button, data object, ellipse, group box, line, list box, OLE object, option button, rectangle, scroll bar, static text, text box, and timer.
For a static text object and a timer, the user can only retrieve a value for the Height property; the user cannot specify a value. ViP manages positioning and sizing differently, depending on the class of the object. For example, ViP determines the initial run-time value of this property differently for application windows than for other objects.

When the user changes the value of this property for an application window at run time, ViP causes the Positioning event to occur.

Dialog box

App - 140

Use the Setup dialog box to specify a non-default design-time value for this property for all objects except static text objects or timers.

Script syntax
*ObjectRef*.Height = *Height&*
*Height&* = *ObjectRef*.Height

Justify Property

The position of text in an object. For static text, the value of this property specifies the anchor point for the object when the object is resized by a text or font change.
This generic property applies to the following objects: check box, command button, ellipse, option button, rectangle, static text, and text box.

| POSITION | DESCRIPTION |
|---|---|
| CENTER_LEFT (0) | (Default for text boxes) Flush left, vertically centered. |
| CENTERED (1) | (Default for command buttons, ellipses, and rectangles) Vertically and horizontally centered. |
| CENTER_RIGHT (2) | (Default for check boxes and option buttons) Flush right, vertically centered. |
| TOP_LEFT (3) | (Default for static text) Flush top, flush left. |
| TOP_CENTER (4) | Flush top, vertically centered. |
| TOP_RIGHT (5) | Flush top, flush right. |
| BOTTOM_LEFT (6) | Flush bottom, flush left. |
| BOTTOM_CENTER (7) | Flush bottom, vertically centered. |
| BOTTOM_RIGHT (8) | Flush bottom, flush right. |

The values that the user can specify depend on the object that

App - 141 the property applies to:

- For text in a multiline text box, the user can specify CENTER_LEFT, CENTERED, or CENTER_RIGHT. (Text in a single-line text box is always CENTER_LEFT.)
- For text in a check box or an option button, the user can specify CENTER_LEFT or CENTER_RIGHT.
- For the text of all other objects, the user can specify any of the values.

Dialog box
Use the Setup dialog box to specify a non-default initial value for this property.

Script syntax
*ObjectRef*.Justify = *Placement%*
*Placement%* = *ObjectRef*.Justify

Layer Property

The layer number of an object within an application window or a group box. This generic property applies to the following objects: chart, check box, combo box, command button, data object, ellipse, group box, line, list box, OLE object, option button, rectangle, scroll bar, static text, text box, and timer.

| LAYER NUMBER | DESCRIPTION |
|---|---|
| n | The layer number of the object. If the user specifies a value less than or equal to 1, ViP sets the value to BOTTOM_LAYER (1). If the user specifies a value greater than the number of objects in the application window, ViP sets the value to the number of objects in the window. |
| TOP_LAYER (32767) | (Default) The highest layer number for the application window. |

App - 142

| | |
|---|---|
| BOTTOM_LAYER (1) | The lowest layer number for the application window. |

When the user uses this property to set the layer order of an object, ViP automatically renumbers the layer number of other objects to reflect the change. For example, if the user specifies a layer number of 3, the objects that previously had layer numbers of 3 and above are renumbered to have layer numbers of 4 and above.

Layer number affects the display and activation order of objects:
- When objects overlap, ViP displays the objects in layer-number order. The object with the highest layer number is the topmost object. To specify whether ViP displays an application window on top of all other application windows at run time, use the TopMost property.
- When two data objects in an application window have the value of TRUE for the AutoQuery property, ViP issues queries for the data objects in layer-number order (lowest to highest).

Dialog box
Use the Setup dialog box to specify a non-default initial value for this property.

Script syntax

*ObjectRef*.Layer = *LayerNumber%*
*LayerNumber%* = *ObjectRef*.Layer

---

Left Property

The x-coordinate of the upper left corner of the object or the leftmost point of a line. This value is specified in either pixels or twips, depending on the value of the ScaleMode App - 143 property.
The default value of this property is the value of the
x-coordinate of the upper left corner of the object or the
leftmost point of a line when it is created.
This generic property applies to the following objects:
application window, chart, check box, combo box, command button,
data object, ellipse, group box, line, list box, OLE object,
option button, rectangle, scroll bar, static text, text box, and
timer.
When the user changes the value of this property for an
application window at run time, ViP causes the Positioning event
to occur.
ViP manages positioning and sizing differently, depending on
the class of the object. For example, ViP determines the initial
run-time value of the Left property differently for application
windows than for other objects.

Dialog box
Use the Setup dialog box to specify a non-default initial value
for this property.

Script syntax
*ObjectRef*.Left = *X*%
*X*% = *ObjectRef*.Left

---

LineColor Property

The color of a line or link, or the border color of an object.
In ViP, color is expressed as a single long value that is
equivalent to the RGB value of the color.
The default value of this property varies by object:
- For a link to the query cell in a data object, the default
  value is GREEN. For all other links, the default value is
  RED.

- For a line, the default value is BLACK.
- For the border of an ellipse, group box, OLE object, or rectangle, the default value is BLACK.

This generic property applies to the following objects: ellipse, group box, line, link, and rectangle.

Dialog box
Use the Lines & Color or Link Lines & Color dialog box to specify a non-default initial value for this property.

Script syntax
*ObjectRef*.LineColor = *Color&*
    For a link, the user cannot specify a value for this property at run time.
*Color&* = *ObjectRef*.LineColor

LineStyle Property

The style of a line or the style of the border of an object. This generic property applies to the following objects: ellipse, group box, line, list box, rectangle, text box. To specify a border for an application window, use the WindowStyle property.

| LINE STYLE | DESCRIPTION |
| --- | --- |
| SOLID (0) | (Default) Solid. |
| DASH (1) | Dash. |
| DOT (2) | Dot. |
| DASHDOT (3) | DashDot. |
| DASHDOTDOT (4) | DashDotDot. |
| NOLINE (5) | No border. |
| RAISED (6) | A 3-D style that makes the object look as though it is raised. |

| | |
|---|---|
| INDENTED (7) | A 3-D style that makes the object look as though it is pushed in. |
| RAISED_EDGE (9) | A 3-D style that makes the edge look as though it is a ridge. If the user specifies this value, ViP ignores the value of the LineWidth property and creates a line approximately 2 pixels wide. |
| INDENTED_EDGE (10) | A 3-D style that makes the edge look as though it is chiseled into the background. If the user specifies this value, ViP ignores the value of the LineWidth property and creates a line approximately 2 pixels wide. |

The user can specify the value NOLINE for any object that has the LineStyle property. The other values that the user can specify vary depending on the object that the property applies to and on the value of the LineWidth property:

- Ellipse

If the line is 1 pixel wide, the user can specify SOLID, DASH, DOT, DASHDOT, or DASHDOTDOT.

If the line is wider than 1 pixel, the user can specify SOLID.

- Group box

If the line is 1 pixel wide, the user can specify SOLID, DASH, DOT, DASHDOT, DASHDOTDOT, RAISED, and INDENTED.

If the line is wider than 1 pixel, the user can specify SOLID, RAISED, or INDENTED.

Regardless of the width of the line, the user can specify RAISED_EDGE or INDENTED_EDGE, which ignore the width of the line.

- Line

If the line is 1 pixel wide, the user can specify SOLID, DASH, DOT, DASHDOT, or DASHDOTDOT.

If the line is wider than 1 pixel, the user can specify SOLID.

- List box

The width of the line is always 1 pixel wide. The user can specify SOLID.
- Rectangle
  If the line is 1 pixel wide, the user can specify SOLID, DASH, DOT, DASHDOT, or DASHDOTDOT.
  If the line is wider than 1 pixel, the user can specify SOLID, RAISED, or INDENTED.
  Regardless of the width of the line, the user can specify RAISED_EDGE or INDENTED_EDGE, which ignore the width of the line.
- Text box
  The width of the line is always 1 pixel wide. The user can specify SOLID.

Dialog box
- For list boxes, use the List Box Options dialog box to specify a non-default initial value for the border of a list box.
- For text boxes, use the Text Box Options dialog box to specify a non-default initial value for the border of a text box.
- For all other objects, use the Lines & Color dialog box to specify a non-default initial value for this property.

Script syntax
*ObjectRef*.LineStyle = *Style*%
*Style*% = *ObjectRef*.LineStyle

LineWidth Property

The width of a link or a line, or the width of the border of an ellipse, group box, or rectangle.
This generic property applies to the following objects: ellipse, group box, line, link, and rectangle.

| WIDTH | DESCRIPTION |
|---|---|
| 0 | No border |
| 1 | (Default) 1 pixel |
| 2 | 2 pixels |
| 3 | 3 pixels |
| 4 | 4 pixels |
| 5 | 5 pixels |

Specifying a line width wider than 1 pixel affects the styles that the user can specify for the line.

Dialog box
Use the Lines & Color or Link Lines & Color dialog box to specify a non-default initial value for this property.

Script syntax
  *ObjectRef*.LineWidth = *Width*%
    For a link, the user cannot specify a value for this
    property at run time.
  *Width*% = *ObjectRef*.LineWidth

---

Name Property

The name of a permanent object. The user can specify a value from 1 through 22 characters long.
The default value of this property is the name that ViP generates when the object is created.
This generic property applies to the following objects: application window, chart, check box, combo box, command button, data object, ellipse, group box, line, link, list box, OLE object, option button, rectangle, scroll bar, static text, text box, and timer.

Dialog box
Use the Setup or Link Setup dialog box to specify a non-default initial value for this property.

App - 148

Script syntax

*ObjectRef*.Name = *ObjectName$*

At run time, the user cannot change the name of a permanent object.

*ObjectName$* = *ObjectRef*.Name

At run time, the name of an application window is qualified by the unique instance of the window. The numbering of application window instances is global to all of the application windows opened in the running applications. For example, the four open application windows in an application might have the instance names of APPWIN1:1, APPWIN1:2, APPWIN2:3 and APPWIN2:4. To retrieve the instance name of an application window, use the OpenAppWindow function.

Parent Property

The parent of the object.  The value depends on whether the object is in a group box:
- If the object is in a group box, the value is the name of the group box that contains the object.
- If the object is not in a group box, the value is the fully qualified instance name of the application window that contains the object.

This generic property applies to the following objects: chart, check box, combo box, command button, data object, ellipse, group box, line, list box, OLE object, option button, rectangle, scroll bar, static text, text box, and timer.

Dialog box

The user cannot set or get this property using a dialog box.

Script syntax

The user cannot set this property.

*ObjectName$* = *ObjectRef*.Parent

Right Property

The x-coordinate of the lower right corner of an object or the
rightmost point of a line. This value is specified in either
pixels or twips, depending on the value of the ScaleMode
property.
The default value of this property is the x-coordinate of the
lower right corner of an object or the rightmost point of a line
as originally created.
This generic property applies to the following objects:
application window, chart, check box, combo box, command button,
data object, ellipse, group box, line, list box, OLE object,
option button, rectangle, scroll bar, static text, text box, and
timer.
ViP manages positioning and sizing differently, depending on
the class of the object. For example, ViP determines the initial
run-time value of this property differently for application
windows than for other objects.

When the value of this property for an application window at run
time changes, ViP causes the Positioning event to occur.

Dialog box
The user cannot explicitly set this property using a dialog box.
However, the user can use the Setup dialog box to specify a value
for the related Left property.

Script syntax
 *ObjectRef*.Right = *Right&*
 *Right&* = *ObjectRef*.Right

TabIndex Property

App - 150

The position of an object in the tab order of the objects on the application window at run time. This property is used to specify the tab index order of objects in an application window. To specify the number and position of tab stops in a text box or in a list box, the SetTabStops method is used.

ViP determines the default value of the TabIndex property by the placement of the object when it is created. The default tab index order begins in the upper lefthand corner of the application window and proceeds (top to bottom, left to right) to the bottom right corner of the window.

This generic property applies to the following objects: check box, combo box, command button, data object, ellipse, line, list box, option button, rectangle, scroll bar, static text, and text box.

| TAB | INDEX | DESCRIPTION |
|---|---|---|
| n | | The position of the object in the tab order |
| FIRST_TAB | (1) | The first object in the tab order |
| LAST_TAB | (32767) | The last object in the tab order |

When the user uses the TabIndex property to set the tab order of an object, ViP automatically changes the TabIndex numbers of other objects to reflect insertions and deletions.

ViP uses the value of the TabIndex property to determine:

- The order in which ViP moves from object to object when the user presses TAB. ViP tabs in ascending TabIndex order from one enabled, visible tab stop object to another enabled, visible tab stop object.
- The object to set focus to when the user presses an access key (specified using the Text property). To set focus, ViP does the following:
  1. Identifies the object the user pressed the access key for.
  2. Identifies the TabIndex value of that object. If this object is an enabled, visible tab stop, ViP sets focus to the object. If the object is not an enabled,
visible tab stop, ViP moves through the objects in
ascending TabIndex order and sets focus to the first
object it identifies as a tab stop.

Dialog box

Use the Tab Order or Setup dialog box to specify a non-default
initial value for this property.

Script syntax
*ObjectRef*.TabIndex = *Number%*
*Number%* = *ObjectRef*.TabIndex

---

TabStop Property

A flag that specifies whether ViP stops at an object when the
user presses TAB or an access key.
This generic property applies to the following objects: check
box, combo box, command button, ellipse, group box, line, list
box, option button, rectangle, scroll bar, static text, and text
box.

| FLAG | DESCRIPTION |
| --- | --- |
| FALSE (0) | Object is not a tab stop. Specify this value if the user wants to remove an enabled, visible object from the tab order of an application window. |
| TRUE (-1) | (Default) Object is a tab stop. ViP only stops at the object if it is enabled and visible. ViP skips all disabled or invisible objects. ViP tabs in ascending TabIndex order from one enabled, visible tab stop object to another enabled, visible tab stop object. |

To specify the number and positions of tab stops in a text box or
in a list box, use the SetTabStops method.

App - 152

Dialog box
Use the Setup dialog box to specify a non-default initial value for this property.

Script syntax
 *ObjectRef*.TabStop = *Flag%*
 *Flag%* = *ObjectRef*.TabStop

---

Text Property

The text associated with an object.
This generic property applies to the following objects:
- Application window
  Text is the text in the title bar of the application window. The default value is the name of the application window when it is created. Text can be up to 64K long.
  To get and set the text (including access keys) of an item in a menu for an application window, use the MenuGetText and MenuSetText methods.
- Check box
  Text is the label of the object. The default value is the name of the object when it is created. When the user changes the name of the object, the text of the object does not change unless a script statement sets the value of the Text property to the value of the Name property. Text can include an access key and can be up to 64K long.
- Clipboard
  Text is the data on the Clipboard that has the VIPCF_TEXT format. The FormatAvailable method identifies the contents of the Clipboard by format. Text can be up to 64K long.
- Combo box
  The meaning and value of text varies, depending on the style of the combo box:
  - For simple and drop-down combo boxes, text is the contents of the text box portion of the combo box. The
default value is a null string. Text can be up to 64K
characters long. Changing the value of text causes the
Change event for the combo box to occur.
- For drop-down list combo boxes, text is the selected
  item in a list box. For a combo box with this style,
  the user cannot specify a value for text.

- Command button

Text is the label of the command button. The default value
is the name of the command button when it is created. When
the user changes the name of the command button, the text of
the command button does not change unless a script statement
sets the value of the Text property to the value of the Name
property. Text can include an access key and can be up to
64K long.

- Data object

Text is the text in the title of the data object. The
default value is the name of the object when it is created.
When the user changes the name of the object, the text of
the object does not change unless a script statement sets
the value of the Text property to the value of the Name
property. Text can include an access key for the object and
can be up to 64K long.

- Ellipse

Text is the label of the ellipse. The default value is a
null string. Text can include an access key and can be up
to 64K long.
Changing the value of text for an ellipse causes the Change
event for the ellipse to occur.

- Group box

Text is the label of the group box. The default value is
the name of the group box when it is created. When the user
changes the name of the object, the text of the group box
does not change unless a script statement sets the value of
the Text property to the value of the Name property. Text App - 154 can include an access key and can be up to 64K long.
- List box

Text is the selected item in a list box. The user cannot specify a value for text.
- Option button Text is the label of the option button. The default value is the name of the option button when it is created. When the user changes the name of the option button, the text of the option button does not change unless a script statement sets the value of the Text property to the value of the Name property. Text can include an access key and can be up to 64K long.

- Rectangle

Text is the label of the rectangle. The default value is a null string. Text can include an access key and can be up to 64K long.

Changing the value of text for a rectangle causes the Change event for the rectangle to occur.
- Static text Text is the static text object. The default value is the name of the static text object when it is created. When the user changes the name of the static text object, the text of the static text object does not change unless a script statement sets the value of the Text property to the value of the Name property. Text can include an access key and can be up to 64K long.

Changing the value of text for a static text object causes the Change event for the static text object to occur and resizes the static text object (see the Justify property for details).
- Text box Text is the contents of the text box. The default value is a null string.
  - If the text box is a multiline text box, text can be up App - 155 to 64K long.  Line endings are indicated by carriage
return/linefeed CHR$(13) + CHR$(10).  When the user
retrieves text for a text box, ViP removes or keeps
these line endings depending on the value of the
FormatLines method.
- If the text box is a single-line text box, text can be
up to 32K long.

Changing the value of text for a text box causes the Change
event for the text box to occur.

When the text of an object changes, ViP immediately repaints
the object.

Dialog box
Use the Setup dialog box to specify a non-default initial value
for this property.

Script syntax
*ObjectRef*.Text = *Text$*
    For list boxes and drop-down list combo boxes, the user
    cannot set a value.
*Text$* = *ObjectRef*.Text

---

Top Property

The y-coordinate of the upper left corner of an object or the
uppermost point of a line.  This value is specified in either
pixels or twips, depending on the value of the ScaleMode
property.  The default value of this property is the y-coordinate
of the upper left corner of the object or the uppermost point of
a line when the object or line is created.
This generic property applies to the following objects:
application window, chart, check box, combo box, command button,
data object, ellipse, group box, line, list box, OLE object, App - 156 option button, rectangle, scroll bar, static text, text box, and timer.

ViP manages positioning and sizing differently, depending on the class of the object. For example, ViP determines the initial run-time value of the Top property differently for application windows than for other objects.

When the user changes the value of this property for an application window at run time, ViP causes the Positioning event to occur.

Dialog box

Use the Setup dialog box to specify a non-default initial value for this property.

Script syntax

*ObjectRef*.Top = *Top&*
*Top&* = *ObjectRef*.Top

Transparent Property

A flag that specifies whether the background of an object is transparent or opaque.

This generic property applies to the following objects: check box, ellipse, group box, line, option button, and rectangle. The background of static text is always transparent.

| FLAG | DESCRIPTION |
|---|---|
| FALSE (0) | (Default for all objects except check boxes and option buttons) The background of the object is opaque and is the color specified by the value of the BackColor property. |
| TRUE (-1) | (Default for check boxes and option buttons) The object is transparent. ViP ignores the value of the BackColor property. Static text is always transparent. |

App - 157

Dialog box

Use the Lines & Color dialog box to specify a non-default initial value for this property.

Script syntax

*ObjectRef*.Transparent = *Flag%*
*Flag%* = *ObjectRef*.Transparent

---

Visible Property

A flag that specifies whether an object is visible at run time. This generic property applies to the following objects: application window, chart, check box, combo box, command button, data object, ellipse, group box, line, list box, OLE object, option button, rectangle, scroll bar, static text, and text box.

| FLAG | DESCRIPTION |
|---|---|
| FALSE (0) | The object is not visible. The object cannot receive focus and a run-time error occurs if the user uses the SetFocus method to set the focus to the object. Also, the object does not act as a tab stop.<br>Links, timers, and minimized data objects are always invisible at run time. |
| TRUE (-1) | (Default) The object is visible. |

When the visibility of an object changes, ViP immediately repaints the object.

Dialog box

Use the Setup dialog box to specify a non-default initial value for this property.

Script syntax

*ObjectRef*.Visible = *Flag%*
*Flag%* = *ObjectRef*.Visible

App - 158

Width Property

The width of an object.  This value is specified in either pixels
or twips, depending on the value of the ScaleMode property.
This generic property applies to the following objects:
application window, chart, check box, combo box, command button,
data object, ellipse, group box, line, list box, OLE object,
option button, rectangle, scroll bar, static text, text box, and
timer.
For a static text object and a timer, the user can only retrieve
a value for the Width property; the user cannot specify a value.
ViP manages positioning and sizing differently, depending on
the class of the object.  For example, ViP determines the initial
run-time value of this property differently for application
windows than for other objects.

When the value of this property for an application window at run
time changes, ViP causes the Positioning event to occur.

Dialog box
Use the Setup dialog box to specify a non-default design-time
value for this property for all objects except static text
objects and timers.

Script syntax
 *ObjectRef*.Width = *Width&*
 *Width&* = *ObjectRef*.Width

APPENDIX 38

ClipboardCopy Method

Copies the text, picture, DDE link, or internal format of a ViP object to the Clipboard.

This generic method applies to the following objects: application window, chart, check box, combo box, command button, data object, ellipse, group box, line, list box, OLE object, option button, rectangle, scroll bar, static text, text box, and timer.

Script syntax

Status% = ObjectRef.ClipboardCopy(Format%)

Status% is SUCCESS (0) when the operation is successful, or nonzero when it fails.

Format% is the name of the format that the user wants the copied data to have.

| FORMAT | DESCRIPTION |
|---|---|
| VIPCF_TEXT (1) | Text. The user can only specify this value if the object has text. |
| VIPCF_BITMAP (2) | Bitmap. The user can only specify this value if the object contains a picture. |
| VIPCF_METAFILE (3) | Metafile. The user can only specify this value if the object contains a picture. |
| VIPCF_DIB (8) | Device-independent bitmap. The user can only specify this value if the object contains a picture. |
| VIPCF_LINK (-16640) | Link. The user can only specify this value if the object participates as a server in a DDE conversation. |
| VIPCF_OBJECT (-16639) | ViPObject. The Clipboard contains data in the ViP object internal format. The user can specify this value for any ViP object except an application window. If the user specifies this value for an OLE object, the method copies either an embedded OLE object or a linked OLE object depending on the type of OLE |

|   |   |
|---|---|
| | object. |
| VIPCF_NOTOBJECT (-16638) | The Clipboard contains data in the VIPCF_TEXT format if the object has the Text property; data in the VIPCF_BITMAP, VIPCF_METAFILE, and VIPCF_DIB formats if the object contains a picture; and data in the VIPCF_LINK format if the object is a server in a DDE conversation. The Clipboard does not contain data in the VIPCF_OBJECT format. |
| VIPCF_DEFAULT (-16637) | The Clipboard contains data in all possible formats.<br>The Clipboard contains data in the VIPCF_OBJECT format if the object is not an application window; data in the VIPCF_TEXT format if the object has the Text property; data in the VIPCF_BITMAP, VIPCF_METAFILE, and VIPCF_DIB formats if the object contains a picture; and data in the VIPCF_LINK format if the object is a server in a DDE conversation. Specifying this value places the same formats on the Clipboard as the formats that are placed when the user presses the CTRL+C or CTRL+V keys at design time. |

The user can specify the VIPCF_DEFAULT and VIPCF_NOTOBJECT values for all objects. The other values that the user can specify for *Format%* vary by object, as shown below.

- Application window
  VIPCF_DIB, VIPCF_BITMAP, or VIPCF_METAFILE. Copies the picture in the application window as a device-independent bitmap, device-dependent bitmap, or metafile. The user can specify one of these values only if there is a picture in the application window.
  VIPCF_TEXT. Copies the value of the Text property.
  VIPCF_LINK. Copies a DDE link with the ViP object acting as the server in the conversation.
  - Chart
  VIPCF_OBJECT. Copies the object and all of its properties.

VIPCF_METAFILE. Copies the chart as a metafile.
- Check box

VIPCF_OBJECT. Copies the object and all of its properties (including text).

VIPCF_TEXT. Copies the value of the Text property.

VIPCF_LINK. Copies a DDE link with the ViP object acting as the server in the conversation.

- Combo box

VIPCF_OBJECT. Copies the object and all of its properties (including text).

VIPCF_TEXT. Copies the value of the Text property.

VIPCF_LINK. Copies a DDE link with the ViP object acting as the server in the conversation.

- Command button

VIPCF_OBJECT. Copies the object and all of its properties (including text and picture, if any).

VIPCF_DIB, VIPCF_BITMAP, or VIPCF_METAFILE. Copies the picture in the command button as a device-independent bitmap, device-dependent bitmap, or metafile. The user can specify one of these values only if there is a picture in the command button.

VIPCF_TEXT. Copies the value of the Text property.

VIPCF_LINK. Copies a DDE link with the ViP object acting as the server in the conversation.

- Data object

VIPCF_OBJECT. Copies the object and all of its properties (including text).

VIPCF_TEXT. Copies the value of the Text property.

VIPCF_LINK. Copies a DDE link with the ViP object acting as the server in the conversation.

- Ellipse

VIPCF_OBJECT. Copies the object and all of its properties (including text and picture, if any).

VIPCF_DIB, VIPCF_BITMAP, or VIPCF_METAFILE. Copies the picture in the ellipse as a device-independent bitmap, device-dependent bitmap, or metafile. The user can specify one of these values only if there is a picture in the ellipse.
VIPCF_TEXT. Copies the value of the Text property.
VIPCF_LINK. Copies a DDE link with the ViP object acting as the server in the conversation.
- Group box
VIPCF_OBJECT. Copies the object and all of its properties (including text and picture, if any).
VIPCF_DIB, VIPCF_BITMAP, or VIPCF_METAFILE. Copies the picture in the group box as a device-independent bitmap, device-dependent bitmap, or metafile. The user can specify one of these values only if there is a picture in the group box.
VIPCF_TEXT. Copies the value of the Text property.
- Line
VIPCF_OBJECT. Copies the object and all of its properties.
VIPCF_LINK. Copies a DDE link with the ViP object acting as the server in the conversation.
- List box
VIPCF_OBJECT. Copies the object and all of its properties (including text).
VIPCF_TEXT. Copies the value of the Text property.
VIPCF_LINK. Copies a DDE link with the ViP object acting as the server in the conversation.
- OLE object
VIPCF_OBJECT. Copies either an embedded OLE object or a linked OLE object (depending on the type of OLE object) and all of its properties.
- Option button
VIPCF_OBJECT. Copies the object and all of its properties (including text).
VIPCF_TEXT. Copies the value of the Text property.
VIPCF_LINK. Copies a DDE link with the ViP object acting as the server in the conversation.

App - 163

- Rectangle

VIPCF_OBJECT. Copies the object and all of its properties (including text and picture, if any).

VIPCF_DIB, VIPCF_BITMAP, or VIPCF_METAFILE. Copies the picture in the rectangle as a device-independent bitmap, device-dependent bitmap, or metafile. The user can specify one of these values only if there is a picture in the rectangle.

VIPCF_TEXT. Copies the value of the Text property.

VIPCF_LINK. Copies a DDE link with the ViP object acting as the server in the conversation.

- Scroll bar

VIPCF_OBJECT. Copies the object and all of its properties.

VIPCF_LINK. Copies a DDE link with the ViP object acting as the server in the conversation.

- Static text

VIPCF_OBJECT. Copies the object and all of its properties (including text).

VIPCF_TEXT. Copies the value of the Text property.

VIPCF_LINK. Copies a DDE link with the ViP object acting as the server in the conversation.

- Text box

VIPCF_OBJECT. Copies the object and all of its properties (including text).

VIPCF_TEXT. Copies the value of the Text property.

VIPCF_LINK. Copies a DDE link with the ViP object acting as the server in the conversation.

- Timer

VIPCF_OBJECT. Copies the object and all of its properties.

---

ClipboardPaste Method

Copies data, in a specified format, from the Clipboard into a ViP object.

This generic method applies to the following objects: application window, check box, combo box, command button, data object, ellipse, group box, line, list box, OLE object, option button, rectangle, scroll bar, static text, text box, and timer.

Script syntax

*Status%* = *ObjectRef*.ClipboardPaste(*Format%*)
*Status%* is SUCCESS (0) when the operation is successful, or nonzero when it fails.
*Format%* is the name of a Clipboard format.

| FORMAT | DESCRIPTION |
| --- | --- |
| VIPCF_TEXT (1) | Text. The user can only specify this value if the object has text. |
| VIPCF_BITMAP (2) | Bitmap. The user can only specify this value if the object contains a picture. |
| VIPCF_METAFILE (3) | Metafile. The user can only specify this value if the object contains a picture. |
| VIPCF_DIB (8) | Device-independent bitmap. The user can only specify this value if the object contains a picture. |
| VIPCF_LINK (-16640) | Link. The user can only specify this value if the object participates as a client in a DDE conversation. |
| VIPCF_OBJECT (-16639) | ViPObject. The user can only specify this value at design time. The Clipboard contains data in the ViP object internal format. The user can specify this value for any ViP object except an application window. If the user specifies this value, the method pastes all of the values of the object properties from the Clipboard into the object. If the user specifies this value for an OLE object, the method pastes either an embedded OLE object or a linked OLE object depending on the type of OLE object that was originally |

App - 165

| | |
|---|---|
| | pasted onto the Clipboard. |
| VIPCF_NOTOBJECT (-16638) | The Clipboard contains data in all formats except the ViP object internal format. The user can specify this value for any ViP object. If the user specifies this value, the method pastes data in the various formats into the related object properties. The method pastes data in the VIPCF_TEXT format if the object has the Text property; data in the VIPCF_BITMAP, VIPCF_METAFILE, and VIPCF_DIB formats if the object contains a picture; and data in the VIPCF_LINK format if the object is a server in a DDE conversation. The Clipboard does not contain data in the VIPCF_OBJECT format. |
| VIPCF_DEFAULT (-16637) | Paste all possible formats. If the user specifies this value at design time and the object is not an application window and the Clipboard contains data in the VIPCF_OBJECT format, ViP pastes the data in the VIPCF_OBJECT format into the application window. At design time and run time, ViP pastes data in the VIPCF_TEXT format into the object if it has the Text property; pastes data in the VIPCF_BITMAP, VIPCF_METAFILE, and VIPCF_DIB formats into the object if it contains a picture; and pastes data in the VIPCF_LINK format into the object if it is a server in a DDE conversation. Specifying this value places the same formats on the Clipboard as the formats that are placed when you press the CTRL+C or CTRL+V keys at design time. |

The user can specify the VIPCF_DEFAULT and VIPCF_NOTOBJECT values for all objects. The other values that the user can specify for *Format%* vary by object, as shown below.

- Application window
  VIPCF_DIB, VIPCF_BITMAP, or VIPCF_METAFILE. Pastes the picture into the application. The user can specify one of these values only if there is a picture in the application window.
VIPCF_TEXT. Pastes the data into the text of the object.
VIPCF_LINK. Creates a DDE link with the ViP object acting as the client in the conversation.
- Chart
VIPCF_OBJECT. Pastes the object and all of its properties. The user can only specify this value at design time.
VIPCF_METAFILE. Pastes the metafile into the chart object. The user can only specify this value at design time.
- Check box VIPCF_OBJECT. Pastes the object and all of its properties (including text). The user can only specify this value at design time.
VIPCF_TEXT. Pastes the data into the text of the object.
VIPCF_LINK. Creates a DDE link with the ViP object acting as the client in the conversation.
- Combo box
VIPCF_OBJECT. Pastes the object and all of its properties (including text). The user can only specify this value at design time.
VIPCF_TEXT. Pastes the data into the text of the object.
VIPCF_LINK. Creates a DDE link with the ViP object acting as the server in the conversation.
- Command button
VIPCF_OBJECT. Pastes the object and all of its properties (including text and picture, if any). The user can only specify this value at design time.
VIPCF_DIB, VIPCF_BITMAP, or VIPCF_METAFILE. Pastes the picture into the command button as a device-independent bitmap, device-dependent bitmap, or metafile. The user can specify one of these values only if there is a picture in the command button.
VIPCF_TEXT. Pastes the data into the text of the object.
VIPCF_LINK. Creates a DDE link with the ViP object acting App - 167 as the client in the conversation.
- Data object
VIPCF_OBJECT. Pastes the object and all of its properties
(including text). The user can only specify this value at
design time.
VIPCF_TEXT. Pastes the data into the text of the object.
VIPCF_LINK. Creates a DDE link with the ViP object acting
as the client in the conversation.
- Ellipse
VIPCF_OBJECT. Pastes the object and all of its properties
(including text and picture, if any). The user can only
specify this value at design time.
VIPCF_DIB, VIPCF_BITMAP, or VIPCF_METAFILE. Pastes the
picture into the ellipse as a device-independent bitmap,
device-dependent bitmap, or metafile. The user can specify
one of these values only if there is a picture in the
ellipse.
VIPCF_TEXT. Pastes the data into the text of the object.
VIPCF_LINK. Creates a DDE link with the ViP object acting
as the client in the conversation.
- Group box
VIPCF_OBJECT. Pastes the object and all of its properties
(including text and picture, if any). The user can specify
this value at design time.
VIPCF_DIB, VIPCF_BITMAP, or VIPCF_METAFILE. Pastes the
picture into the group box as a device-independent bitmap,
device-dependent bitmap, or metafile. The user can specify
one of these values only if there is a picture in the group
box.
VIPCF_TEXT. Pastes the data into the text of the object.
- Line
VIPCF_OBJECT. Pastes the object and all of its properties.
The user can only specify this value at design time.
VIPCF_LINK. Creates a DDE link with the ViP object acting
as the client in the conversation.

- List box
  VIPCF_OBJECT. Pastes the object and all of its properties
  (including text). The user can only specify this value at
  design time.
  VIPCF_TEXT. Pastes the data into the text of the object.
  VIPCF_LINK. Creates a DDE link with the ViP object acting
  as the client in the conversation.
- OLE object
  VIPCF_OBJECT. Copies either an embedded OLE object or a
  linked OLE object (depending on the type of OLE object) and
  all of its properties.
- Option button
  VIPCF_OBJECT. Pastes the object and all of its properties
  (including text). The user can only specify this value at
  design time.
  VIPCF_TEXT. Pastes the data into the text of the object.
  VIPCF_LINK. Creates a DDE link with the ViP object acting
  as the server in the conversation.
- Rectangle
  VIPCF_OBJECT. Pastes the object and all of its properties
  (including text and picture, if any). The user can only
  specify this value at design time.
  VIPCF_DIB, VIPCF_BITMAP, or VIPCF_METAFILE. Pastes the
  picture into the rectangle as a device-independent bitmap,
  device-dependent bitmap, or metafile. The user can specify
  one of these values only if there is a picture in the
  rectangle.
  VIPCF_TEXT. Pastes the data into the text of the object.
  VIPCF_LINK. Creates a DDE link with the ViP object acting
  as the client in the conversation.
- Scroll bar
  VIPCF_OBJECT. Pastes the object and all of its properties.
  The user can only specify this value at design time.
  VIPCF_LINK. Creates a DDE link with the ViP object acting
  as the client in the conversation.

App - 169

- Static text
  VIPCF_OBJECT. Pastes the object and all of its properties
  (including text). The user can only specify this value at
  design time.
  VIPCF_TEXT. Pastes the data into the text of the object.
  VIPCF_LINK. Creates a DDE link with the ViP object acting
  as the client in the conversation.
- Text box
  VIPCF_OBJECT. Pastes the object and all of its properties
  (including text). The user can only specify this value at
  design time.
  VIPCF_TEXT. Pastes the data into the text of the object.
  VIPCF_LINK. Creates a DDE link with the ViP object acting
  as the client in the conversation.
- Timer
  VIPCF_OBJECT. Pastes the object and all of its properties.
  The user can only specify this value at design time.

CursorCopy Method

Copies a cursor from one object to another.
- If the source-object cursor is a standard Windows cursor,
  the CursorCopy method copies the value of the source-object
  Cursor property to the destination-object Cursor property.
- If the source-object cursor was loaded using the CursorLoad
  method, the CursorCopy method copies the cursor file from
  the source object and loads the copy of the file into the
  destination object.

This generic method applies to the following objects: application window, chart, check box, combo box, command button, ellipse, group box, line, list box, OLE object, option button, rectangle, scroll bar, static text, and text box.

Script syntax

App - 170

*Status%* = *ObjectRef*.CursorCopy(*ObjectName$*)

*Status%* is SUCCESS (0) when the operation is successful, or nonzero when it fails.

*ObjectName$* is the name of the source object that contains the cursor that is to be copied. This object can be an application window, chart, check box, combo box, command button, ellipse, group box, line, list box, OLE object, option button, rectangle, scroll bar, static text, or text box.

The values that the user specifies for the object vary, depending on whether the CursorCopy method is in a script of a designer tool or in the script of a regular ViP application and whether the source object is an application window or another type of object.

- If the CursorCopy method for the object the user is creating is in a script in a designer tool, specify one of the values shown below:

| SOURCE OBJECT | SPECIFY THESE VALUES |
|---|---|
| Application window | If the user wants to copy the cursor from the current design-time application window, specify "\AppWindow". |
| | If the user wants to copy the cursor from a design-time application window that is not current, specify AppWindowInstanceName$ + "\AppWindow". The OpenAppWindow function provides the instance name of an application window. |
| Other objects | If the user wants to copy the cursor from the selected design-time object in the current design-time application window, specify a null string. |
| | If the user wants to copy the cursor from a non-selected object in the current design-time application window, specify "\" + ObjectName$. |

If the user uses this method to copy a cursor into an object at design time, ViP saves the cursor with the object.

App - 171

- If the CursorCopy method for the object you are creating is in a script in a regular ViP application, specify one of the values shown below:

| SOURCE OBJECT | SPECIFY THESE VALUES |
| --- | --- |
| Application window | If the user wants to copy the cursor of the active application window, specify "AppWindow". |
| | If the user wants to copy the cursor of a non-active application window, specify AppWindowInstanceName$[ + "\AppWindow"]. The OpenAppWindow function provides the instance name of an application window. |
| Other objects | If the user wants to copy the cursor of an object that is in the active application window, specify ObjectName$. |
| | If the user wants to copy the cursor of an object that is not in the active application window, specify AppWindowInstanceName$ + "\" + ObjectName$. The OpenAppWindow function provides the instance name of an application window. |

CursorLoad Method

Loads a cursor from a cursor file into an object and causes the cursor to appear when the mouse is over the specified object. Use this method to change a predefined Windows cursor to a user-defined cursor. If the user uses this method to load a cursor into an object at design time, ViP saves the cursor with the object and the user does not need to ship the cursor file with the ViP application.

Use the Cursor property to get or set a predefined Windows cursor.

Use the CursorCopy method to copy a cursor from one object to another.

This generic method applies to the following objects: application
window, chart, check box, combo box, command button, ellipse,
group box, line, list box, OLE object, option button, rectangle,
scroll bar, static text, and text box.

Script syntax
Status% = ObjectRef.CursorLoad(CursorFileName$.CUR)
Status% is SUCCESS (0) when the operation is successful, or
nonzero when it fails.
CursorFileName$ is the name of the Windows resource file that
contains the cursor that the user wants to load and store with
the object.
This file has a .CUR file extension. Typically, the user creates
one file using one of the Windows resource tools for each cursor.
If the user specifies a file that contains more than one cursor,
this method selects the first cursor in the file.

DDEClientExecute Method

Sends a command from a ViP object functioning as a DDE client
to a DDE server.  Before the uesr uses this method, the user must
establish a DDE conversation.
This generic method applies to the following objects: application
window, check box, combo box, command button, data object,
ellipse, line, list box, option button, rectangle, scroll bar,
static text, and text box.

Script syntax
Status% = ObjectRef.DDEClientExecute(CommandString$)
Status% is SUCCESS (0) when the operation is successful, or
nonzero when it fails.
CommandString$ is a command to the server that meets the
requirements of the server Execute transaction handler.

DDEClientPoke Method

Sends data from a ViP object functioning as a DDE client to a DDE server.
This generic method applies to the following objects: application window, check box, combo box, command button, data object, ellipse, line, list box, option button, rectangle, scroll bar, static text, and text box.
The type of data sent to the server varies depending on the ViP object.

| OBJECT | DATA SENT |
|---|---|
| Application window | The picture displayed in the object |
| Check box | State property |
| Combo box | Contents property |
| Command button | State property |
| Data object | Contents property |
| Ellipse | The picture displayed in the object |
| Line | LineWidth property |
| List box | Contents property |
| Option button | State property |
| Rectangle | The picture displayed in the object |
| Scroll bar | Value property |
| Static text | Text property |
| Text box | Text property |

Before the user uses this method, the user must establish a conversation.

Script syntax
*Status%* = *ObjectRef*.DDEClientPoke()
*Status%* is SUCCESS (0) when the operation is successful, or nonzero when it fails.

---

DDEClientRequest Method

Retrieves data for a ViP object functioning as a DDE client from a DDE server. Before the user uses this method, the user must establish a conversation.

App - 174

This generic method applies to the following objects: application window, check box, combo box, command button, data object, ellipse, line, list box, option button, rectangle, scroll bar, static text, and text box.

Script syntax

*Status%* = *ObjectRef*.DDEClientRequest()

*Status%* is SUCCESS (0) when the operation is successful, or nonzero when it fails.

DDEUseData Method

Places incoming DDE data in a ViP object functioning as a DDE client. This method places the data in the property of the object shown in the table below:

| OBJECT | WHERE METHOD PLACES DATA |
|---|---|
| Application window | The picture displayed in the object |
| Check box | State property |
| Combo box | Contents property |
| Command button | State property |
| Data object | Contents property |
| Ellipse | The picture displayed in the object |
| Line | LineWidth property |
| List box | Contents property |
| Option button | State property |
| Rectangle | The picture displayed in the object |
| Scroll bar | Value property |
| Static text | Text property |
| Text box | Text property |

The user can use this method only in a DDEClientArriving event script.

This generic method applies to the following objects: application window, check box, combo box, command button, data object, ellipse, line, list box, option button, rectangle, scroll bar, static text, and text box.

This method allows a ViP client object to use incoming DDE data before the DDEClientArriving event script ends.

App - 175

Consequently, the user must set the Cancel% parameter of the
DDEClientArriving event to TRUE in the event script to insure
that the ViP client object does not use the data again.

Script syntax
*Status%* = *ObjectRef*.DDEUseData()
*Status%* is SUCCESS (0) when the operation is successful, or
nonzero when it fails.

---

DoEvent Method

Causes the script and links associated with an event for an
object to occur at run time. With this method the user does not
specify values for the parameters of the event; the parameters of
the event default to a value of 0 (zero) or a null string. The
user uses the DoEventArgs method to specify values for the
parameters of the event. This method does not directly change
the object on which it is called.
This generic method applies to the following objects: application
window, chart, check box, combo box, command button, data object,
ellipse, group box, line, list box, OLE object, option button,
rectangle, scroll bar, static text, text box, and timer.

Script syntax
*Status%* = *ObjectRef*.DoEvent(*EventName$*)
*Status%* is SUCCESS (0) when the operation is successful, or
nonzero when it fails.
*EventName$* is the name of an event.

---

DoEventArgs Method

Causes the script and links associated with an event for an
object to occur at run time. The user must specify values for
the parameters of the event with this method. The user uses the DoEvent method to default the parameters of the event to a value of 0 (zero) or a null string. This method does not directly change the object on which it is called.
This generic method applies to the following objects: application window, chart, check box, combo box, command button, data object, ellipse, group box, line, link, list box, OLE object, option button, rectangle, scroll bar, static text, text box, and timer.

Script syntax
*Status%* = *ObjectRef*.DoEventArgs(*EventName$[, Parameter1,... Parametern]*)
*Status%* is SUCCESS (0) when the operation is successful, or nonzero when it fails.
*EventName$* is the name of an event.
*Parameter1...Parametern* are the parameters associated with *EventName$*. This parameter list must exactly match the parameters listed for the event.

Example
The following example initiates and passes a string to the User event script for a text box named Text1.
Ret% = Text1.DoEventArgs("User","String to be passed to User event")

---

FindEvent Method

Returns the name of an event in a list of object events. ViP does not maintain the list of object events in any particular order.
This generic method applies to the following objects: application window, chart, check box, combo box, command button, data object, ellipse, group box, line, link, list box, OLE object, option button, rectangle, scroll bar, static text, text box, and timer.

Script syntax

*FoundEventName$* = *AppWindowRef*.FindEvent(*CurrentEventName$, Direction%*)

*FoundEventName$* is the name of the requested event, or a null string when the method reaches the end of the event list. *CurrentEventName$* is the name of the event from which the user wants to start searching. The user must specify a value for this parameter if the value of *Direction%* is FINDNEXT or FINDPREV; however, the method ignores the value of this parameter if the user specifies FINDFIRST or FINDLAST for *Direction%*.

*Direction%* is the direction the user wants to search in or the location of the event the user wants returned.

| DIRECTION | DESCRIPTION |
|---|---|
| FINDFIRST (-1) | The first event in the event list |
| FINDLAST (-2) | The last event in the event list |
| FINDPREV (-3) | The previous event in the event list |
| FINDNEXT (-4) | The next event in the event list |

FindProperty Method

Returns the name of a property from a list of properties for an object. ViP does not maintain the list of properties in any particular order.

This generic method applies to the following objects: application window, chart, check box, Clipboard object, combo box, command button, data object, ellipse, group box, line, link, list box, OLE object, option button, rectangle, scroll bar, static text, text box, and timer.

Script syntax

*FoundPropertyName$* = *ObjectRef*.FindProperty(*CurrentPropertyName$, Direction%*)

*FoundPropertyName$* is the name of the requested property, or a null string when the method reaches the end of the property list. *CurrentPropertyName$* is the name of the property from which the user wants to start searching. The user must specify a value for this parameter if the value of Direction% is FINDNEXT or
FINDPREV; however, the method ignores the value of this parameter
if the user specifies FINDFIRST or FINDLAST for Direction%.
*Direction%* is the direction the user wants to search in or the
location of the property the user wants returned.

| DIRECTION | DESCRIPTION |
|---|---|
| FINDFIRST (-1) | The first property in the list |
| FINDLAST (-2) | The last property in the list |
| FINDPREV (-3) | The previous property in the list |
| FINDNEXT (-4) | The next property in the list |

FontSelect Method

Displays the Windows Font dialog box to allow the user to change
the FontName, FontSize, and FontStyle properties for the text or
contents of an object.
This generic method applies to the following objects: check box,
combo box, command button, ellipse, group box, list box, option
button, rectangle, static text, and text box.
To explicitly change these properties in a script without giving
the user access to the Font dialog box, use the FontName,
FontSize, and FontStyle properties.

Script syntax

*Status%* = *ObjectRef*.FontSelect()

*Status%* is SUCCESS (0) when the user selects OK or Apply, or
nonzero when the user selects Cancel.

GetProperty Method

Retrieves the ASCII representation of a named object property
value. Typically, the user usee this method when creating
designer tools. To specify this value, use the SetProperty
method.
This generic method applies to the following objects: application
window, chart, check box, Clipboard object, combo box, command button, data object, ellipse, group box, line, link, list box,
OLE object, option button, rectangle, scroll bar, static text,
text box, and timer.

Script syntax
*Value$* = *ObjectRef*.GetProperty(*PropertyName$*)
*Value$* is the value of the property of the object as in ASCII.
If the data type is integer or a long, the method converts the
decimal value of the property to the ASCII representation of the
value.  This method returns the actual values of the properties;
it does not return constants for the values.
*PropertyName$* is the name of the property (for example,
BackColor, FontSize).

---

Move Method

Changes the location of an object in the application window or
the location of the application window on the screen.  This
method does not change the size of the object.
This generic method applies to the following objects: application
window, chart, check box, combo box, command button, data object,
ellipse, group box, line, list box, OLE object, option button,
rectangle, scroll bar, static text, text box, and timer.
Execution of this method for an application window causes the
Positioning event for the application window to occur.
ViP manages positioning and sizing differently, depending on
the class of the object.  For example, ViP determines the initial
run-time value of the Right property differently for application
windows than for other objects.

Script syntax
*Status%* = *ObjectRef*.Move(*Left&, Top&*)
*Status%* is SUCCESS (0) when the operation is successful, or
nonzero when it fails.

App - 180

*Left&* is the x-coordinate of the upper left corner of the object.
Specify this value in either pixels or twips, depending on the
value of the ScaleMode property.
*Top&* is the y-coordinate of the upper left corner of an object.
Specify this value in either pixels or twips, depending on the
value of the ScaleMode property.

---

Position Method

Sets the size and location of an object in the application window
or the size and location of the application window on the screen.
This generic method applies to the following objects: application
window, chart, check box, combo box, command button, data object,
ellipse, group box, line, list box, OLE object, option button,
rectangle, scroll bar, static text, text box, and timer.
Execution of this method for an application window at run time
causes the Positioning event for the application window to occur.
ViP manages positioning and sizing differently, depending on
the class of the object. For example, ViP determines the initial
run-time value of the Height property differently for application
windows than for other objects.

Dialog Box
At design time, the user can use the Setup dialog box to specify
non-default initial values for the parameters of this method.

Script syntax
*Status%* = *ObjectRef*.Position(*Left&, Top&, Width&, Height&*)
*Status%* is SUCCESS (0) when the operation is successful, or
nonzero when it fails.
*Left&* is the x-coordinate of the upper left corner of the object.
Specify this value in either pixels or twips, depending on the
value of the ScaleMode property.
*Top&* is the y-coordinate of the upper left corner of an object.

App - 181

Specify this value in either pixels or twips, depending on the
value of the ScaleMode property.

*Width&* is the width of the object. Specify this value in either
pixels or twips, depending on the value of the ScaleMode
property.

*Height&* is the height of the object. Specify this value in
either pixels or twips, depending on the value of the ScaleMode
property.

---

Repaint Method

Redraws a ViP object. ViP automatically redraws any
object when it moves or when its text or visibility changes. The
user uses the Repaint method to redraw an object when the value
of another property changes.

This method applies to the following objects: application
window, chart, check box, combo box, command button, data object,
ellipse, group box, line, list box, OLE object, option button,
rectangle, scroll bar, static text, and text box.

When applied to a data object, the Repaint method does the
following:
- If the current cell is not visible, scrolls the cell into
  the visible region of data object.
- If the result set of the data object has changed since the
  last time the data object was displayed, displays the new
  data.

When applied to a data object, the Repaint method does not do the
following:
- Update the result set of the data object based on the values
  in the data object update row.
- Make permanent changes to the underlying source data for the
  data object. If the user wants to execute the update specified in the update row for the data object and make
permanent changes to the underlying source data for the data
object, the ExecuteUpdate method is used.

- Requery the data source. If the user wants to execute the
query for a data object, return a new result set for the
data object, and display that result set in the data object,
the ExecuteQuery method is used.

- Change the focus. If the user wants to set the focus to the
current cell in the data object and (if the current cell is
not visible) scroll the cell into the visible region of the
data object, the SetFocus method is used.

Script syntax

*Status%* = *ObjectRef*.Repaint()
*Status%* is SUCCESS (0) when the operation is successful, or
nonzero when it fails.

SetProperty Method

Specifies the ASCII value for a named property of an object.
Typically, the user uses this method when in designer tools.
To retrieve this value, the GetProperty method is used.
This generic method applies to the following objects: application
window, chart, check box, Clipboard object, combo box, command
button, data object, ellipse, group box, line, link, list box,
OLE object, option button, rectangle, scroll bar, static text,
text box, and timer.

Script syntax

*Status%* = *ObjectRef*.SetProperty(*PropertyName$, Value$*)
*Status%* is SUCCESS (0) when the operation is successful, or
nonzero when it fails.
*PropertyName$* is the name of the property (for example,
BackColor, FontSize).

*Value$* is the value of the property.  If the data type of the
property is a string, the user can specify either the actual
value of the property or the constant for the value.  If the data
type of the property is an integer or a long, the user must
specify the ASCII representation of the value.

What is claimed is:

1. A method for creating an application program, the method implemented on a computer system having a display screen and an input device, the input device controllable by a user to create visual representations on the display screen, the method/comprising:

A. defining and supporting a set of object classes, the set of object classes including a linking object class;

B. selecting, in response to input from the user, a first one of the object classes;

C. generating, in response to the user drawing a first visual representation on the display screen, a source object, the source object being an instance of the first object class and having a first set of associated default events and property settings;

D. selecting, in response to input from the user, a second one of the object classes;

E. generating, in response to the user drawing a second visual representation on the display screen, a destination object, the destination object being an instance of the second object class and having a second set of associated default events and property settings;

F. selecting, in response to input from the user, the linking object class;

G. generating, in response to the user drawing a third visual representation connecting the first and second visual representations, a linking object, the linking object being an instance of the linking object class and having a set of user selectable predefined behaviors used by the destination object, the predefined behaviors being responsive to at least one of the first set of associated events; and H. displaying, in response to input from the user, the default events and property settings, of selected of the source, destination, and linking objects.

2. The method of claim 1 further comprising the step of:

I. providing a separate repository of predefined behaviors for various pair combinations of members of the set of object classes; and wherein step G comprises:

G1. retrieving the set of user selectable predefined behaviors from the repository; and G2. selecting one of the set of user selectable predefined behaviors as a default behavior for the linking object.

3. The method of claim 1 further comprising the step of:

J. defining and supporting a generic class, the generic class having a set of properties that are shared by each object class of the set of object classes.

4. The method of claim 1 wherein each of the behaviors are scripts defining actions involving the destination object in response to an occurrence of one of the events of the first set of events.

5. The method of claim 4 wherein the computer system includes an operating system and wherein one of the events is caused by the operating system.

6. The method of claim 4 wherein one of the events is caused by interaction with the user via the input device.

7. The method of claim 4 wherein one of the events is triggered programmatically.

8. The method of claim 4 wherein step G comprises the steps of:

G3. displaying a script editor;

G4. editing a first script, the first script defining a first relationship between the source object and the destination object; and G5. associating the first script with the linking object.

9. The method as defined by claim 8 wherein step G further comprises the steps of:

G6. modifying the first script to be a second script defining a second relationship between the source object and the destination object; and G7. associating the second script with the linking object.

10. The method as defined by claim 1 further including the step of:

K. providing a palette of visual objects;

L. utilizing the palette of visual objects for selecting the first one of the object classes.

11. An apparatus for visually creating an application program, the apparatus implemented on a computer system having a display screen and an input device, the input device controllable by a user to create visual representations on the display screen, the visual programming apparatus comprising:

means for defining and supporting a set of object classes, the set of object classes including a linking object class;

means for selecting, in response to input from the user, a first one of the object classes;

means for generating, in response to the user drawing a first visual representation on the display screen, a source object, the source object being an instance of the first object class and having a first set of associated default events and property settings;

means for selecting, in response to input from the user, a second one of the object classes;

means for generating, in response to the user drawing a second visual representation on the display screen, a destination object, the destination object being an instance of the second object class and having a second set of associated default events and property settings;

means for selecting, in response to input from the user, the linking object class;

means for generating, in response to the user drawing a third visual representation connecting the first and second visual representations, a linking object, the linking object being an instance of the linking object class and having a set of user selectable predefined behaviors used by the destination object, the predefined behaviors being responsive to at least one of the first set of associated events;

the linking object linking the source object and destination object; and means for displaying and editing, in response to input from the user, the default events and property settings associated with selected of the source, destination, and linking objects.

12. The apparatus of claim 11 further comprising:

a separate repository of predefined behaviors for various pair combinations of members of the set of object classes; and wherein the means for generating the linking object comprises:

means for retrieving the set of user selectable predefined behaviors from the repository; and means for selecting one of the set of user selectable predefined behaviors as a default behavior for the linking object.

13. The apparatus of claim 11 further comprising means for defining and supporting a generic class, the generic class having a set of properties that are shared by each object class of the set of object classes.

14. The apparatus of claim 11 wherein each of the behaviors are scripts that define actions involving the destination object in response to an occurrence of one of the events of the first set of events.

15. The apparatus as defined by claim 14 wherein the means for generating the linking object comprises:

means for displaying a script editor;

means for editing a first script, the first script defining a first relationship between the source object and the destination object; and means for associating the first script with the linking object.

16. The apparatus of claim 15 wherein means for generating a linking object comprises:

means for modifying the first script to be a second script defining a second relationship between the source object and the destination object; and means for associating the second script with the linking object.

17. The apparatus of claim 11 further comprising:

a palette of visual objects;

means for utilizing the palette of visual objects for selecting the first one of the object classes.

18. A computer program product for use with a computer system having a display screen and an input device, the computer program product comprising:

a computer usable medium having computer readable program code thereon for visually programming an application program, the computer readable program code comprising:

program code for defining and supporting by computer implemented steps a set of object classes, the set of object classes including a linking object class;

program code for selecting, in response to input from the user, a first one of the object classes;

program code for generating, in response to the user drawing a first visual representation on the display screen, a source object, the source object being an instance of the first object class and having a first set of associated default events and property settings;

program code for selecting, in response to input from the user, a second one of the object classes;

program code for generating, in response to the user drawing a second visual representation on the display screen, a destination object, the destination object being an instance of the second object class and having a second set of each of the associated default events and property settings;

program code for selecting, in response to input from the user, the linking object class;

program code for generating, in response to the user drawing a third visual representation connecting the first and second visual representations, a linking object, the linking object being an instance of the linking object class and having a set of user selectable predefined behaviors for the destination object, the predefined behaviors being responsive to at least one of the first set of associated events the linking object combining the source object and destination object to create the application program; and program code for displaying and editing in response to input from the user, the default events and property settings associated with selected of the source, destination, and linking objects.

19. The computer program product of claim 18 further comprising:

program code for providing a separate repository of predefined behaviors for various pair combinations of members of the set of object classes;

wherein the program code for generating the linking object comprises:

program code for retrieving the set of user selectable predefined behaviors from the repository; and program code for selecting one of the set of user selectable predefined behaviors as a default behavior for the linking object.

20. The computer program of claim 18 further comprising program code for defining and supporting by computer implemented steps a generic class, the generic class having a set of properties that are shared by each object class of the set of object classes.

21. The computer program product of claim 18 wherein each of the behaviors are scripts that define actions involving the destination object in response to an occurrence of one of the events of the first set of events.

22. The computer program product as defined by claim 21 wherein the program code for generating the linking object comprises:

program code for displaying a script editor;

program code for editing a first script, the first script defining a first relationship between the source object and the destination object; and program code for associating the first script with the linking object.

23. The computer program product as defined by claim 22 wherein the program code for generating the linking object further comprises:

program code for modifying the first script to be a second script defining a second relationship between the source object and the destination object; and program code for associating the second script with the linking object.

24. The computer program product as defined by claim 18 further including:

program code for providing a palette of visual objects; and program code for utilizing the palette of visual objects for selecting the first one of the object classes.

\* \* \* \* \*